United States Patent
Miyazawa et al.

(10) Patent No.: US 8,075,976 B2
(45) Date of Patent: *Dec. 13, 2011

(54) OPTICAL RECORDING MEDIUM, OPTICAL RECORDING MATERIAL AND METAL COMPLEX COMPOUND

(75) Inventors: Takashi Miyazawa, Tokyo (JP); Yutaka Kurose, Tokyo (JP); Hisashi Shoda, Tokyo (JP); Kenichi Satake, Tokyo (JP); Yukiko Takahashi, Tokyo (JP); Mayumi Kimura, Tokyo (JP); Naoyuki Uchida, Tokyo (JP); Hideki Tamagawa, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 703 days.

This patent is subject to a terminal disclaimer.

(21) Appl. No.: 11/995,205

(22) PCT Filed: Jul. 11, 2006

(86) PCT No.: PCT/JP2006/313761
§ 371 (c)(1),
(2), (4) Date: Feb. 26, 2008

(87) PCT Pub. No.: WO2007/007748
PCT Pub. Date: Jan. 18, 2007

(65) Prior Publication Data
US 2009/0263611 A1    Oct. 22, 2009

(30) Foreign Application Priority Data
Jul. 14, 2005  (JP) .................................. 2005-205830

(51) Int. Cl.
*G11B 7/24* (2006.01)

(52) U.S. Cl. ............. 428/64.8; 430/270.16; G9B/7.149; G9B/7.156; 428/64.4

(58) Field of Classification Search ................. 428/64.4, 428/64.8; 430/270.16; G9B/7.149, 7.156; 534/692, 701, 703, 705–707, 710
See application file for complete search history.

(56) References Cited

U.S. PATENT DOCUMENTS

| 2,822,359 A | | 2/1958 | Straley et al. |
| 3,964,862 A | * | 6/1976 | Kangle et al. .................... 8/456 |
| 4,600,681 A | | 7/1986 | Bergthaller et al. |

(Continued)

FOREIGN PATENT DOCUMENTS

CN      1456555      11/2003

(Continued)

OTHER PUBLICATIONS

Derwent abstract for CN 1562987 created on Sep. 24, 2010.*

(Continued)

*Primary Examiner* — Gerard Higgins
(74) *Attorney, Agent, or Firm* — Oblon, Spivak, McClelland, Maier & Neustadt, L.L.P.

(57) ABSTRACT

An optical recording medium having excellent light resistance that includes a substrate; and a recording layer which is provided on the substrate directly or on another layer provided on the substrate, wherein the recording layer is capable of recording and/or reading information by irradiating light thereon, the recording layer includes a metal complex compound with an azo compound having a coupler component with indandione and a diazo component with a nitrogen-containing heterocyclic aromatic ring structure, and a nickel or cobalt ion coordinated to the azo compound.

6 Claims, 12 Drawing Sheets

U.S. PATENT DOCUMENTS

| | | | |
|---|---|---|---|
| 5,389,419 A | | 2/1995 | Maeda et al. |
| 7,778,145 B2 * | | 8/2010 | Horie et al. ............... 369/275.4 |
| 2005/0081747 A1 | | 4/2005 | Shimizu et al. |
| 2005/0103225 A1 * | | 5/2005 | Shimizu et al. ............ 106/31.27 |
| 2005/0109237 A1 | | 5/2005 | Shimizu |
| 2006/0235210 A1 * | | 10/2006 | Berneth et al. ............... 534/653 |
| 2009/0053455 A1 * | | 2/2009 | Miyazawa et al. ........... 428/64.8 |
| 2009/0269540 A1 * | | 10/2009 | Horie et al. .................. 428/64.4 |

FOREIGN PATENT DOCUMENTS

| | | | |
|---|---|---|---|
| CN | 1562987 | | 1/2005 |
| EP | 875888 A1 * | | 11/1998 |
| EP | 1 491 353 A1 | | 12/2004 |
| EP | 1 770 696 A1 | | 4/2007 |
| GB | 876815 | | 9/1961 |
| JP | 8 295811 | | 11/1996 |
| JP | 9 277703 | | 10/1997 |
| JP | 2001 271001 | | 10/2001 |
| WO | 91 18950 | | 12/1991 |
| WO | 2004 007620 | | 1/2004 |
| WO | WO 2004/072185 A1 | | 8/2004 |
| WO | 2004 088649 | | 10/2004 |
| WO | WO 2006009107 A1 * | | 1/2006 |
| WO | 2006 013214 | | 2/2006 |
| WO | 2006 061398 | | 6/2006 |
| WO | WO 2006136493 A1 * | | 12/2006 |

OTHER PUBLICATIONS

Derwent abstract for CN 1456555 created on Sep. 24, 2010.*
STN search of compounds performed on Sep. 24, 2010.*
Notification of Reasons for Refusal issued May 24, 2011 in Japanese Patent Application No. 2006-190490 (English translation only).
Masoud, Mamsouh S., et al., "Stereochemistry and Thermal Behaviour of New Cobalt(II), Nickel(II) and Copper(II) Complexes of 5-(2-Thiazolylazo)-Barbituric and Thiobarbituric Acids at Different Temperatures", Journal of Thermal Analysis, vol. 38, pp. 1365 to 1376, 1992.
Masoud, Mamsouh S., et al., "Synthesis and Characterization of New Azopyrimidine Complexes", Journal of Thermal Analysis, vol. 56, No. 8, pp. 725 to 742, 2003.
References AM-AR have been cited in the International Search Report.
References have been cited in the corresponding Search Report.
References AS-AU are discussed in the specification.
References AA-AC, AV-AW and AY-AZ are additional prior art known to Applicant.
U.S. Appl. No. 11/909,829, filed Sep. 27, 2007, Miyazawa, et al.
Chinese Office Action dated Aug. 5, 2011 as received in the corresponding Chinese Patent Application No. 200680025540.9.

* cited by examiner

OPTICAL RECORDING MEDIUM, OPTICAL RECORDING MATERIAL AND METAL COMPLEX COMPOUND

CROSS-REFERENCE TO RELATED APPLICATIONS

This application is a 371 of PCT/JP2006/313761 filed Jul. 11, 2006 and claims the benefit of JP 2005-205830 filed Jul. 14, 2005.

TECHNICAL FIELD

The present invention relates to an optical recording medium and others, and more specifically, to an optical recording medium and others applicable to blue laser, having an excellent light resistance.

BACKGROUND ART

Presently, various kinds of optical recording media including CD-R/RW, DVD-R/RW, MO and others have been widely accepted and used as external memory devices for information processing machines such as computers because a large quantity of information may be stored and randomly accessed easily as in DVD-RAM. Among the optical recording media, recordable optical recording media such as CD-R and DVD-R, which are organic dye type optical recording media having a recording layer containing organic dye compounds, have been considered to have advantages from the viewpoint of low cost and easy production.

Generally, the optical recording media such as CD-R and DVD-R that are available in the market are designed as, for example, in the case of CD-R, being suitable for recording and reading information with a laser light of about 780 nm wavelength, or in the case of DVD-R, being suitable for recording and reading information with a laser light of 600 nm to 700 nm wavelength. As a dye used for recording in CD-R or DVD-R, for example, an azo compound is used (refer to Patent Document 1, Patent Document 2, and Patent Document 3).

Patent Document 1: International Publication No. WO 91/018950,
Patent Document 2: Japanese Patent Application Laid-Open Publication No. H09-277703, and
Patent Document 3: Japanese Patent Application Laid-Open Publication No. 2001-271001.

DISCLOSURE OF THE INVENTION

Problems to be Solved by the Invention

Meanwhile, due to the increase in information quantity handled, the recording density of the media has been requested to be increased. In particular, in recent years, by using a laser light with a short oscillation wavelength such as a blue laser that has been developed intensively, an optical recording medium having a capability of recording and reading information at a high density has been proposed.

In view of such request, when conventional optical recording media that optically record and read information using a laser light with a relatively long wavelength are applied to recording and reading information using a laser light with a shorter wavelength, the reflectance is lowered and recording or reading is not performed adequately.

For example, in the optical recording medium described in the aforementioned Patent Document 1, an azo compound having a coupler component with an N,N-dialkylaniline structure is used as a dye for recording. With the N,N-dialkylaniline structure, a dye having an extremely large molar absorption coefficient is likely to be obtained. However, in an absorption spectrum in a solution of an azo metal chelate compound that is a complex between the foregoing azo compound and a metal, $\lambda$max is observed at 500 nm or longer. Thereby, in an absorption spectrum of a coating film that contains the dye of the foregoing metal-containing azo complex compound, almost no absorption is observed at around 405 nm wavelength of laser light. The problem is that the coating film is likely to have poor sensitivity to blue laser light.

Further, in the optical recording medium described in Patent Document 2, an azo compound having a coupler component with a pyridone structure is used as a dye for recording. The absorption spectrum of the azo compound has been known to exhibit $\lambda$max at a shorter wavelength, but the absorption spectrum of a metal chelate compound composed of a metal and an azo compound having a benzothiazole or thiazole structure as the diazo component has small absorption at around the laser light wavelength of 405 nm.

Further, in Patent Document 3, a metal-containing azo complex compound that is a complex between a metal and an azo compound having as the coupler component a linear $\beta$-diketone structure including a $\beta$-ketoester and the like is reported to have absorption in the short wavelength side in an absorption spectrum. However, the azo compound having the linear $\beta$-diketone structure as the coupler component has production problems to be improved such as low yield of synthesis, difficulty in solidification, and low purity of the resulting product, requiring further studies.

Further, the present inventors have reported in Japanese Patent Application No. 2005-95905 that a metal azo chelate dye composed of a metal and an azo compound having a diazo component such as isoxazole having absorption in the short wavelength side and a coupler component such as pyridone has absorption in the blue light region that corresponds to 350 nm to 530 nm of laser light wavelength. However, further studies have shown that the foregoing azo compound has a limitation on molecular designing because the optimum combination of the coupler component and diazo component is limited, so that further shifting to the shorter wavelength side is difficult considering the molecular structure thereof. In addition, it has been also found that the light resistance of the azo compound containing isoxazole as the diazo component is required to be improved.

The present invention has been made to address the aforementioned problems that have been highlighted in the course of the development of an optical recording medium that records and/or reads high density optical information using a blue laser light of short wavelength.

Namely, it is an object of the present invention to provide an optical recording medium having a capability of recording and/or reading high density optical information using a laser light of short wavelength.

Further, it is another object of the present invention to provide an optical recording material having a capability of recording optical information using a laser light of short wavelength.

Still further, it is another object of the present invention to provide a metal complex compound useful as an optical recording material.

Means for Solving the Problems

The present inventors have made intensive studies and found that a diazo compound having a cyclic $\beta$-diketone structure as a coupler component exhibits a high sensitivity absorption in the short wavelength side. The present invention has been accomplished based on this finding.

According to the present invention, there is provided an optical recording medium characterized by comprising a substrate and a recording layer provided on the substrate directly or on other layers provided on the substrate, having a capability of recording and/or reading information by irradiating light thereon wherein the recording layer contains a metal complex compound composed of an azo compound and a metal ion. The azo compound has a coupler component with a cyclic β-diketone structure and a diazo component with a nitrogen-containing heterocyclic aromatic ring structure. The metal ion is coordinated by the azocompound.

The optical recording medium according to the present invention is not limited as long as the azo compound that composes the metal complex compound contained in the recording layer has a coupler component with a cyclic β-diketone structure and a diazo component with a nitrogen-containing heterocyclic aromatic ring structure, but the coupler component preferably has a structure of five- to seven-membered ring from the viewpoint of stability and easiness of the synthesis of the compound. Particularly preferable is a cyclic β-diketone azo compound represented by the following general formula (I) or general formula (II). By incorporating the cyclic β-diketone azo compound into the recording layer, an optical recording medium having a capability of recording and/or reading high density optical information using a laser light of short wavelength may be attained.

[Chemical 1]

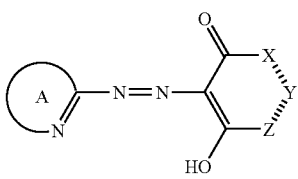

[I]

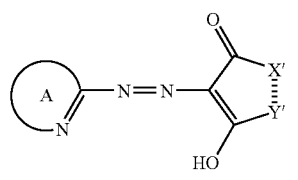

[II]

(in the general formula (I) or (II), ring A is a nitrogen-containing heterocyclic aromatic ring; X, Y, and Z in the general formula (I) and X' and Y' in the general formula (II) each independently are one kind selected from an optionally substituted carbon atom, an oxygen atom, a sulfur atom, and a nitrogen atom and form a five-membered or a six-membered ring together with a β-diketone structure.)

The coupler component for the cyclic β-diketone azo compound preferably has a cyclic β-diketone structure having a saturated or unsaturated five- to seven-membered hydrocarbon ring or a heterocyclic condensed ring.

The diazo component preferably has a nitrogen-containing heterocyclic aromatic ring structure composed of a five- or six-membered monocyclic or a dicyclic condensed ring of either or both of a five-membered ring and a six-membered ring.

Further, the metal ion is preferably an ion of a divalent metal selected from Groups VIIB, VIIIB, IB and IIB in the periodic table, particularly preferably an ion of at least one kind of metal selected from nickel, cobalt, zinc, copper, and manganese.

The optical recording medium according to the present invention has a recording layer containing the complex composed of the azo compound having the aforementioned cyclic β-diketone structure and a metal, so that the optical recording medium is capable of recording information using a laser light of 350 nm to 530 nm wavelength.

Further, according to the present invention, there is provided an optical recording material that contains a metal-containing cyclic β-diketone azo compound and, if necessary, the other ingredients. The metal-containing cyclic β-diketone azo compound is composed of an azo compound and a metal ion. The azo compound has a coupler component with a cyclic β-diketone structure and a diazo component with a nitrogen-containing heterocyclic aromatic ring structure. The metal ion is coordinated by the azo compound.

Still further, in the metal complex compound composed of an azo compound having a cyclic β-diketone structure linked to an azo group and a nitrogen-containing heterocyclic aromatic ring, and a divalent metal ion, the cyclic β-diketone structure preferably has any structure selected from Meldrum's acid, tetronic acid, barbituric acid, thiobarbituric acid, hydroxycoumarin, hydroxycarbostyril, pyrazolidinedione, indandione, cyclohexanedione, and diketopyrimidine.

Effect of the Invention

According to the present invention, an optical recording medium having a capability of recording and/or reading high density optical information using a laser light of short wavelength is provided.

BEST MODE FOR CARRYING OUT THE INVENTION

Hereinafter, a best mode for carrying out the present invention (hereinafter, abbreviated as embodiment) will be explained in detail. However, the present invention is not limited by the embodiment and may be performed in various forms within the scope of the present invention. Further, the accompanying drawings are used to explain the embodiment of the present invention, but do not show actual sizes.

Further, in the embodiment of the present invention, $R_1$ to $R_{25}$ defined in the structural formula described later may optionally have a substituent. Note that, the "substituent" used in the description of "substituent", "optionally substituted", and "optionally have a substituent" does not include a water-soluble group such as a carboxyl group, a sulfonic acid group and the like.

(Azo Compound)

The cyclic β-diketone azo compound (hereinafter, simply mentioned as "azo compound" in some cases) used in the present embodiment is not limited as long as the azo compound has a coupler component with a cyclic β-diketone structure and a diazo component with a nitrogen-containing heterocyclic aromatic ring structure, but preferably as described above may have the structure represented by the following general formula (I) or general formula (II). In the general formula (I) or general formula (II), generally the nitrogen-containing heterocyclic aromatic ring positioned on the left side of an azo group (—N═N—) is called the diazo component, and the cyclic β-diketone structure on the right side is called the coupler component. The structure represented by the general formula (I) or general formula (II) may form a keto-enol tautomeric structure. For example, the structure represented by the general formula (I) may form the following structure. In the present description, the keto-enol tautomeric structure is represented by the enol form because a hydrogen atom is eliminated from the enol form and the resulting —O— form coordinates to the metal ion when the complex is formed.

[Chemical 2]

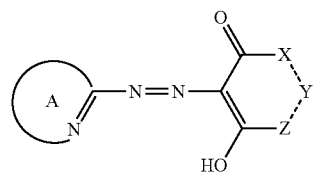
[I]

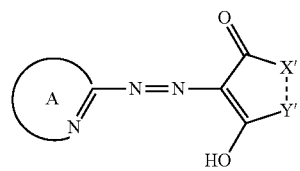
[II]

[Chemical 3]

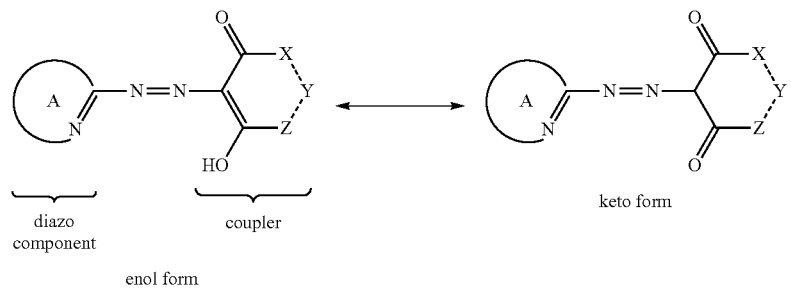

diazo component | coupler enol form keto form (Coupler Component)

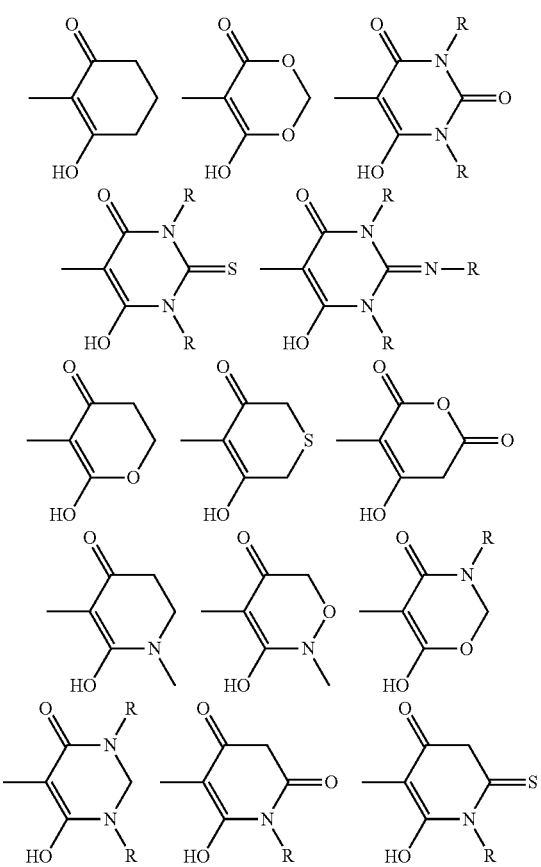
[Chemical 4]

Firstly, the coupler component will be explained.

In the coupler component of an azo compound represented by the general formula (I) or general formula (II), X, X', Y, Y', and Z each independently represent any one of a carbon atom that optionally has a substituent except a hydrogen atom, an oxygen atom, a sulfur atom, a nitrogen atom represented by N—$R_1$, C=O, C=S, and C=$NR_2$, and form a cyclic β-diketone structure having a five- or six-membered ring structure together with a β-diketone structure. $R_1$, represents any one of a hydrogen atom, a linear or branched alkyl group, a cycloalkyl group, an aralkyl group, an aryl group, a heterocyclic group, an acyl group represented by —$COR_3$, and an amino group represented by —$NR_4R_5$. $R_2$ represents a hydrogen atom, a linear or branched alkyl group, or an aryl group. $R_3$ represents a hydrocarbon group or a heterocyclic group. $R_4$ and $R_5$ each represent a hydrogen atom, a hydrocarbon atom, or a heterocyclic group. The alkyl chain moiety thereof or the alkyl chain moiety of the aralkyl group is optionally substituted by the same substituent as the aforementioned substituted alkyl chain.

A specific example of the cyclic α-diketone structure may be a structure represented by, for example, cyclohexanedione, Meldrum's acid, cyclopentadione, pyrazolidinedione, tetronic acid, tetramic acid, barbituric acid, thiobarbituric acid, indandione, 4-hydroxy-α-pyrone, 4-hydroxy-α-pyridone, 4-hydroxycoumarin, 4-hydroxycarbostyril, or the like.

The combinations or positions of X, X', Y, Y' and Z are not particularly limited, but when each member is linked together with a single bond, for example, there may be mentioned the following structures.

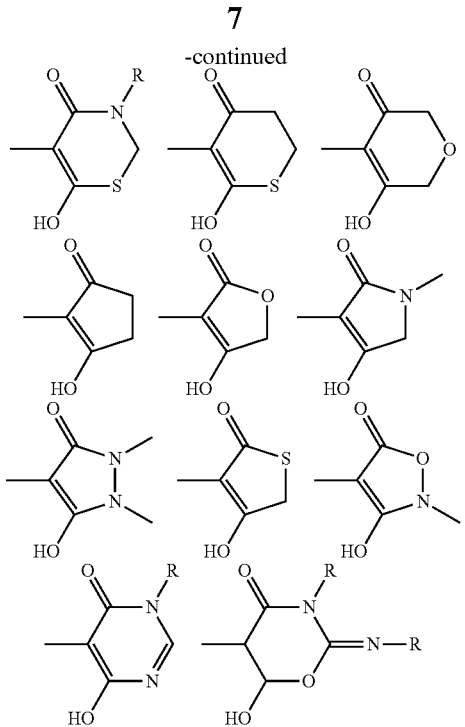

When X, X', Y, Y', and Z each represent a carbon atom, each optionally has an alkyl chain as the substituent except a hydrogen atom. The alkyl chain may be one kind, two of the same kind, or a combination of different kinds. In addition, X, X', Y, Y', and Z optionally form a spiro ring at the terminal carbon atoms. Examples of such structures are shown below, where an alkyl chain is incorporated as a substituent when an oxygen atom is selected as X and Z and a carbon atom is selected as Y.

[Chemical 5]

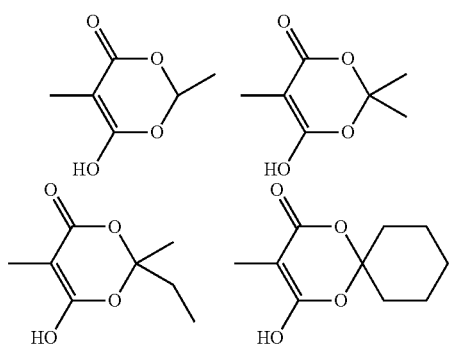

The alkyl chain incorporated as a substituent preferably has from 1 to 16 carbon atoms. When the alkyl chain incorporated as a substituent is excessively long, the resulting product is likely not to easily solidify and the gram absorption coefficient that represents absorption per weight is likely to decrease.

Further, when X, X', Y, Y', and Z each are a carbon atom or a nitrogen atom represented by N—$R_1$, adjacent atoms are optionally linked by a single bond or a double bond. Such structure having an unsaturated bonding may include, for example, the following structures.

[Chemical 6]

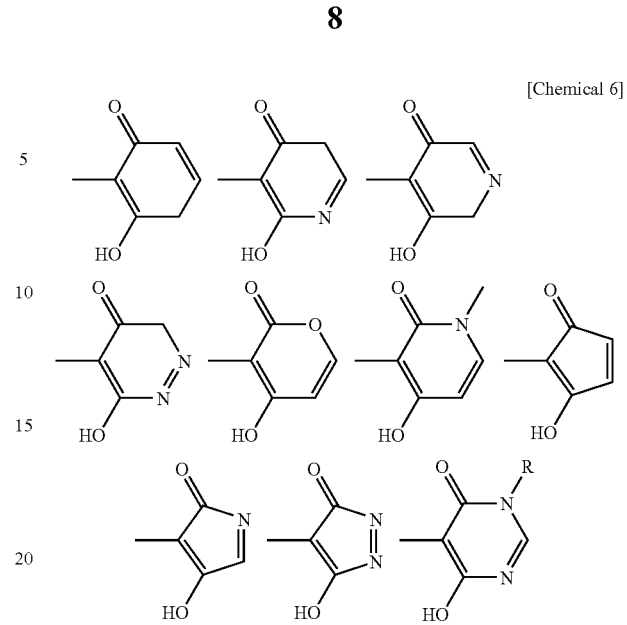

Further, when X, X', Y, Y', and Z are each a carbon atom, a nitrogen atom represented by N—$R_1$, or C=$NR_2$, adjacent atoms are optionally condensed with each other and form a saturated or unsaturated hydrocarbon ring or heterocyclic ring. Such a structure may include, for example, the following structures.

[Chemical 7]

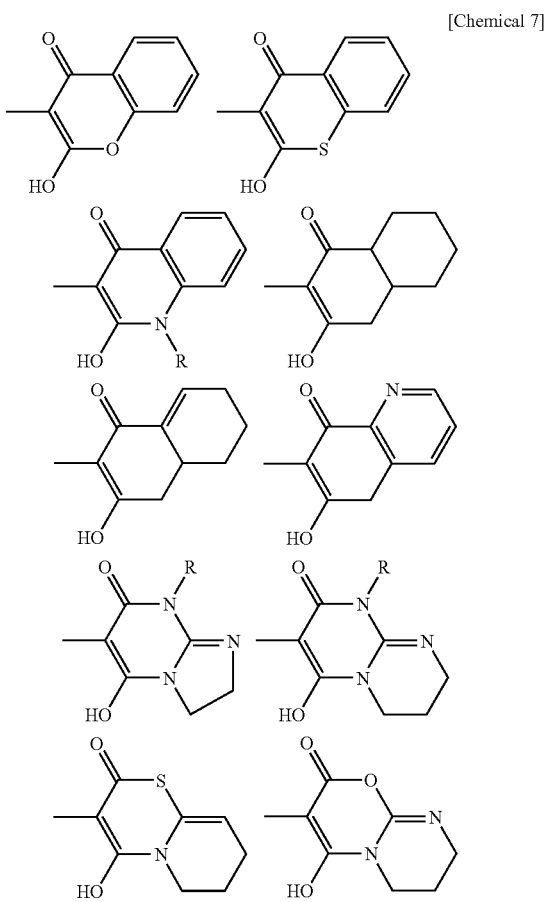

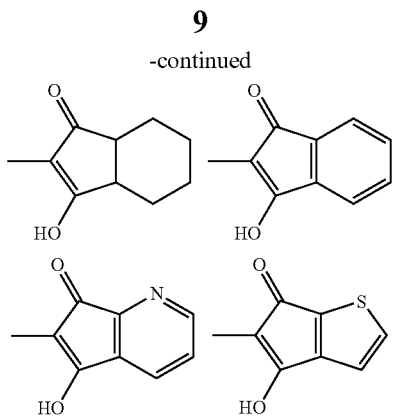

Among the above condensed structures, there may be mentioned preferably a saturated or unsaturated five- to seven-membered hydrocarbon ring or heterocyclic ring, particularly preferably a saturated or unsaturated six-membered hydrocarbon ring in which every X, X', Y, Y', and Z adjacent to each other is a carbon atom.

A particularly preferable structure represented by such X, X', Y, Y', and Z may include the structures shown in the following list: cyclohexanedione, Meldrum's acid, cyclopentadione, pyrazolidinedione, tetronic acid, tetramic acid, barbituric acid, thiobarbituric acid, indandione, 4-hydroxy-α-pyrone, 4-hydroxy-α-pyridone, diketopyrimidine, 4-hydroxycoumarin, and 4-hydroxycarbostyril.

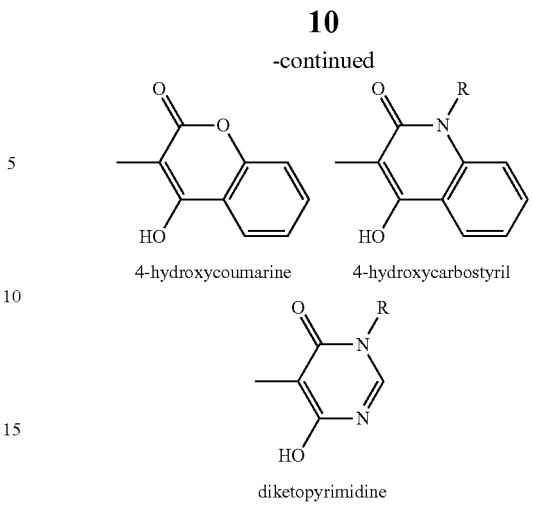

(Diazo Component)

The diazo component is explained below.

In the general formula (I) or general formula (II), the ring A in the diazo component represents a nitrogen-containing heterocyclic aromatic ring formed by including the carbon atom and nitrogen atom bonding to the ring A. The structure of the nitrogen-containing heterocyclic aromatic ring may be a monocyclic or a condensed ring as long as the structure has a nitrogen atom at the position having a coordination capability. The aromatic ring may include, for example, the following nitrogen-containing heterocyclic aromatic rings.

[Chemical 8]

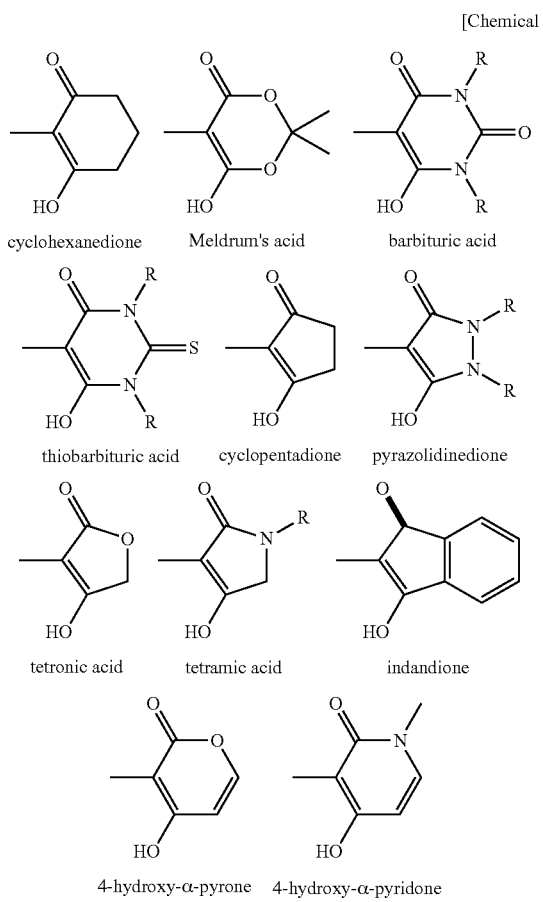

[Chemical 9]

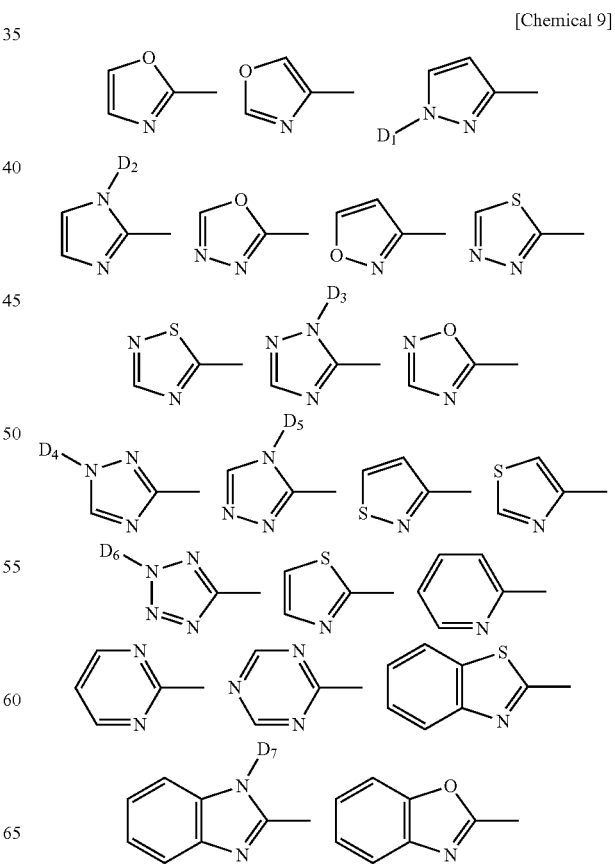

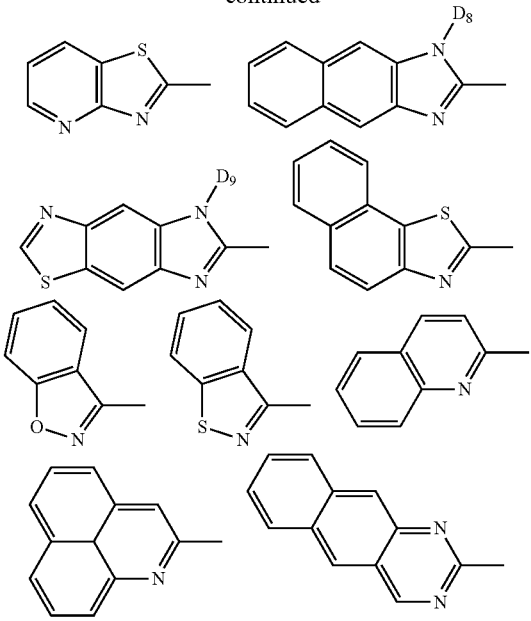

In the nitrogen-containing heterocyclic aromatic ring described above, $D_1$ to $D_9$ each independently represent any one of a hydrogen atom, a linear or branched C1~C6 alkyl group, a C3~C9 cycloalkyl group, a C7~C12 aralkyl group, and an acyl group represented by —$COR_3$.

Among the structures described above, in view of the absorption wavelength or solubility, the structure for the ring A is preferably a nitrogen-containing heterocyclic aromatic ring composed of a five- or six-membered monocyclic or a dicyclic condensed ring of either or both of a five-membered ring and a six-membered ring. Particularly preferably, there may be mentioned isoxazole, triazole, oxazole, thiadiazole, pyrazole, pyridine, pyrimidine, imidazole, thiazole, isothiazole, benzothiazole, benzisoxazole, benzoxazole, and benzimidazole.

In the general formula (I) or general formula (II), the ring A may have any substituent except a hydrogen atom. As an example of the substituent, there may be mentioned the following groups: for example, an optionally substituted C1~C18 linear or branched alkyl group such as methyl, ethyl, propyl, isopropyl, n-butyl, sec-butyl, tert-butyl, n-heptyl and the like; an optionally substituted C3~C18 cycloalkyl group such as cyclopropyl, cyclopentyl, cyclohexyl, adamantyl and the like; an optionally substituted C2~C18 linear or branched alkenyl group such as vinyl, propenyl, hexenyl and the like; an optionally substituted C3~C18 cycloalkenyl group such as cyclopentenyl, cyclohexenyl and the like; an optionally substituted saturated or unsaturated heterocyclic group such as 2-thienyl, 2-pyridyl, 4-piperidyl, morpholino and the like; an optionally substituted C6~C18 aryl group such as phenyl, tolyl, xylyl, mesityl, naphthyl and the like; an optionally substituted C7~C20 aralkyl group such as benzyl, phenethyl and the like; an optionally substituted C1~C18 linear or branched alkoxy group such as methoxy, ethoxy, n-propoxy, isopropoxy, n-butoxy, sec-butoxy, tert-butoxy and the like; an optionally substituted C3~C18 linear or branched alkenyloxy group such as propenyloxy, butenyloxy, pentenyloxy and the like; an optionally substituted C1~C18 linear or branched alkylthio group such as methylthio, ethylthio, n-propylthio, n-butylthio, sec-butylthio, tert-butylthio and the like; and others.

Further, other specific examples include a halogen atom such as fluorine, chlorine, bromine and the like; a nitro group; a cyano group; a mercapto group; a hydroxyl group; a formyl group; an acyl group represented by —$COR_3$; an amino group represented by —$NR_4R_5$; an acylamino group represented by —$NHCOR_6$; a carbamate group represented by —$NHCOOR_7$; a carboxylate group represented by —$COOR_8$; an acyloxy group represented by —$OCOR_9$; a carbamoyl group represented by —$CONR_{10}R_{11}$; a sulfonyl group represented by —$SO_2R_{12}$; a sulfinyl group represented by —$SOR_{13}$; a sulfamoyl group represented by —$SO_2NR_{14}R_{15}$; a sulfonate group represented by —$SO_3R_{16}$; and a sulfone-amide group represented by —$NHSO_2R_{17}$. The bonding position of the foregoing substituents is not particularly limited, and the number of the substituents may be zero to two or more. The plural substituents may be the same or different.

In the foregoing substituents, $R_3$, $R_6$, $R_7$, $R_8$, $R_9$, $R_{12}$, $R_{13}$, $R_{16}$, and $R_{17}$ each represent a hydrocarbon group or a heterocyclic group. $R_4$, $R_5$, $R_{10}$, $R_{11}$, $R_{14}$, and $R_{15}$ each represent any one of a hydrogen atom, a hydrocarbon group, and a heterocyclic group. The substituents are optionally substituted if necessary.

The hydrocarbon group represented by $R_3$ to $R_{17}$ includes, for example, a C1~C18 linear or branched alkyl group such as methyl, ethyl, propyl, isopropyl, n-butyl, sec-butyl, tert-butyl, n-heptyl and the like; a C3~C18 cycloalkyl group such as cyclopropyl, cyclopentyl, cyclohexyl, adamantyl and the like; a C2~C18 linear or branched alkenyl group such as vinyl, propenyl, hexenyl and the like; a C3~C18 cycloalkenyl group such as cyclopentenyl, cyclohexenyl and the like; a C7~C20 aralkyl group such as benzyl, phenethyl and the like; and a C6~C18 aryl group such as phenyl, tolyl, xylyl, mesityl and the like. The alkyl chain and aryl group moieties are further optionally substituted by a substituent that may be incorporated in the alkyl chain moiety of $R_2$ to $R_5$ described later.

Further, the heterocyclic group represented by $R_3$ to $R_{17}$ may include a saturated heterocyclic ring such as 4-piperydyl, morpholino, 2-morpholinyl, piperazyl and the like; and a heterocyclic aromatic ring such as 2-furyl, 2-pyridyl, 2-thiazolyl, 2-quinolyl and the like. These heterocyclic groups optionally have plural heteroatoms and further a substituent. In addition, the heterocyclic group may be bonded at any position. A preferable structure of the heterocyclic group may be a saturated five- or six-membered heterocyclic ring or a heterocyclic aromatic ring including a five- or six-membered monocyclic or a dicyclic condensed ring of either or both of a five-membered ring and a six-membered ring.

Hereinafter, a specific chemical structure is exemplified for the aforementioned acyl group, amino group, acylamino group, carbamate group, carboxylate group, acyloxy group, carbamoyl group, sulfonyl group, sulfinyl group, sulfamoyl group, sulfonate group, and sulfone-amide group.

As the acyl group (—$COR_{11}$), there may be mentioned the functional groups having the following structures, and the like.

[Chemical 10]

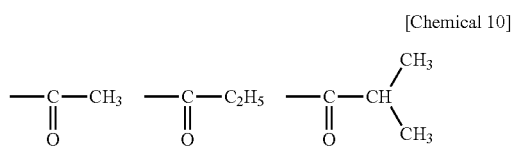

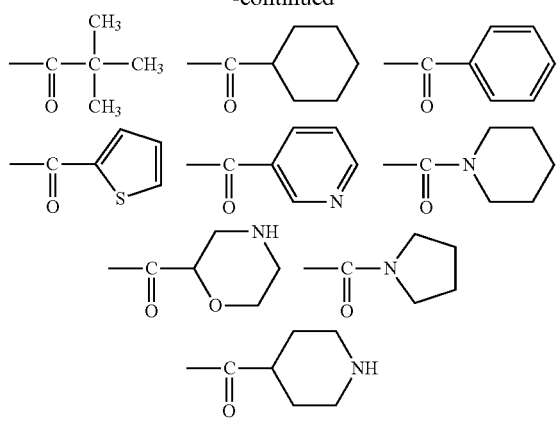

As the amino group (—NR$_{12}$R$_{13}$), there may be mentioned the functional groups having the following structures, and the like.

[Chemical 11]

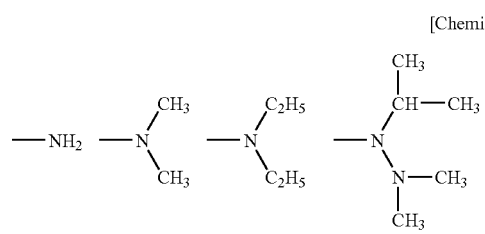

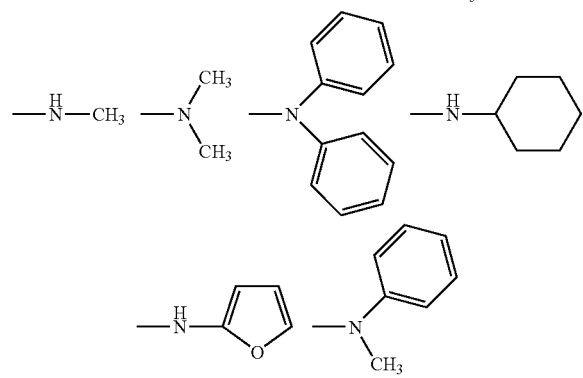

As the acylamino group (—NHCOR$_{14}$), there may be mentioned the functional groups having the following structures, and the like.

[Chemical 12]

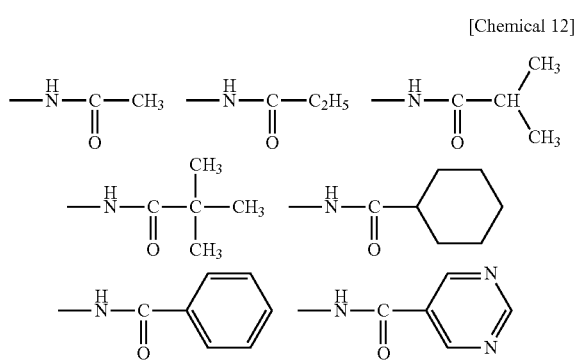

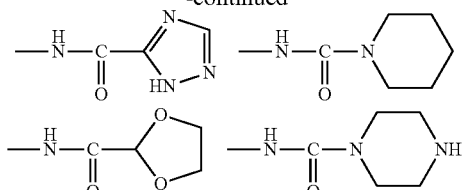

As the carbamate group (—NHCOOR$_{15}$), there may be mentioned the functional groups having the following structures, and the like.

[Chemical 13]

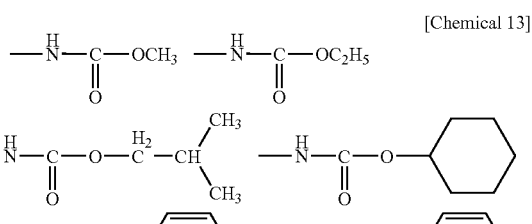

As the carboxylate group (—COOR$_{16}$), there may be mentioned the functional groups with the following structures, and the like.

[Chemical 14]

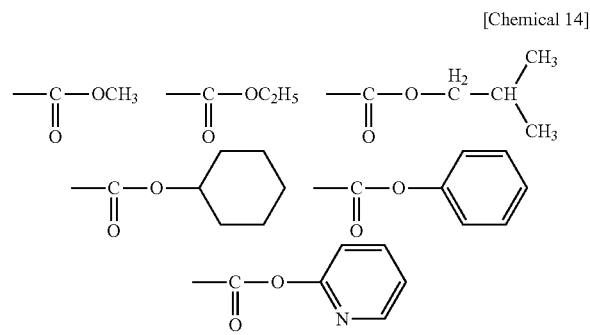

As the acyloxy group (—OCOR$_{17}$), there may be mentioned the functional groups with the following structures, and the like.

[Chemical 15]

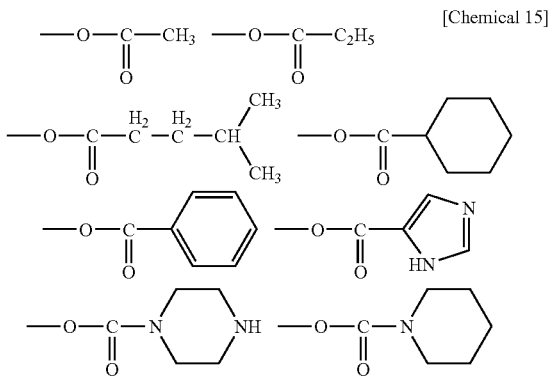

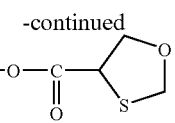

As the carbamoyl group (—CONR$_{18}$R$_{19}$), there may be mentioned the functional groups with the following structures, and the like.

[Chemical 16]

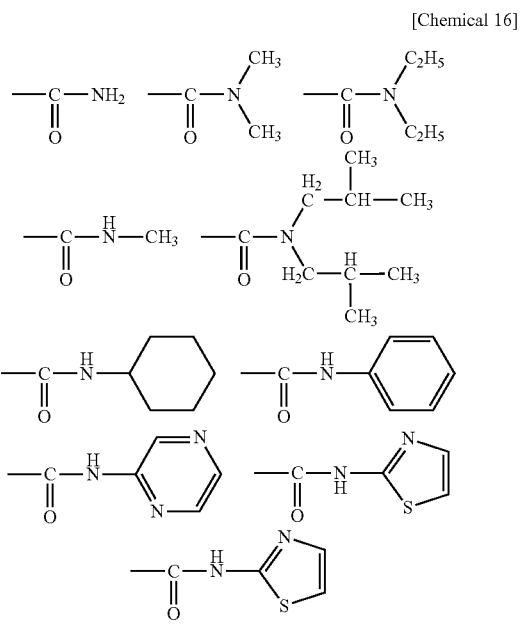

As the sulfonyl group (—SO$_2$R$_{20}$), there may be mentioned the functional groups with the following structures, and the like.

[Chemical 17]

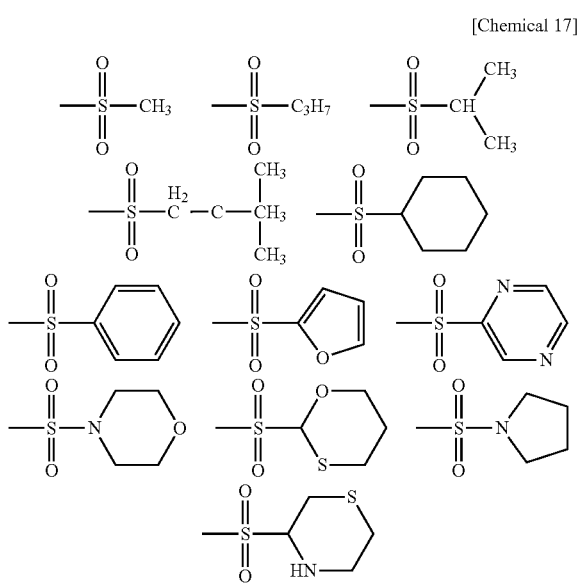

As the sulfinyl group (—SOR$_{21}$), there may be mentioned the functional groups with the following structures, and the like.

[Chemical 18]

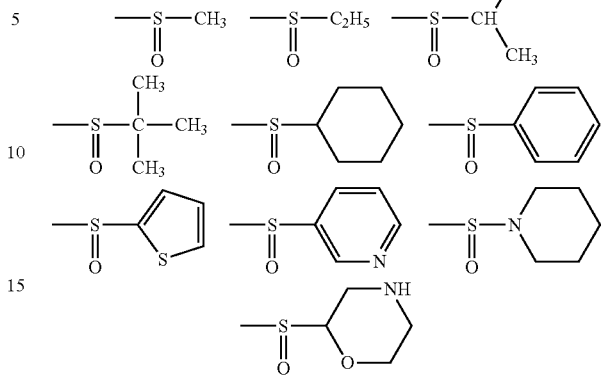

As the sulfamoyl group (—SO$_2$NR$_{22}$R$_{23}$), there may be mentioned the functional groups with the following structures, and the like.

[Chemical 19]

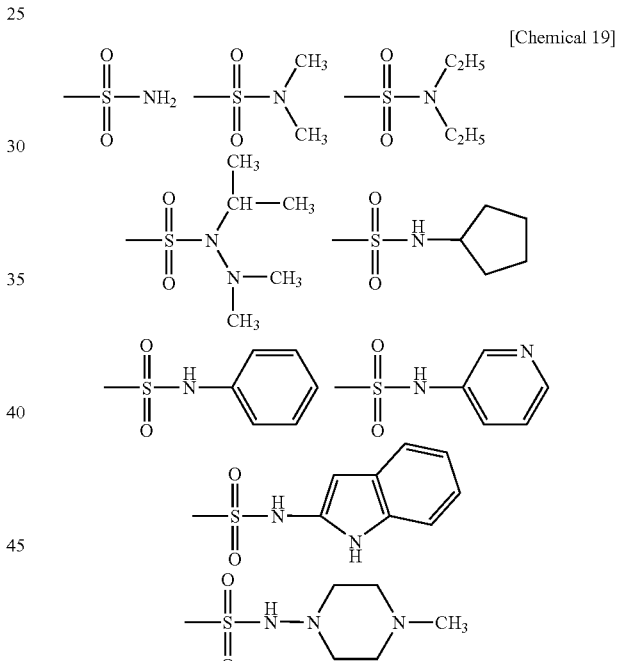

As the sulfonate group (—SO$_3$R$_{24}$), there may be mentioned the functional groups with the following structures, and the like.

[Chemical 20]

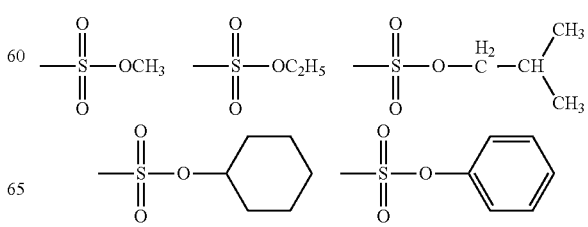

17

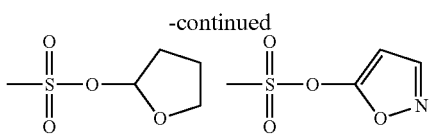

As the sulfone-amide group (—NHSO$_2$R$_{25}$), there may be mentioned the functional groups with the following structures, and the like.

[Chemical 21]

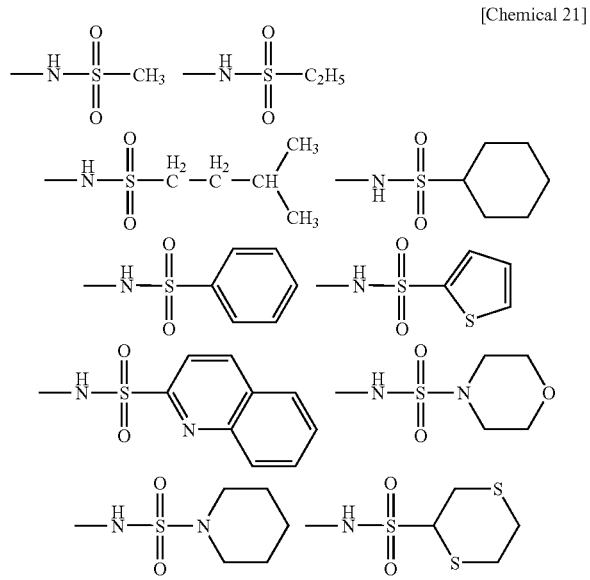

In the aforementioned general formula (I) or general formula (II), the substituent including the linear or branched alkyl group, the cycloalkyl group, the linear or branched alkenyl group, the cycloalkenyl group, linear or branched alkoxy group, and linear or branched alkylthio group, and the alkyl chain moiety of an alkyl group represented by R$_3$ to R$_{17}$ may further have a substituent. As the substituent, there may be mentioned, for example, a C1~C10 alkoxy group such as methoxy, ethoxy, n-propoxy, isopropoxy, n-butoxy, sec-butoxy, tert-butoxy and the like; a C2~C12 alkoxyalkoxy group such as methoxymethoxy, ethoxymethoxy, propoxymethoxy, ethoxyethoxy, propoxyethoxy, methoxybutoxy and the like; a C3~C15 alkoxyalkoxyalkoxy group such as methoxymethoxymethoxy, methoxymethoxyethoxy, methoxyethoxymethoxy, ethoxyethoxymethoxy and the like; a C6-C12 aryloxy group such as phenoxy, tolyloxy, xylyloxy, naphthyloxy and the like; a C2~C12 alkenyloxy group such as allyloxy, vinyloxy and the like; and others.

Further, as the substituent, there may be mentioned besides those mentioned above, a heterocyclic group such as 2-thienyl, 2-pyridyl, 4-piperidyl, morpholino and the like; a cyano group; a nitro group; a hydroxyl group; a mercapto group; an alkylthio group such as methylmercapto, ethylmercapto and the like; a C1~C10 alkylamino group such as amino, N,N-dimethylamino, N,N-diethylamino and the like; a C1~C6 alkylsulfonylamino group such as methylsulfonylamino, ethylsulfonylamino, n-propylsulfonylamino and the like; a halogen atom such as fluorine, chlorine, bromine and the like; an alkylcarbonyl group such as methylcarbonyl, ethylcarbonyl, isopropylcarbonyl and the like; a C2~C7 alkoxycarbonyl group such as methoxycarbonyl, ethoxycarbonyl, n-propoxycarbonyl, isopropoxycarbonyl, n-butoxycarbonyl and the like; a C2~C7 alkylcarbonyloxy group such as methylcarbonyloxy, ethylcarbonyloxy, n-propylcarbonyloxy, isopropylcarbonyloxy, n-butylcarbonyloxy and the like; a C2~C7 alkoxycarbonyloxy group such as methoxycarbonyloxy, ethoxycarbonyloxy, n-propoxycarbonyloxy, isopropoxycarbonyloxy, n-butoxycarbonyloxy and the like; and others.

As the substituent of the ring A in the diazo component, there is no particular limitation, but from the viewpoint of easiness of synthesis, solubility in a coating solvent, and others, there may be mentioned preferably a hydrogen atom, a C1~C12 linear or branched alkyl group, a C3~C10 cycloalkyl group, a C2~C12 linear or branched alkenyl group, a C7~C18 aralkyl group, a C1~C12 linear or branched alkoxy group, a C1~C12 linear or branched alkylthio group, a C6~C18 aryl group, a saturated or unsaturated heterocyclic group, a halogen atom, a nitro group, a cyano group, a mercapto group, a hydroxyl group, a formyl group, an acyl group represented by —COR$_{11}$, an amino group represented by —NR$_4$R$_5$, an acylamino group represented by —NHCOR$_6$, a carbamate group represented by —NHCOOR$_7$, a carboxylate group represented by —COOR$_8$, an acyloxy group represented by —OCOR$_9$, a carbamoyl group represented by —CONR$_{10}$R$_{11}$, a sulfonyl group represented by —SO$_2$R$_{12}$, a sulfinyl group represented by —SOR$_{13}$, a sulfamoyl group represented by —SO$_2$NR$_{14}$R$_{15}$, a sulfonate group represented by —SO$_3$R$_{16}$, and a sulfone-amide group represented by —NHSO$_2$R$_{17}$.

The molecular weight of the azo compound represented by the general formula (I) or general formula (II) is preferably 1,000 or less and particularly preferably 700 or less. Too large molecular weight is rather undesirable because the gram absorption coefficient is lowered and the absorption becomes low with respect to the amount of the dye.

As a preferable example of the azo compound represented by the general formula (I) or general formula (II), there may be mentioned the following compounds of (1) to (189).

[Chemical 22]

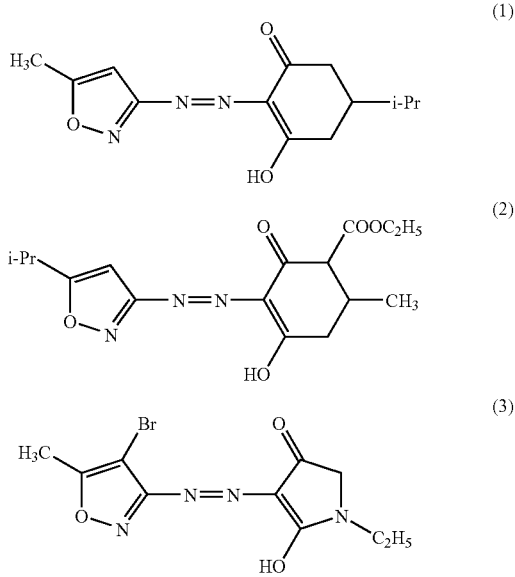

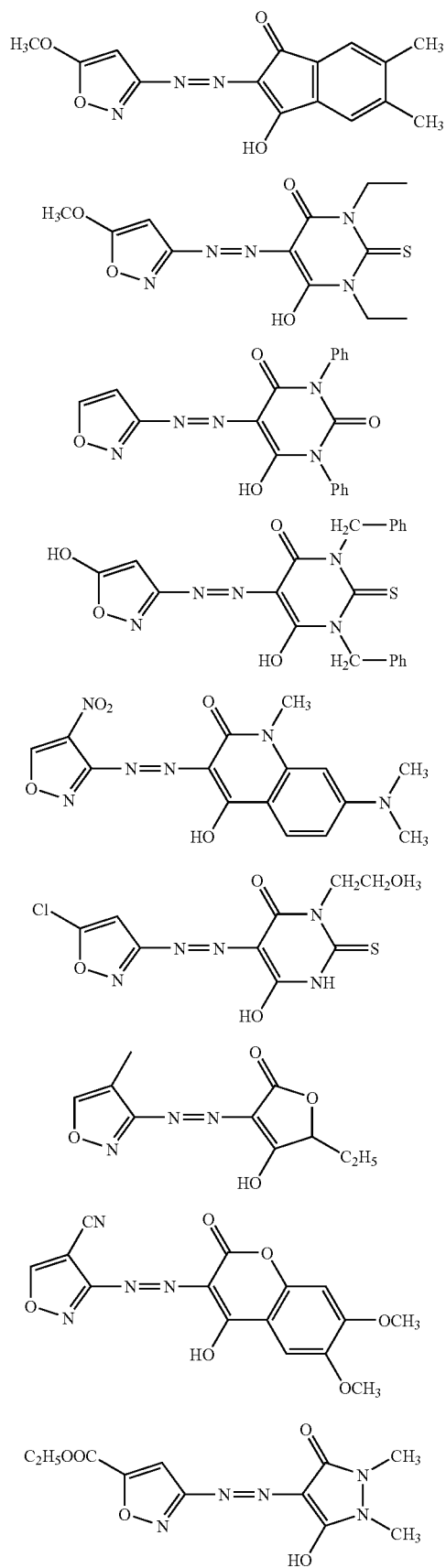
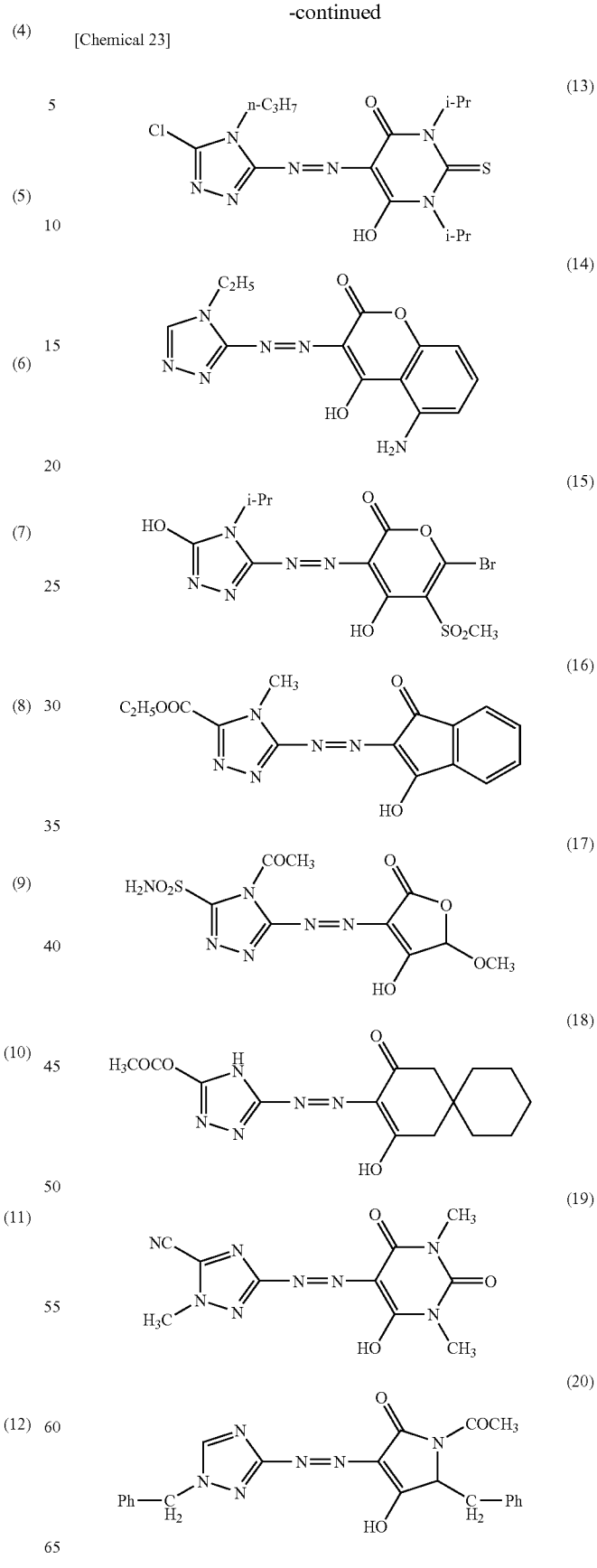

-continued

[Chemical 25]
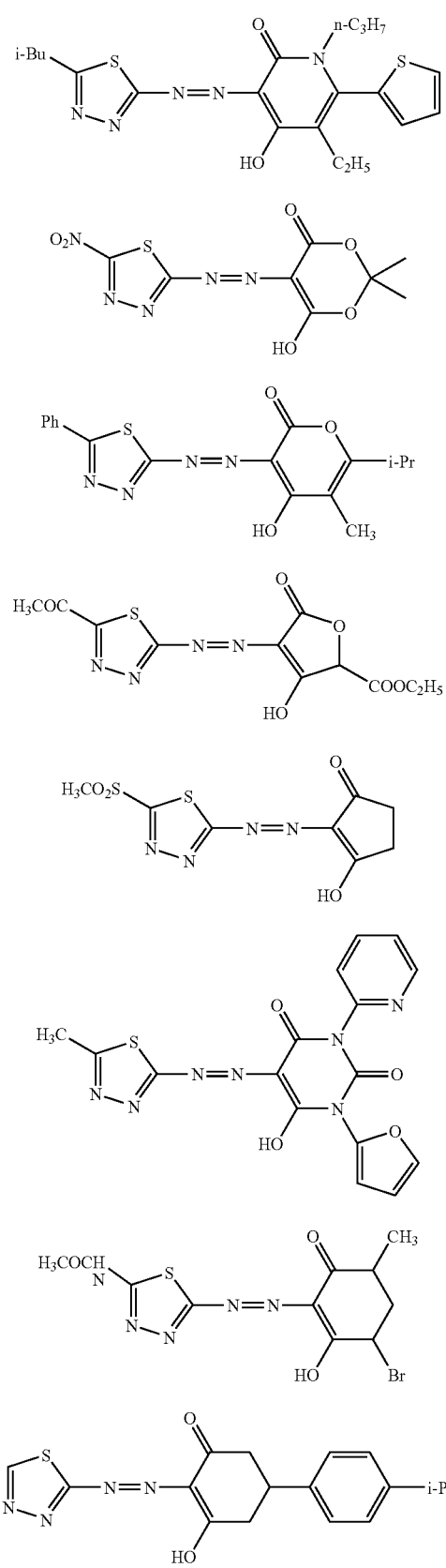
[Chemical 26]
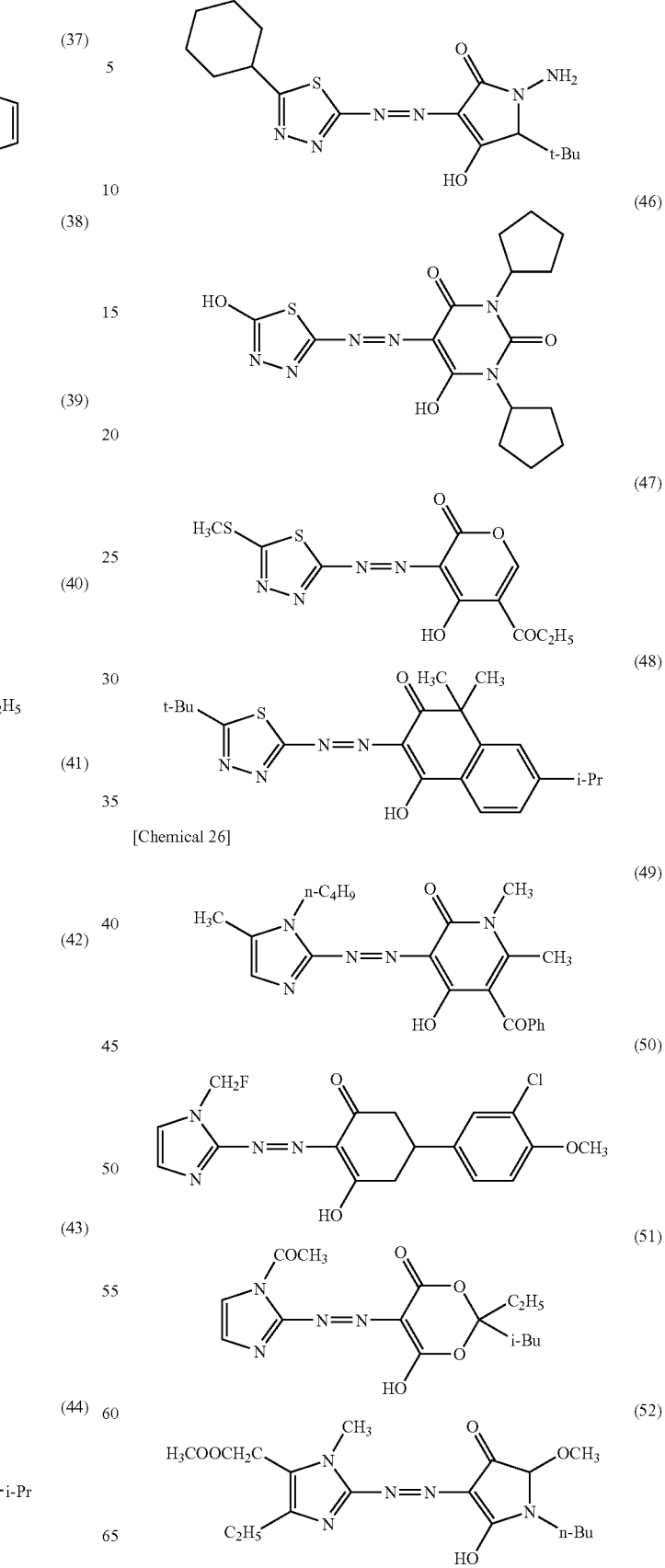

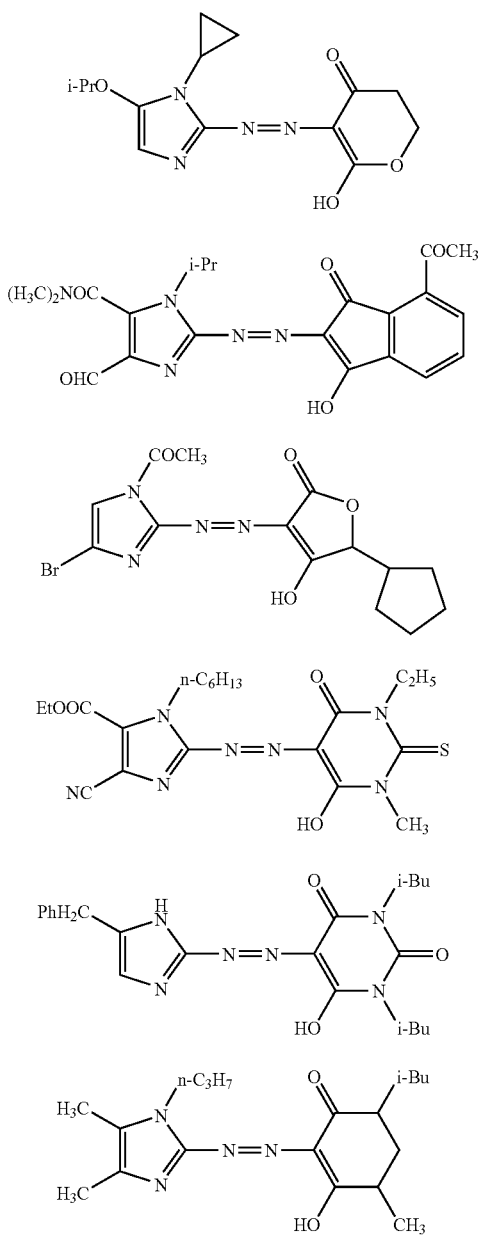
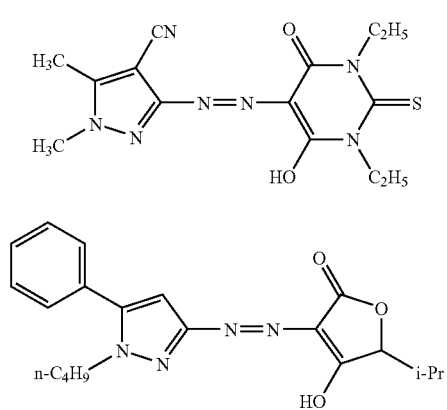
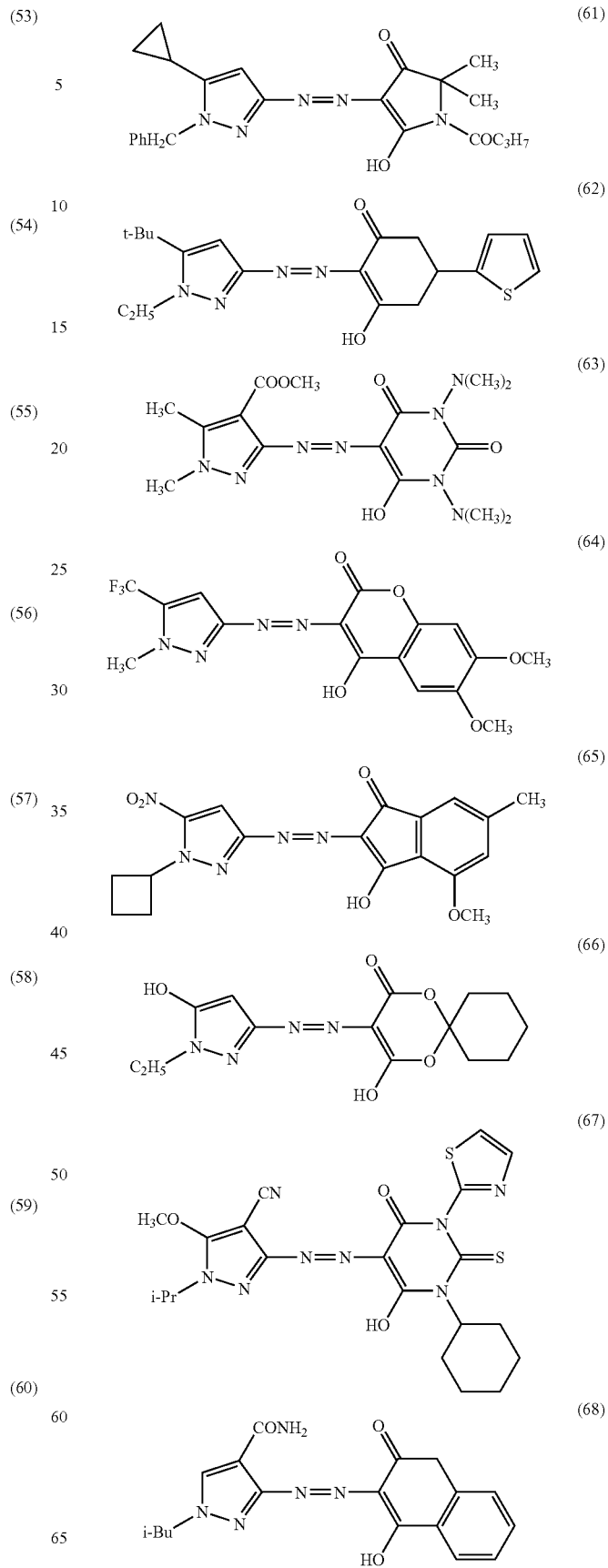

-continued
(69) 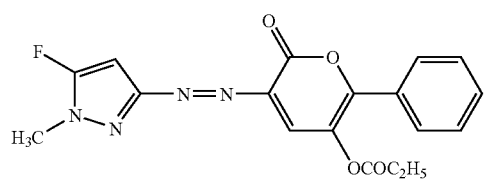
(70) 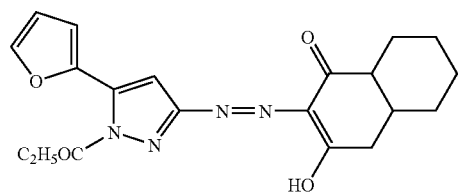
[Chemical 28]
(71) 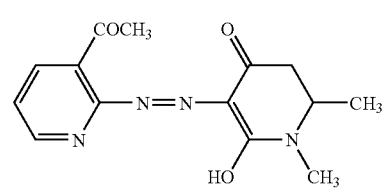
(72) 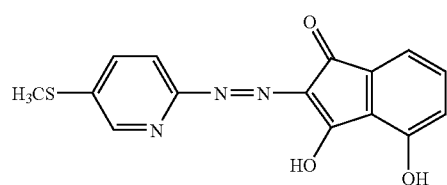
(73) 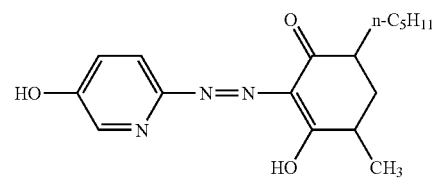
(74) 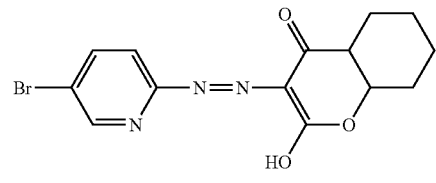
(75) 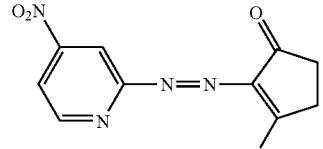
(76) 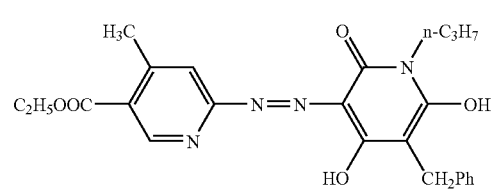
-continued
(77) 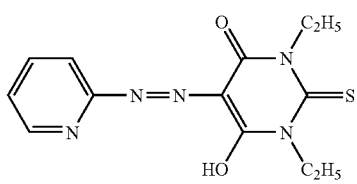
(78) 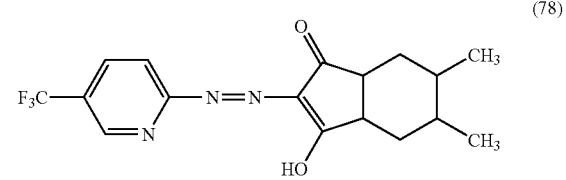
(79) 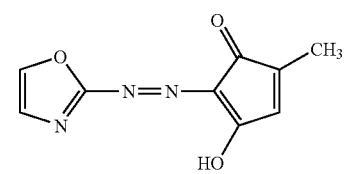
(80) 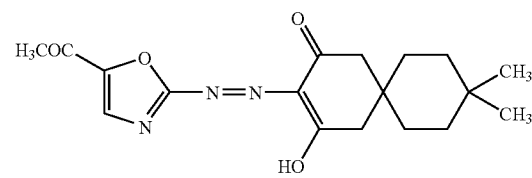
(81) 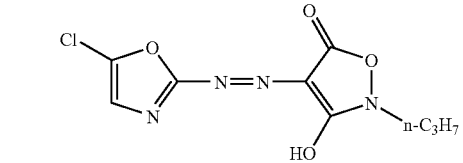
(82) 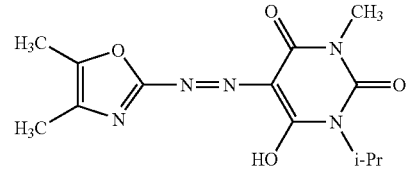
[Chemical 29]
(83) 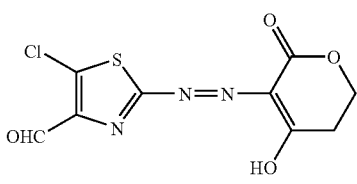
(84) 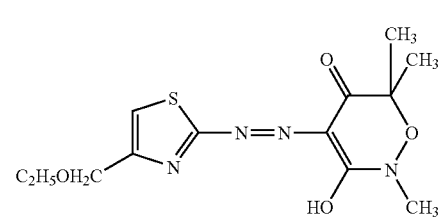

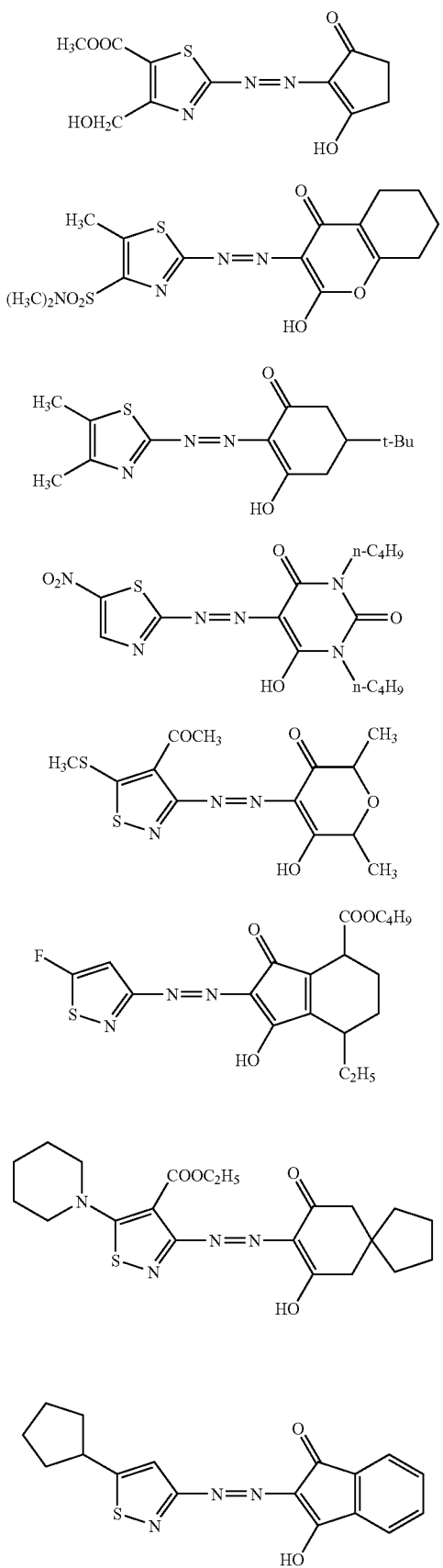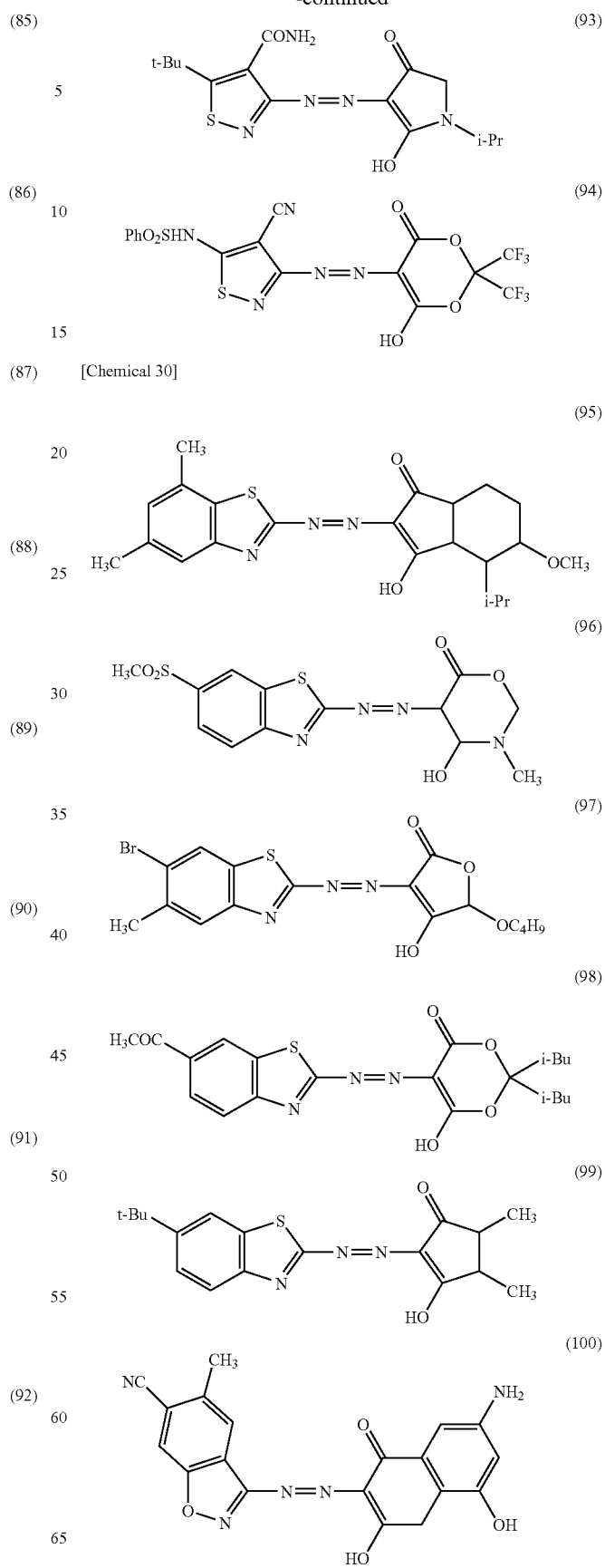

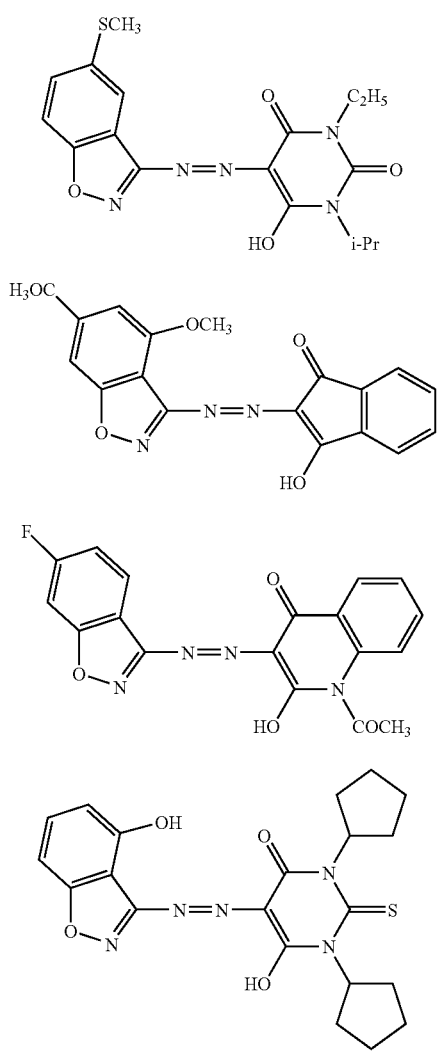
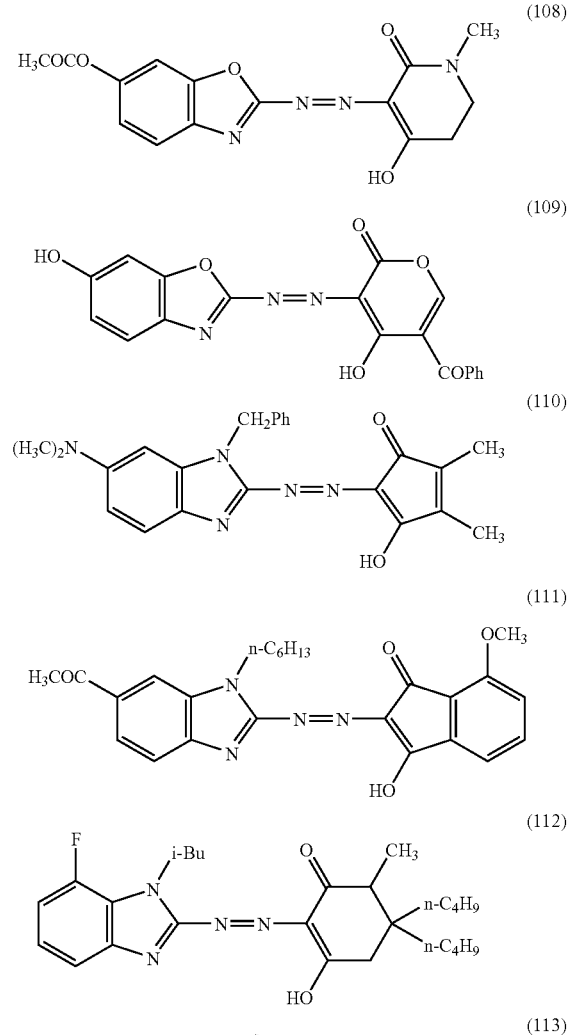
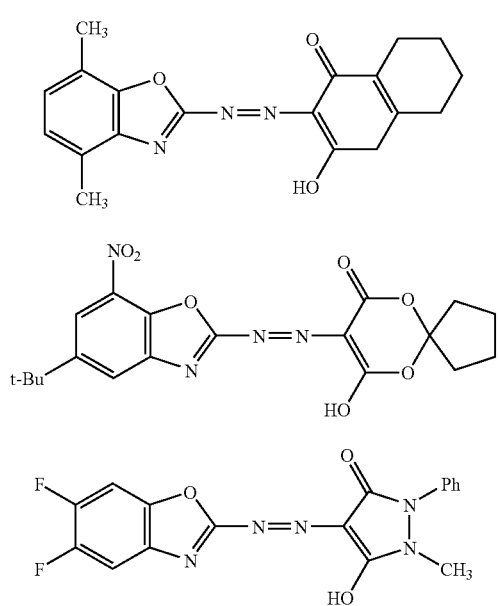

-continued

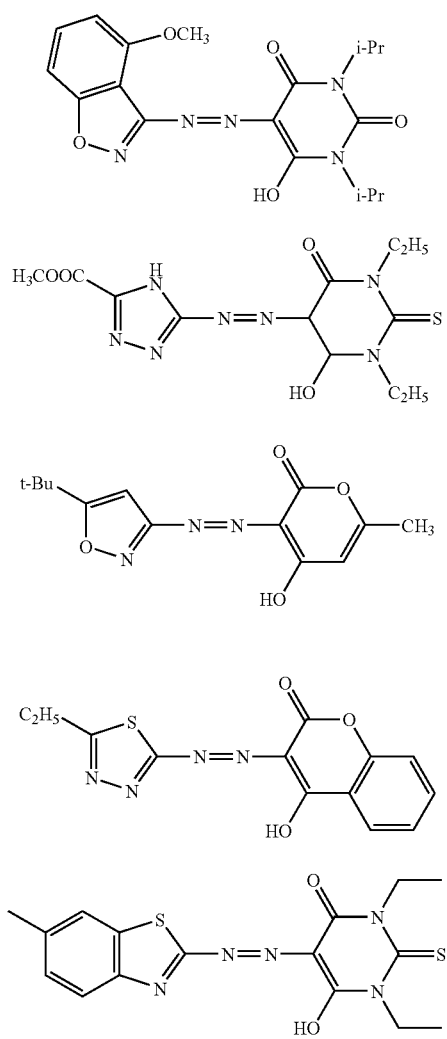
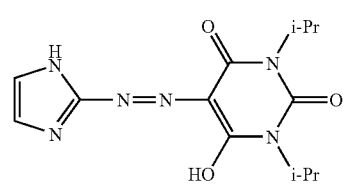
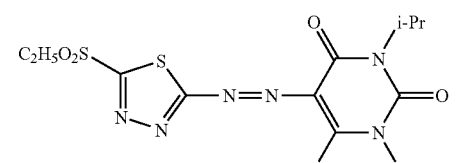
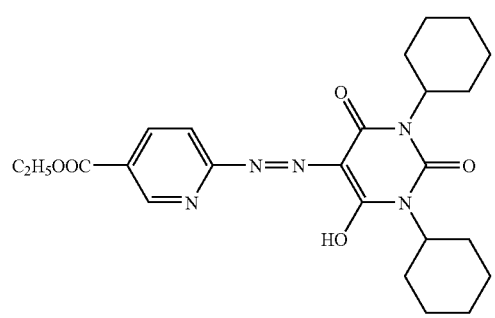
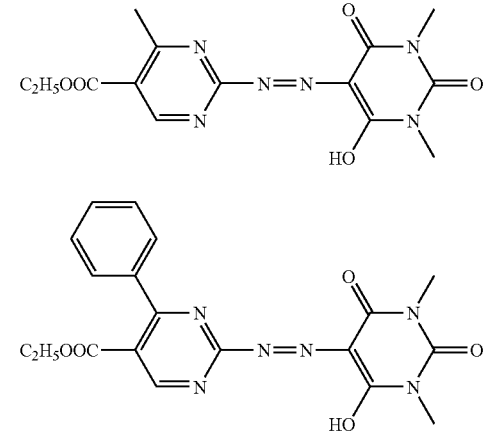
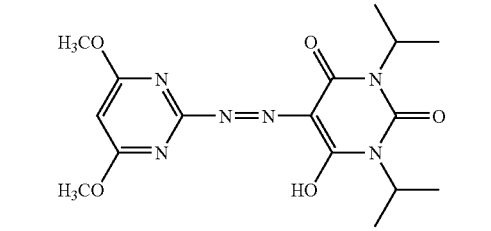
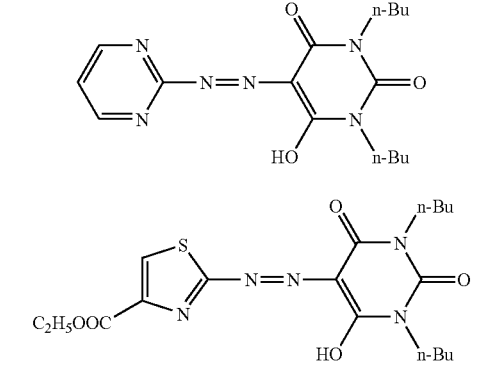

-continued
(148)
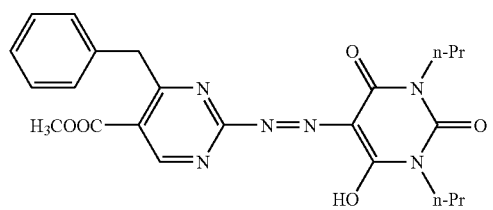
(149)
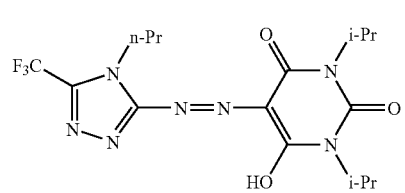
[Chemical 35]
(150)
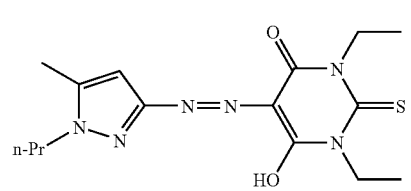
(151)
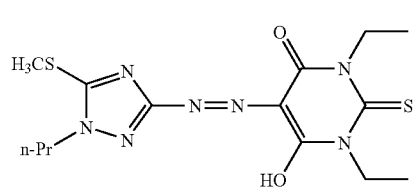
(152)
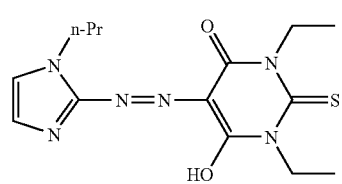
(153)
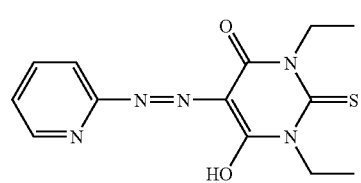
(154)
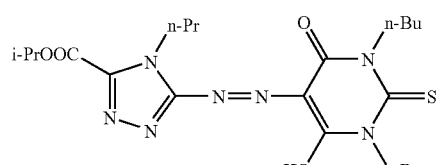
(155)
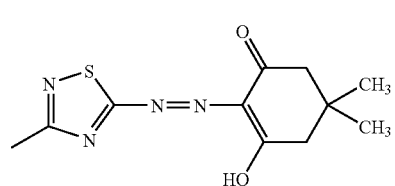
-continued
(156)
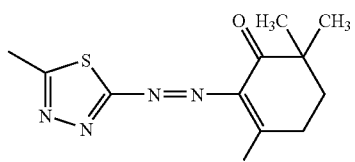
(157)
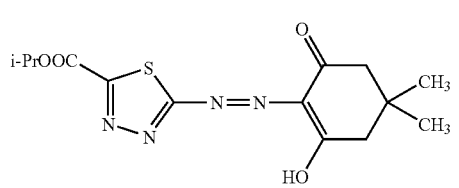
(158)
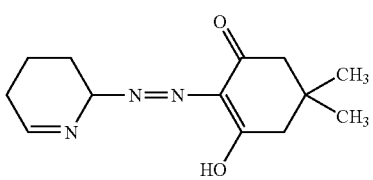
(159)
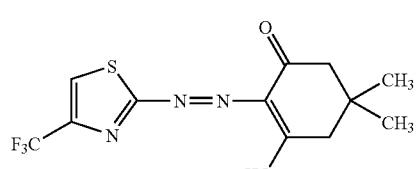
[Chemical 36]
(160)
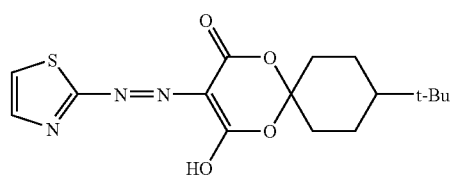
(161)
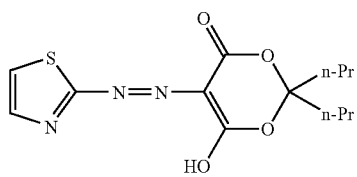
(162)
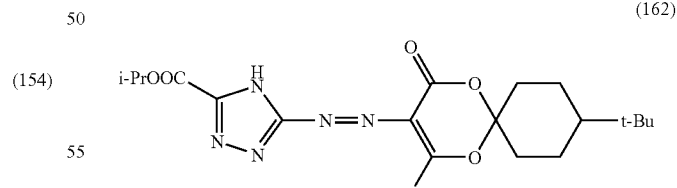
(163)
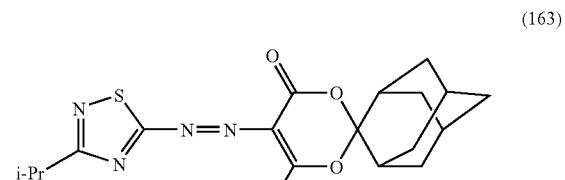

(164) 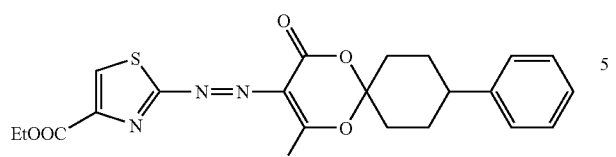
(165) 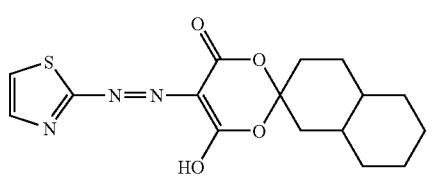
(166) 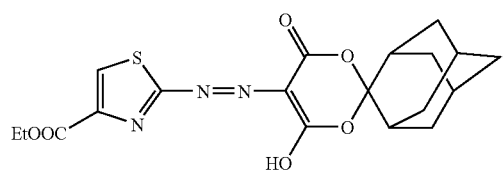
(167) 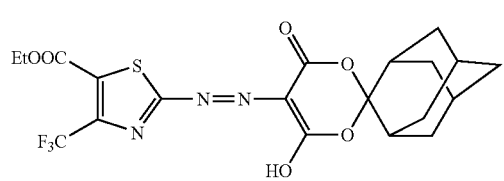
(168) 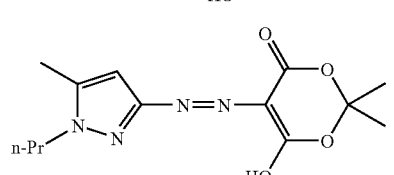
(169) 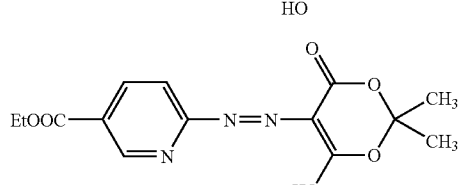
[Chemical 37]
(170) 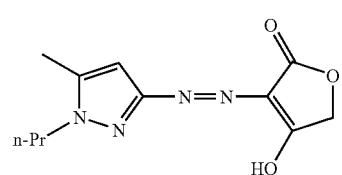
(171) 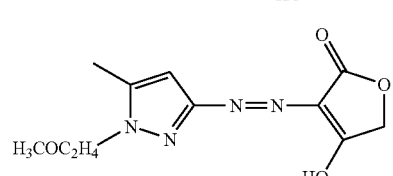
(172) 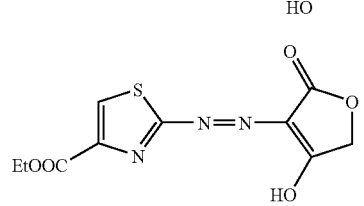
(173) 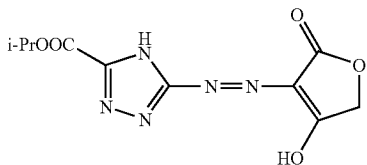
[174] 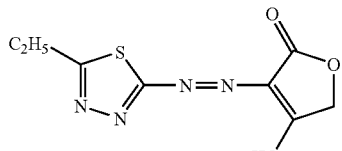
(175) 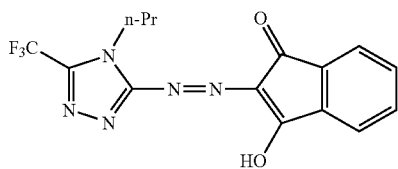
(176) 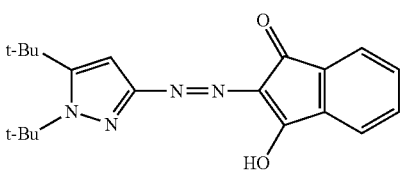
(177) 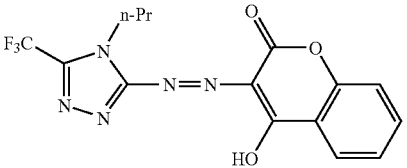
(178) 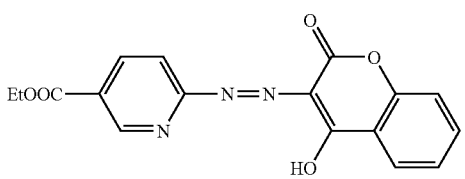
(179) 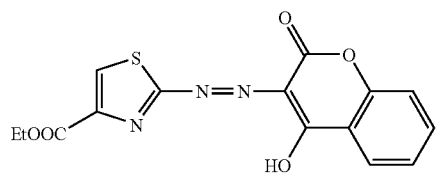
[Chemical 38]
(180) 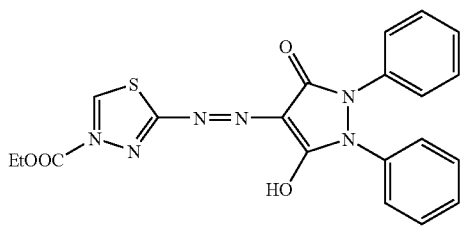

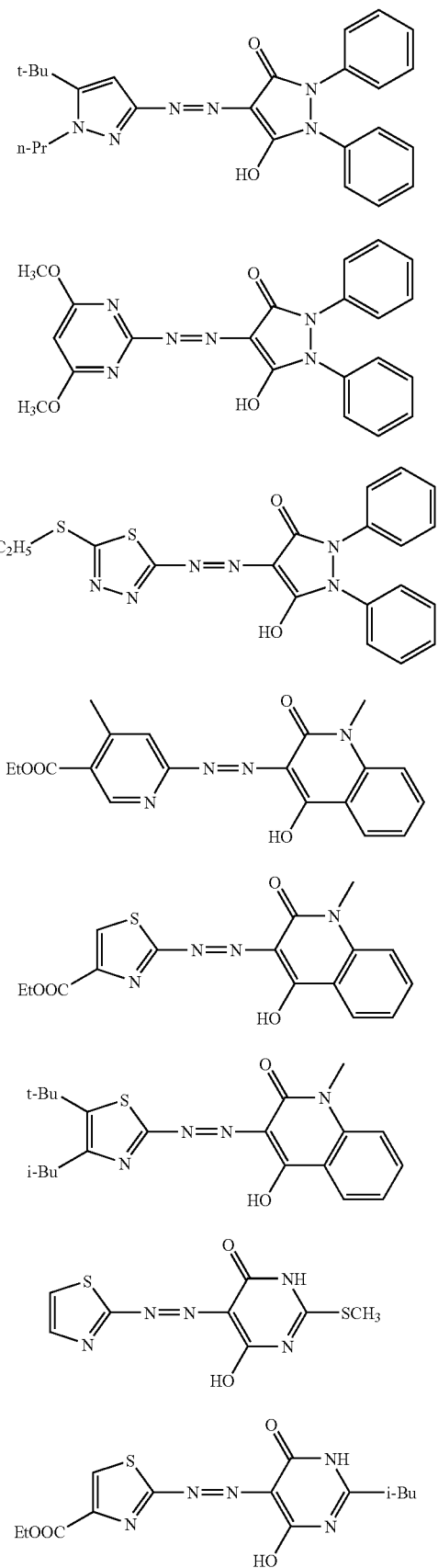

(Metal)

Hereinafter, there will be explained the metal that forms, by coordinating with the azo compound represented by the general formula (I) or general formula (II), the metal-containing cyclic β-diketone azo compound that is a metal complex compound.

As the metal that forms, by coordinating with the azo compound represented by the general formula (I) or general formula (II), the metal-containing cyclic β-diketone azo compound, any kind of metal may be selected without limitation as long as the metal has a capability of coordination with the azo compound. There may be selected a transition element or a representative element, that may have any oxidation number. The ratio between the metal and the azo compound is not particularly limited in the metal-containing cyclic β-diketone azo compound. The complex may contain a charged counter ion besides the azo compound and the metal. The metal may include, for example, a metal selected from Group VIIB, VIIIB, IB and IIB in the periodic table. Among these metals, nickel, cobalt, copper, iron, zinc, manganese, platinum, palladium, and the like are preferably selected.

(Metal Complex Compound)

As mentioned above, the azo compound represented by the general formula (I) or general formula (II) forms a metal complex compound by coordinating with the metal that has a capability of being coordinated with the azo compound. In terms of the easiness of forming the complex, the complex structure formed from the azo compound and the metal is preferably the structure (hexa-coordinated structure) formed by coordination of two azo compounds to one divalent transition metal because the azo compound easily transforms into a tridentate ligand having minus one charge. In particular, a coordinated structure with a divalent transition metal such as nickel, cobalt, copper, iron, zinc, and manganese is preferable. Further, plural kinds of the azo compounds may coordinate to the metal as a ligand to form the metal-containing cyclic β-diketone azo compound. Still further, plural kinds of the metal-containing cyclic β-diketone azo compounds may be contained in the recording layer.

As the metal complex compound, there may be mentioned, for example, the following compounds: a metal complex compound having as a ligand an azo compound composed of a coupler component based on Meldrum's acid and a diazo component selected from isoxazole, benzisoxazole, pyrazole, triazole, imidazole, benzimidazole, thiazole, benzothiazolethiadiazole, and pyridine; a metal complex compound having as a ligand an azo compound composed of a coupler component based on tetronic acid and a diazo component selected from isoxazole, benzisoxazole, pyrazole, triazole, imidazole, benzimidazole, thiazole, benzothiazole, thiadiazole, and pyridine; a metal complex compound having as a ligand an azo compound composed of a coupler component based on hydroxycoumarin and a diazo component selected from isoxazole, benzisoxazole, pyrazole, triazole, imidazole, benzimidazole, thiazole, benzothiazole, thiadiazole, and pyridine; a metal complex compound having as a ligand an azo compound composed of a coupler component based on hydroxycarbostyril and a diazo component selected from isoxazole, benzisoxazole, pyrazole, triazole, imidazole, benzimidazole, thiazole, benzothiazole, thiadiazole, and pyridine; a metal complex compound having as a ligand an azo compound composed of a coupler component based on indandione and a diazo component selected from isoxazole, benzisoxazole, pyrazole, triazole, and benzimidazole; a metal complex compound having as a ligand an azo compound composed of a coupler component based on barbituric acid and a diazo component selected from isoxazole, benzisoxazole, pyrazole, triazole, and benzimidazole; and a metal complex compound having as a ligand an azo compound composed of a coupler component based on thiobarbituric acid and a diazo component selected from isoxazole, benzisoxazole, pyrazole, triazole, and benzimidazole. By selecting appropriately the combination of the diazo component and the coupler component, the wavelength of the absorption band, absorbance, and solubility of the metal complex compound may be conditioned at desired values.

(Optical Recording Medium)

Hereinafter, the optical recording medium to which the present embodiment is applied is explained. The optical recording medium in accordance with the present embodiment has at least a substrate and a recording layer that contains a metal-containing cyclic β-diketone azo compound given by coordinating a metal to an azo compound represented by the general formula (I) or general formula (II) (hereinafter, in some cases simply described as "metal-containing cyclic β-diketone azo compound"). If necessary, an underlying layer, a reflection layer, a protection layer, and others may be further provided.

FIG. 1 shows a first embodiment of an optical recording medium 100 to which the present embodiment (CD-R is shown in the embodiment) is applied. The optical recording medium 100 shown in FIG. 1 has a substrate 10 made of a transparent material and has a guide groove 11 and an information recording layer 20 disposed on the substrate 10. The information recording layer 20 is composed of a recording layer 21 having a reflection layer 22 and a protection layer 23 that are laminated in this order on the recording layer 21. The optical recording medium 100 has a capability of recording and/or reading information by laser light irradiated from the side of the substrate 10. For the convenience of explanation, in the optical recoding medium 100, the side where the protection layer 23 is disposed is called as upper, and the side where the substrate 10 is disposed is called as lower. Each face of each layer corresponding to the foregoing upper and lower directions is called as the upper or lower face of each layer.

(Substrate 10)

For the substrate 10, various kinds of materials can be used as long as the material is basically transparent at the wavelengths of recording light and reading light. Specifically, there may be mentioned resins such as acrylic, methacrylic, polycarbonate, polyolefin (especially, amorphous polyolefin), polyester, polystyrene, epoxy and the like; and glass. In addition, there may be mentioned a structure having a resin layer of a radiation curable resin such as a photo-curable resin on a glass substrate. Among the materials, considering high productivity, cost, moisture resistance and the like, polycarbonate resin used by injection molding is preferable. Considering chemical and moisture resistances, amorphous polyolefin is preferable. Further, considering fast response performance and the like, glass is preferable. In the case where the substrate 10 made of a resin is used or where the substrate 10 having a resin layer on the side (upper side) contacting the recording layer 21 is used, guide grooves or pits for recording and reading light may be formed on the upper face. As the shape of the guide groove, there may be mentioned a concentric ring form and a spiral form having the same center with the optical recording medium 100. In the case of the guide groove having a spiral form, the groove pitch is preferably around 0.2 μm to 1.2 μm.

(Recording Layer 21)

The recording layer 21 is formed directly on the upper side of the substrate 10, or if necessary, on the upper side of an underlying layer and the like disposed on the substrate 10, and contains the metal-containing cyclic β-diketone azo compound given by coordinating metal to an azo compound represented by the general formula (I) or general formula (II). As the method of forming the recording layer 21, there may be mentioned various conventional thin film forming processes including vacuum deposition method, sputtering method, doctor-blade method, casting method, spin-coating method, dipping method, and the like. The spin-coating method is preferred in terms of mass productivity and cost, while the vacuum deposition method or the like is more preferred than coating method in terms of obtaining the recording layer 21 with a uniform thickness. In the case of film forming process using spin-coating, the number of revolutions is preferably 500 rpm to 15,000 rpm. Further, if necessary, after spin-coating, additional treatments such as heating and exposure to solvent vapor may be performed.

In the case of forming the recording layer 21 using the coating process such as doctor-blade coating, casting, spin-coating, and dipping, any coating solvent used to dissolve and coat the metal-containing cyclic β-diketone azo compound on the substrate 10 may be used without any particular limitations as long as the coating solvent does not erode the substrate 10. Specifically, there may be mentioned, for example, ketone alcohols such as diacetone alcohol, 3-hydroxy-3-methyl-2-butanone and the like; cellosolves such as methylcellosolve, ethylcellosolve and the like; linear hydrocarbons such as n-hexane, n-octane and the like; cyclic hydrocarbons such as cyclohexane, methyl cyclohexane, ethyl cyclohexane, dimethyl cyclohexane, n-butyl cyclohexane, tert-butyl cyclohexane, cyclooctane and the like; perfluoroalkylalcohols such as tetrafluoropropanol, octafluoropentanol, hexafluorobutanol and the like; hydroxycarboxylates such as methyl lactate, ethyl lactate, methyl 2-hydroxyisolactate and the like; and others.

In the case of using the vacuum deposition process, for example, recording layer components including the metal-containing cyclic β-diketone azo compound and if necessary other dyes or various kinds of additives are put in a crucible placed in a vacuum chamber; the inside of the vacuum chamber is evacuated to a pressure of $10^{-2}$ Pa to $10^{-5}$ Pa with an appropriate vacuum pump; the crucible is heated to evaporate and deposit the recording layer components on a substrate placed to face the crucible. In this way, the recording layer 21 is formed.

Further, in the recording layer 21, in addition to the metal-containing cyclic β-diketone azo compound, for the purpose of improving stability and light resistance, there may be contained various additives including, for example, a singlet-oxygen quencher such as a transition metal chelate compound (for example, acetylacetonate chelate, bisphenyldithiol, salicylaldehyde-oxime, bisdithio-α-diketone and the like), still further, for the purpose of improving recording sensitivity, there may be contained a recording sensitivity improver such as a metal compound. The metal compound refers to a compound that contains a metal such as a transition metal in the form of atoms, ions, or clusters, including, for example, an organometallic compound such as an ethylenediamine complex, an azomethine complex, a phenylhydroxyamine complex, a phenanthroline complex, a dihydroxyazobenzene complex, a dioxime complex, a nitrosoaminophenol complex, a pyridyltriazine complex, an acetylacetonate complex, a metallocene complex, and a porphyrin complex. The metal atom is not particularly limited, but preferably a transition metal.

In addition, in the recording layer 21, if necessary, plural kinds of the metal-containing cyclic β-diketone azo compounds may be used in combination. Further, besides the metal-containing cyclic β-diketone azo compound, if necessary, the other kinds of dyes may be used in combination. The other kinds of dyes are not particularly limited as long as the dyes have an adequate absorption in the oscillation wavelength range of a laser light used for recording. Further, there may be incorporated in the recording layer 21 together with the metal-containing cyclic β-diketone azo compound, a dye used for CD-R and the like and has an adequate performance for recording and reading using a nearinfrared laser light having an oscillation wavelength in the range of 770 nm to 830 nm, or a dye used for DVD-R and the like and has an adequate performance for recording and reading using a red laser light having an oscillation wavelength in the range of 620 nm to 690 nm. In this way, the optical recording medium 100 that meets the recording and reading using plural kinds of laser lights belonging to different wavelength ranges may be produced.

The other kinds of dyes besides the metal-containing cyclic β-diketone azo compound may include a metal-containing azo dye, a benzophenone dye, a phthalocyanine dye, a naphthalocyanine dye, a cyanine dye, an azo dye, a squarylium dye, a metal-containing indoaniline dye, a triarylmethane dye, a merocyanine dye, an azulenium dye, a naphthoquinone dye, an anthraquinone dye, an indophenol dye, a xanthene dye, an oxazine dye, a pyrilium dye, and the like.

Still further, if necessary, a binder, a leveling agent, a defoaming agent, and the like may be used in combination. A preferable binder may include polyvinylalcohol, polyvinylpyrrolidone, nitrocellulose, cellulose acetate, a ketone resin, an acrylic resin, a polystyrene resin, a urethane resin, polyvinylbutyral, polycarbonate, polyolefin, and the like.

The thickness of the recording layer 21 is not particularly limited because a suitable thickness differs depending on recording methods and others, but is generally at least 1 nm or more and preferably 5 nm or more because a certain thickness is required for recording. However, adequate recording may not be attained when the thickness is too large, so that the thickness is generally 300 nm or less, preferably 200 nm or less, and more preferably 100 nm or less.

The reflection layer 22 is formed on the recording layer 21. The thickness of the reflection layer 22 is preferably 50 nm to 300 nm. As the material for the reflection layer 22, a material having a sufficiently high reflectance at the wavelength of light used for reading may be used. For example, there may be used a metal such as Au, Al, Ag, Cu, Ti, Cr, Ni, Pt, Ta, Pd, and others, solely or as an alloy. Among the metals, Au, Al, and Ag have a high reflectance and are suitable for the reflection layer 22. Further, other materials may be incorporated in the above metals that are used as a main component. Here, the main component is defined as the one that has a content of 50% or more.

The other materials besides the main component may include, for example, a metal or a semimetal such as Mg, Se, Hf, V, Nb, Ru, W, Mn, Re, Fe, Co, Rh, Ir, Cu, Zn, Cd, Ga, In, Si, Ge, Te, Pb, Po, Sn, Bi, Ta, Ti, Pt, Pd, Nd and the like. Among the above other materials, a material containing Ag as a main component is particularly preferable from the viewpoint of low cost, easily providing high reflectance, attaining a clean white ground color when a printing receiving layer mentioned later is disposed, and others.

For example, an alloy containing Ag and 0.1 atom % to 5 atom % of at least one kind of metal selected from Au, Pd, Pt, Cu, and Nd is desirable because the alloy provides high reflectance, high durability, and high sensitivity with low cost. Specifically, for example, there may be mentioned an Ag—Pd—Cu alloy, an Ag—Cu—Au alloy, an Ag—Cu—Au—Nd alloy, an Ag—Cu—Nd alloy, and the like. As a material other than a metal, a multi-layered film given by stacking alternatively a low refraction thin film and a high refraction thin film may be used as the reflection layer 22.

As the method of forming the reflection layer 22, there may be mentioned a process such as sputtering, ion-plating, chemical vapor deposition, vacuum deposition and the like. Further, on the substrate 10 or under the reflection layer 22, for the purpose of increasing reflectance, improving recording performance, and improving adhesion, a known inorganic or organic intermediate or adhesive layer may be disposed.

The protection layer 23 is formed on the reflection layer 22. The material for the protection layer 23 is not particularly limited as long as the material has a capability of protecting the reflection layer 22 against external forces. As an organic material, there may be mentioned a thermoplastic resin, a thermosetting resin, an electron beam curable resin, a UV light curable resin, and the like.

As an inorganic material, there may be mentioned silicon oxide, silicon nitride, $MgF_2$, $SnO_2$, and the like. In the case of using the thermoplastic resin or thermosetting resin, a coating solution prepared by dissolving the resin in an appropriate solvent is coated on the reflection layer 22 and dried to form the protection layer 23. In the case of using the UV light curable resin, the resin is coated as it is on the reflection layer 22, or a coating solution prepared by dissolving the resin in an appropriate solvent is coated on the reflection layer 22, and then the coating is cured by irradiating UV light thereon, so that the protection layer 23 may be formed.

As the UV light curable resin, for example, there may be used an acrylate resin such as urethane acrylate, epoxy acrylate, polyester acrylate and the like. The foregoing materials may be used alone or in a combination of two or more kinds. Further, the protection layer may be a single layer or a multiple layer.

As the method of forming the protection layer 23, similarly to the recording layer 21, a coating process such as spin-coating and casting, sputtering, chemical vapor deposition or the like may be used, and spin-coating is preferable in particular. The thickness of the protection layer 23 is generally 0.1 μm or more and preferably 3 μm or more because a certain thickness is required to provide an adequate protection effect. However, the thickness is generally 100 μm or less and preferably 30 μm or less because, when the protection layer 23 becomes too thick, not only would no change in the protection effect be expected but also disadvantages of high cost or long production time would be possibly brought about.

As a layered structure of the optical recording medium 100, a structure formed by stacking the substrate 10, the recording layer 21, the reflection layer 22, and the protection layer 23 in this order is exemplified as above, but the other layered structures may be employed. For example, on the upper face of the protection layer 23 in the above exemplified structure, or on the upper face of the reflection layer 22 in the case where the protection layer 23 is removed from the above exemplified structure, an additional substrate may be bonded together. The additional substrate may be a bare substrate having no layers thereon or a substrate having an arbitrary layer such as a reflection layer on the bonding face or the opposite face thereof. Furthermore, an optical recording medium having the layered structure exemplified above and an optical recording medium given by removing the protection layer from the layered structure exemplified above may be bonded together in a manner that each upper face of the protection layer and/or reflection layer faces each other.

Hereinafter, a second embodiment of the optical recording medium will be described.

FIG. 2 shows a second embodiment of an optical recording medium 200 to which the present embodiment (an air incident type media is exemplified here) is applied. The portions similar to the optical recording medium 100 according to the first embodiment are represented by the same reference numbers, and the explanations thereof are omitted.

The optical recording medium 200 shown in FIG. 2 has a substrate 30 having a predetermined guide groove 31, and an information recording layer 40 disposed on the substrate 30. In the information recording layer 40, a recording layer 41 and a protection film 43 are laminated in this order on a reflection layer 42. The optical recording medium 200 performs recording and reading of information with a laser light irradiated from the side of the protection film 43.

The protection film 43 may be a film or sheet bonded with an adhesive, or may be formed by coating and curing or drying a film-forming coating solution prepared from the same material as the aforementioned protection layer 23 (FIG. 1). The thickness of the protection film 43 is generally 0.1 μm or more and preferably 3 μm or more because a certain thickness is required to provide an adequate protection effect. However, the thickness is generally 300 μm or less and preferably 200 μm or less because, when the protection film 43 becomes too thick, not only would no change in the protection effect be expected but also disadvantages of high cost or long production time would be possibly brought about. Similar layers used in the aforementioned optical recording medium 100 (FIG. 1) may be used for the each layer such as the recording layer 41 and the reflection layer 42. Note that, in the present layered structure, the substrate 30 is not required to be transparent. Therefore, besides the aforementioned materials, there may be used opaque resins, ceramics, metals (including alloys) and the like. In such layered structure, an arbitrary layer may be interposed between the aforementioned layers as long as the properties in accordance with the present invention are not impaired.

As one of the methods for increasing the recording density of the optical recording media 100 and 200, there may be mentioned a method of increasing the numerical aperture (NA) of an objective lens. The size of a light spot focused on the information recording face may be micronized using this method. However, the increase in the numerical aperture (NA) of the objective lens possibly brings about the increase in the aberration of the light spot caused by the warp and the like of the optical recording media 100 and 200 when laser light is irradiated for recording and reading. Under such conditions, an adequate, stable recording and reading of signals is not attained in some cases. Such aberration tends to become larger as the thickness of the transparent substrate or protection film through which laser light passes becomes larger, so that it is desirable that the substrate or protection film be designed as thin as possible. However, generally, since the substrates 10 and 30 are required to have a certain thickness to assure the mechanical strength of the optical recording media 100 and 200, it is preferable to employ the structure of the optical recording medium 200 (that is, the optical recording medium 200 having a basic layered structure composed of the substrate 30, reflection layer 42, recording layer 41, and protection film 43) in this case. The optical recording medium 200 is preferably used because the thickness of the protection film 43 of the optical recording medium 200 may be reduced more easily as compared with the substrate 10 of the optical recording medium 100.

Note that, even in the structure of the optical recording medium 100 (that is, the optical recording medium 100 having a basic layered structure composed of the substrate 10, recording layer 21, reflection layer 22, and protection layer 23), by reducing to around 50 μm to 300 μm the thickness of the transparent substrate 10, through which a recording and reading laser light passes, the aberration may be reduced to such an extent that the optical recording medium becomes usable. Further, after the other layers are formed, a UV light curable resin layer or an inorganic thin film may be formed on the incident face of a recording and reading laser light (generally, the lower face of the substrate 10) to protect the face or to prevent dust deposition. On a face other than the laser light incident face (generally, the upper face of the reflection layer 22 or protection layer 23), there may be formed a print receiving layer capable of being drawn or printed with various printers such as an ink-jet and a thermal head, or various pens and pencils.

In the optical recording media 100 and 200 in accordance with the present embodiments, the laser light used for recording and reading of information has preferably a wavelength as short as possible to attain high density recording. In particular, a laser light having a wavelength of 350 nm to 530 nm is preferable. As a typical laser light having such wavelength, there may be mentioned laser lights having s center wavelengths of 405 nm, 410 nm, and 515 nm.

The laser light having a wavelength of 350 nm to 530 nm may be obtained by using a high power semiconductor laser light having wavelengths of 405 nm and 410 nm of blue color and a wavelength of 515 nm of blue-green color. Besides the above, the laser light may be also obtained, for example, by converting the wavelength of either of the following oscillating laser light using a second harmonic generator (SHG): (a) a semiconductor laser light having a fundamental oscillation wavelength of 740 nm to 960 nm and a capability of continuous wave oscillation; and (b) a solid-state laser light excited by a semiconductor laser light and has a fundamental oscillation wavelength of 740 nm to 960 nm and a capability of continuous wave oscillation.

Here, as the SHG, any piezo element free from reversal symmetry may be usable, but KDP, ADP, BNN, KN, LBO, compound semiconductors, and the like are preferable. As the specific example of the second harmonic, in the case of a semiconductor laser light having a fundamental wavelength of 860 nm, there may be mentioned 430 nm that is a double-frequency wave, and in the case of the solid-state laser light excited by a semiconductor laser, there may be mentioned 430 nm that is a double-frequency wave generated from a Cr-doped $LiSrAlF_6$ crystal (having a fundamental oscillation wavelength of 860 nm).

When information is recorded in the optical recording media 100 and 200 according to the present embodiments, a laser light focused in around 0.4 μm to 0.6 μm is irradiated, on the recording layer 21 through the substrate 10 from the side of the substrate 10, in the case of the optical recording medium 100, and on the recording layer 41 through the protection film 43 from the side of the protection film 43 in the case of the optical recording medium 200. The portions of the recording layers 21 and 41 that are irradiated by the laser light absorb the energy of the laser light and cause thermal deformation such as decomposition, heat generation, and fusion, resulting in changes in the optical properties. When the information recorded in the recording layers 21 and 41 is read, a laser light having a lower energy is irradiated on the recording layers 21 and 41 (generally, from the same side as in recording). In the recording layers 21 and 41, the difference in reflectance between a portion subjected to a change in optical properties (that is, an information recorded portion) and another portion subjected to no change is read out to read the information.

EXAMPLE

The present embodiments are explained in more detail by the following Examples, but the present embodiments are not limited by the Examples as long as the embodiments are within the scope thereof.
(Synthesis Method)
The method of synthesizing the metal-containing cyclic β-diketone azo compound is not particularly limited, but generally there may be mentioned the following synthesis method. Firstly, a heterocyclic aromatic amine is diazotized in an acidic solution by adding sodium nitrite or nitrosylsulfuric acid, so that a diazo component is synthesized. Secondly, the resulting diazo component is added dropwise at around 0° C. to a solution that dissolves a coupler component to synthesize an azo compound. Subsequently, to a solution dissolving the resulting azo compound in an appropriate solvent, a solution of a metal salt is added dropwise to synthesize a metal complex compound. The following example shows a structure of a metal complex compound having a 2:1 composition of a diazo compound and a divalent metal ion.

[Chemical 39]

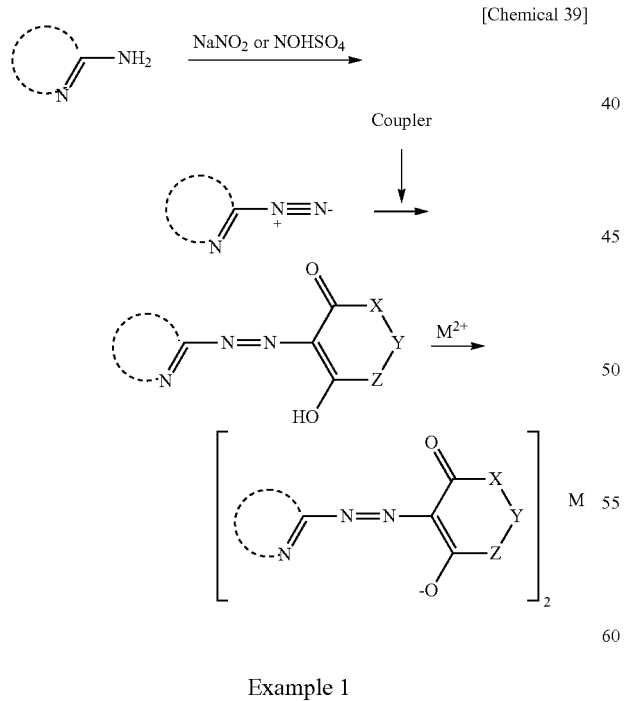

Example 1

(a) Synthesis Example

In a solution containing 25 ml of acetic acid, 8.5 ml of propionic acid, and 1 ml of conc. sulfuric acid, 2.45 g of 3-amino-5-methylisoxazole (0.025 mol, manufactured by Tokyo Chemical Industry Co., Ltd.) represented by the following structural formula (1) were dissolved with stirring and the resulting solution was cooled at 0° C. to 5° C. To this solution, 8.85 g of 43% nitrosyl sulfuric acid was added dropwise, while the temperature of the solution was kept at 10° C. or lower, to prepare a diazo solution. On the other hand, in another vessel, 5 g of 1,3-diethyl-2-thiobarbituric acid (0.025 mol, manufactured by Aldrich Corp.) represented by the following structural formula (2), 7.5 g of sodium acetate, and 1 g of urea were dissolved in 100 ml of methanol and 20 ml of water with stirring. After the pH of the resulting solution was adjusted at 5 with hydrochloric acid, the solution was cooled to 0° C. to 5° C.

[Chemical 40]

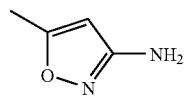

[1]

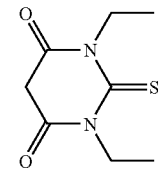

[2]

To this solution, the aforementioned diazo solution was added dropwise at a temperature of 5° C. or lower while the pH was kept at 4 to 5 with a 14% aqueous ammonia. After the addition, the resulting reaction solution was stirred for 30 minutes, and then filtered. The filtered product was suspended in 500 ml of water to remove inorganic salt. After 30-minute stirring, the suspension was filtered. Further, the filtered product was suspended in 200 ml of methanol, and the resulting suspension was stirred and filtered. The filtered product was dried by heating under vacuum to obtain 6.847 g of an azo compound (yield: 88.5%). MS measurement (EI) of the azo compound was done, and the azo compound was confirmed to have m/z=309 that coincided with those of the target compound (example compound (115)).

$^1$H-NMR (CDCl$_3$ (δ=ppm) MHz) of the example compound (115) was measured. The results were: 1.31 (6H, t, 1, 3N—CH$_2$CH$_3$), 2.46 (3H, s, 5'-CH$_3$), 4.55 (4H, m, 1, 3N—CH$_2$CH$_3$), and 6.51 (1H, s, 4'-H). The peaks of the results coincided with those of the objective compound. The example compound (115) exhibited λmax=383.5 nm and a molar absorption coefficient of 3.9×10$^4$ in chloroform. FIG. 3 shows the spectrum of the example compound (115) in solution.

[Chemical 41]

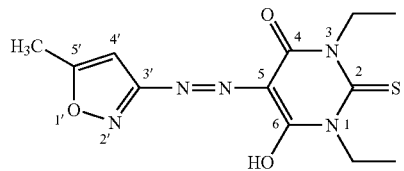

(115)

Next, 1.86 g (0.006 mol) of the example compound (115) was dissolved in 46 ml of tetrahydrofuran with stirring. The resulting solution was filtered to remove insolubles. To the filtrate, a solution dissolving 0.896 g (0.0036 mol) of nickel acetate in 15 ml of methanol was added dropwise. The resulting reaction solution was stirred for 1 hour and vacuum-evaporated with an evaporator, to distill out the solvent and to deposit a solid. To the solid, 50 ml of water was added. The resulting mixture was stirred and filtered. The filtered product was washed with isopropyl ether, and then dried by heating under vacuum to obtain 1.66 g (yield: 81.7%) of a compound represented by the following structural formula (3) (the product obtained was called metal complex compound (1)).

The metal complex compound (1) exhibited $\lambda max=428$ nm and a molar absorption coefficient of $5.4\times10^4$ in chloroform. FIG. 4 shows the spectrum of the metal complex compound (1) in solution.

[Chemical 42]

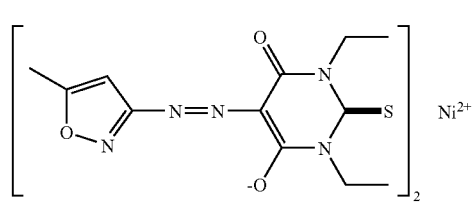

[3]

(b) Evaluation of Optical Recording Medium

The aforementioned metal complex compound (1) was dissolved in octafluoropentanol to obtain a 1 wt % solution. After filtration, the solution was added dropwise on an injection-molded polycarbonate resin substrate disk 0.6 mm thick, 120 mm in diameter to be spin-coated (at 500 rpm). After the coating, the resulting coating was dried at 100° C. for 30 min. The resulting coating film had a maximum absorption wavelength ($\lambda max$) at 427.5 nm. The spectrum of the coating film obtained by coating the metal complex compound (1) is shown in FIG. 5.

A chip of the substrate disk coated with the metal complex compound (1) was irradiated with a Xe lamp of 550 mW at 63° C. for 40 hours, using a light resistance tester (SUNTEST XLS+, manufactured by Toyo Seiki Seisaku-Sho, Ltd.). After that, the absorbance at $\lambda max$ before the Xe lamp irradiation and the absorbance at $\lambda max$ after the Xe lamp irradiation were measured using a UV measuring instrument. The ratio (%) of the absorbance after the Xe lamp irradiation with respect to the absorbance before the Xe lamp irradiation was 55.1%. Note that, the larger the value of the absorbance is, the better the light resistance is.

In addition, on the coating film thus prepared, if necessary, a reflection layer of Ag or the like is formed by sputtering, further a UV light curable resin is coated by spin-coating or the like and cured by UV light irradiation to form a protection layer, so that an optical recording medium may be obtained. The optical recording medium has a recording and reading capability, depending on the $\lambda max$ value of the coating film, for example, with a semiconductor laser light having a center wavelength of 405 nm. Namely, it is found that the metal-containing cyclic β-diketone azo compound has a molecular structure workable for blue laser recording.

(Method of Preparing Optical Recording Media and Example of Recording)

The aforementioned metal complex compound (1) was dissolved in tetrafluoropropanol to obtain a 0.9 wt % solution. After filtration, the resulting solution was added dropwise and spin-coated on an injection molded polycarbonate resin substrate disk 0.6 mm thick, 120 mm in diameter having a track pitch of 400 nm, a groove width of 220 nm, and a groove depth of 60 nm. The spin-coating revolution was increased from 800 rpm to 7,000 rpm in 13 seconds and kept at 7,000 rpm for 2 seconds. Then, the resulting coating was dried at 75° C. for 18 minutes to form a recording layer. After that, a silver alloy was sputtered on the recording layer to form a 120 nm thick reflection layer. Then, a protection coating agent of a UV light curable resin was spin-coated on the disk, and the disk was irradiated with a UV light to form a 5 μm thick protection layer. Still further, using a delayed curing adhesive, another 0.6 mm thick polycarbonate substrate disk was bonded to the face on the protection layer side to prepare an optical recording medium for evaluation.

(c) Example of Recording

While the foregoing optical recording medium for evaluation was rotated at a linear velocity of 6.61 m/sec, a single frequency signal of 8T mark and 8T space was recorded on the groove with a laser light of 405 nm wavelength (the numerical aperture of an objective lens, NA=0.65). Here, T is a fundamental clock frequency corresponding to a frequency of 65 MHz. The recording pulse strategy was as follows: the number of the divided pulses was (n−1) when the mark length was nT; the forefront recording pulse width was 2T; the following recording pulse width was 0.5T; the bias power was 3.0 mW; the reading power was 0.4 mW; and the recording power was variable. As a result, a signal with a modulation degree of 51% was recorded at 7.5 mW. The modulation degree is considered to become larger by optimizing the recording conditions such as the pulse strategy.

Example 2

(a) Synthesis Example

In a solution containing 50 ml of acetic acid, 35 g of phosphoric acid, and 5 g of conc. sulfuric acid, 3.5 g of 2-aminothiazole (0.035 mol, manufactured by Tokyo Chemical Industry Co., Ltd.) represented by the following structural formula (4) was dissolved and the resulting solution was cooled at 0° C. to 5° C. To this solution, 12.39 g of 43% nitrosyl sulfuric acid was added dropwise while the temperature of the solution was kept at 10° C. or lower to prepare a diazo solution. On the other hand, in another vessel, 5.3 g of a compound (1.05 equivalent amount, manufactured by Tokyo Chemical Industry Co., Ltd.) represented by the following structural formula (5), 10.5 g of sodium acetate, and 1.4 g of urea were dissolved in a solution of 140 ml of methanol and 35 ml of water. After the pH of the resulting solution was adjusted at 5 with hydrochloric acid, the solution was cooled to 0° C. to 5° C.

[Chemical 43]

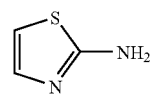

[4]

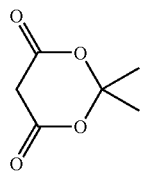

[5]

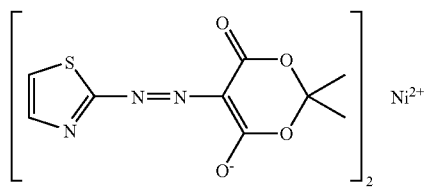

[6]

To this solution, the aforementioned diazo solution was added dropwise at a temperature of 5° C. or lower while the pH was kept at 4 to 5 with a 14% aqueous ammonia. After the addition, the resulting reaction solution was stirred for 30 minutes, and then filtered. The filtered product was suspended in 500 ml of water to remove inorganic salt. After 30-minute stirring, the suspension was filtered. Further, the filtered product was suspended in 150 ml of methanol, and the resulting suspension was stirred and filtered. The filtered product was dried by heating under vacuum to obtain 6.458 g of an azo compound (yield: 72.3%). The azo compound exhibited λmax=384.5 nm and a molar absorption coefficient of 1.7×$10^4$ in chloroform.

The azo compound was subjected to the MS measurement (EI), and was confirmed to have m/z=255 that coincided with an objective compound. The azo compound was subjected to the 1H-NMR measurement (CDCl$_3$ (δ=ppm) MHz). The results were as follows: 1.83 (6H, s, 2, 2-CH$_3$), 7.12 (1H, d, 5'-H), 7.55 (1H, d, 4'-H), and 13.76 (1H, s, 6-OH). The peaks of the results coincided with those of the objective compound (example compound (116)).

[Chemical 44]

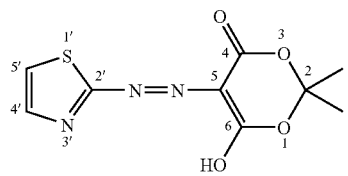

(116)

In 28 ml of tetrahydrofuran, 1.53 g (0.006 mol) of the example compound (116) was dissolved while stirring. The resulting solution was filtered to remove insolubles. To the filtrate, a solution containing 0.9 g (0.0036 mol) of nickel acetate tetrahydrate in 16 ml of methanol was added dropwise. The resulting reaction solution was stirred for 1 hour, and then filtered to separate a product. The resulting solid product was washed with water, and then dried by heating under vacuum to obtain 1.552 g (yield: 91.2%) of a compound represented by the following structural formula (6) (the product obtained was called metal complex compound (2).) The example metal complex compound (141) exhibited λmax=420.5 nm and a molar absorption coefficient of 3.9×$10^4$ in chloroform.

(b) Evaluation of Optical Recording Medium

The aforementioned metal complex compound (2) was dissolved in octafluoropentanol to obtain a 1 wt % solution. After filtration, the solution was added dropwise on an injection-molded polycarbonate resin substrate disk 0.6 mm thick, 120 mm in diameter to be spin-coated. After the coating, the resulting coating was dried at 100° C. for 30 min. The resulting coating film had a maximum absorption wavelength (λmax) at 423.5 nm. The spectrum of the coating film obtained by coating the metal complex compound (2) is shown in FIG. 6.

An optical recording medium was prepared as follows. A chip of the substrate disk coated with the metal complex compound (2) was irradiated with a Xe lamp of 550 mW at 63° C. for 40 hours, using a light resistance tester (SUNTEST XLS+, manufactured by Toyo Seiki Seisaku-Sho, Ltd.) to evaluate light resistance in the same manner as in Example 1. The light resistance was 97.2%.

The aforementioned metal complex compound (2) was dissolved in tetrafluoropropanol to obtain a 0.9 wt % solution. After filtration, the resulting solution was added dropwise and spin-coated on an injection molded polycarbonate resin substrate disk 0.6 mm thick, 120 mm in diameter having a track pitch of 400 nm, a groove width of 220 nm, and a groove depth of 60 nm. The spin-coating revolution was increased from 800 rpm to 7,000 rpm in 13 seconds and kept at 7,000 rpm for 2 seconds. Then, the resulting coating was dried at 75° C. for 18 minutes to form a recording layer. After that, a silver alloy was sputtered on the recording layer to form a 120 nm thick reflection layer. Then, a protection coating agent of a UV light curable resin was spin-coated, irradiated with a UV light to form a 5 μm thick protection layer. Still further, using a delayed curing adhesive, another 0.6 mm thick polycarbonate substrate disk was bonded to the face on the protection layer side to prepare an optical recording medium for evaluation.

(c) Example of Recording

While the foregoing optical recording medium for evaluation was rotated at a linear velocity of 6.61 m/sec, a single frequency signal of 8T mark and 8T space was recorded on the groove with a laser light of 405 nm wavelength (the numerical aperture of an objective lens, NA=0.65). Here, T is a fundamental clock frequency corresponding to a frequency of 65 MHz. The recording pulse strategy was as follows: the number of the divided pulses was (n−1) when the mark length was nT; the forefront recording pulse width was 2T; the following recording pulse width was 0.5T; the bias power was 3.0 mW; the reading power was 0.4 mW; and the recording power was variable. As a result, a signal with a modulation degree of 51% was recorded at 6.5 mW. The modulation degree is considered to become larger by optimizing the recording conditions such as the pulse strategy.

Example 3

(a) Synthesis Example

In 28 ml of tetrahydrofuran, 1.53 g (0.006 mol) of the example compound (116) synthesized in Example 2 was dissolved while stirring. The resulting solution was filtered to remove insolubles. To the filtrate, a solution containing 0.9 g (0.0036 mol) of cobalt acetate in 16 ml of methanol was added dropwise. The resulting reaction solution was stirred for 1 hour, and then filtered to separate a product. The resulting solid product was washed with water, and then dried by heating under vacuum to obtain 1.22 g (yield: 71.6%) of a compound represented by the following structural formula (7). The compound exhibited λmax=417.5 nm and a molar absorption coefficient of $3.3 \times 10^4$ in chloroform (the product obtained was called metal complex compound (3).)

[Chemical 46]

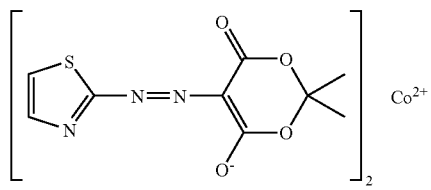

[7]

(b) Evaluation of Optical Recording Medium

The metal complex compound (3) was dissolved in octafluoropentanol to obtain a 1 wt % solution. After filtration, the resulting solution was added dropwise on an injection-molded polycarbonate resin substrate disk 0.6 mm thick, 120 mm in diameter to be spin-coated. After that, the resulting coating was dried at 100° C. for 30 min. The resulting coating film had a maximum absorption wavelength (λmax) at 420.5 nm. The spectrum of the coating film obtained by coating the metal complex compound (3) is shown in FIG. 7.

A chip of the substrate disk coated with the metal complex compound (3) was irradiated with a Xe lamp of 550 mW at 63° C. for 40 hours, using a light resistance tester (SUNTEST XLS+, manufactured by Toyo Seiki Seisaku-Sho, Ltd.) to evaluate light resistance in the same manner as in Example 1. The light resistance was 94.1%.

Method of Preparing Optical Recording Media and Example of Recording

The aforementioned metal complex compound (3) was dissolved in tetrafluoropropanol to obtain a 0.9 wt % solution. After filtration, the resulting solution was added dropwise and spin-coated on an injection molded polycarbonate resin substrate disk 0.6 mm thick, 120 mm in diameter having a track pitch of 400 nm, a groove width of 220 nm, and a groove depth of 60 nm. The spin-coating revolution was increased from 800 rpm to 7,000 rpm in 13 seconds and kept at 7,000 rpm for 2 seconds. Then, the resulting coating was dried at 75° C. for 18 minutes to form a recording layer. After that, a silver alloy was sputtered on the recording layer to form a 120 nm thick reflection layer. Then, a protection coating agent of a UV light curable resin was spin-coated, irradiated with a UV light to form a 5 μm thick protection layer. Still further, using a delayed curing adhesive, another 0.6 mm thick polycarbonate substrate disk was bonded to the face on the protection layer side to prepare an optical recording medium for evaluation.

(c) Example of Recording

While the foregoing optical recording medium for evaluation was rotated at a linear velocity of 6.61 m/sec, a single frequency signal of 8T mark and 8T space was recorded on the groove with a laser light of 405 nm wavelength (the numerical aperture of an objective lens, NA=0.65). Here, T is a fundamental clock frequency corresponding to a frequency of 65 MHz. The recording pulse strategy was as follows: the number of the divided pulses was (n−1) when the mark length was nT; the forefront recording pulse width was 2T; the following recording pulse width was 0.5T; the bias power was 3.0 mW; the reading power was 0.4 mW; and the recording power was variable. As a result, a signal with a modulation degree of 48.4% was recorded at 6.4 mW. The modulation degree is considered to become larger by optimizing the recording conditions such as the pulse strategy.

Examples 4 to 151

By using the synthesis method similarly to the method mentioned above, an example azo compound (115) to an example azo compound (189) were synthesized, and further converted to metal complex compounds. Absorption spectra of coating films prepared similarly to Example 1 were measured. The maximum absorption wavelength and molar absorption coefficient in a solution (chloroform) of the metal complex compounds, and the maximum absorption wavelength of the coating films (octafluoropentanol or tetrafluoropropanol was selected as a coating solvent as appropriate) were measured. Further, the coating films were subjected to the light resistance test. The results are shown in Tables 1 to 7 together with the results of Examples 1 to 3.

TABLE 1

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 1 | 1 | (115) | Ni<br>Ni(CH₃COO)₂•4H₂O | 428 | 5.4 | 427.5 | 55.1 |
| 2 | 2 | (116) | Ni<br>Ni(CH₃COO)₂•4H₂O | 420.5 | 3.9 | 423.5 | 97.2 |
| 3 | 3 | (116) | Co<br>Co(CH₃COO)₂•4H₂O | 417.5 | 3.3 | 420.5 | 94.1 |
| 4 | 4 | (116) | Cu<br>CuCl2 | 398 | 2.6 | 423.5 | 85.4 |

TABLE 1-continued

| Example | Metal complex compound | Ligand (example compound No.) | Coordination metal (used metal salt) | λmax in solution (in CHCl$_3$) | Molar absorption coefficient (×10000) | λmax of coating film | Light resistance (%) |
|---|---|---|---|---|---|---|---|
| 5 | 5 | (117) | Ni Ni(CH$_3$COO)$_2$•4H$_2$O | 407.5 | 2.5 | 413.5 | 54.0 |
| 6 | 6 | (118) | Ni Ni(CH$_3$COO)$_2$•4H$_2$O | 456.5 | 3.6 | 463 | 76.2 |
| 7 | 7 | (118) | Co Co(CH$_3$COO)$_2$•4H$_2$O | 441 | 3.2 | 448.5 | 82.1 |
| 8 | 8 | (119) | Ni Ni(CH$_3$COO)$_2$•4H$_2$O | 473 | 4.0 | 482 | 42.9 |
| 9 | 9 | (120) | Ni Ni(CH$_3$COO)$_2$•4H$_2$O | 439.5 | 3.1 | 452.5 | 77.0 |
| 10 | 10 | (120) | Co Co(CH$_3$COO)$_2$•4H$_2$O | 419.5 | 2.3 | 431.5 | 75.0 |
| 11 | 11 | (121) | Ni Ni(CH$_3$COO)$_2$•4H$_2$O | 416.5 | 2.8 | 433.5 | 84.2 |
| 12 | 12 | (121) | Co Co(CH$_3$COO)$_2$•4H$_2$O | 388 | 3.1 | 392.5 | 87.9 |
| 13 | 13 | (122) | Ni Ni(CH$_3$COO)$_2$•4H$_2$O | 456.6 | 3.3 | 470 | 79.7 |
| 14 | 14 | (122) | Co Co(CH$_3$COO)$_2$•4H$_2$O | 446.5 | 3.1 | 462 | 96.2 |
| 15 | 15 | (123) | Ni Ni(CH$_3$COO)$_2$•4H$_2$O | 445 | 4.5 | 453 | 91.1 |
| 16 | 16 | (123) | Co Co(CH$_3$COO)$_2$•4H$_2$O | 441 | 4.2 | 443 | 89.8 |
| 17 | 17 | (123) | Cu CuCl2 | 444 | 2.4 | 449 | 91.1 |
| 18 | 18 | (124) | Ni Ni(CH$_3$COO)$_2$•4H$_2$O | 429 | 4.2 | 438 | 92.1 |
| 19 | 19 | (124) | Co Co(CH$_3$COO)$_2$•4H$_2$O | 422 | 4.2 | 432.5 | 94.2 |
| 20 | 20 | (125) | Ni Ni(CH$_3$COO)$_2$•4H$_2$O | 422 | 4.3 | 424.5 | 88.0 |
| 21 | 21 | (125) | Co Co(CH$_3$COO)$_2$•4H$_2$O | 418.5 | 4.1 | 422.5 | 97.5 |
| 22 | 22 | (126) | Ni Ni(CH$_3$COO)$_2$•4H$_2$O | 450.5 | 4.2 | 476.5 | 85.8 |

TABLE 2

| Example | Metal complex compound | Ligand (example compound No.) | Coordination metal (used metal salt) | λmax in solution (in CHCl$_3$) | Molar absorption coefficient (×10000) | λmax of coating film | Light resistance (%) |
|---|---|---|---|---|---|---|---|
| 23 | 23 | (127) | Ni Ni(CH$_3$COO)$_2$•4H$_2$O | 405.5 | 3.4 | 409 | 52.6 |
| 24 | 24 | (127) | Cu CuCl2 | 380.5 | 3.2 | 368.5 | 22.4 |
| 25 | 25 | (115) | Co Co(CH$_3$COO)$_2$•4H$_2$O | 421 | 4.9 | 420 | 65.2 |
| 26 | 26 | (115) | Cu CuCl2 | 412.5 | 5.4 | 399.5 | 47.1 |
| 27 | 27 | (115) | Zn ZnSO$_4$•2H$_2$O | 410.5 | 6.3 | 399.5 | 1.7 |
| 28 | 28 | (128) | Ni Ni(CH$_3$COO)$_2$•4H$_2$O | 461.5 | 6.3 | 463 | 81.8 |
| 29 | 29 | (128) | Co Co(CH$_3$COO)$_2$•4H$_2$O | 450.5 | 4.7 | 454.5 | 95.3 |
| 30 | 30 | (129) | Ni Ni(CH$_3$COO)$_2$•4H$_2$O | 412 | 4.3 | 410 | 95.3 |
| 31 | 31 | (129) | Co Co(CH$_3$COO)$_2$•4H$_2$O | 405 | 4.2 | 402.5 | 95.6 |
| 32 | 32 | (130) | Ni Ni(CH$_3$COO)$_2$•4H$_2$O | 432.5 | 4.2 | 438 | 92.5 |
| 33 | 33 | (130) | Co Co(CH$_3$COO)$_2$•4H$_2$O | 426.5 | 3.5 | 427 | 94.6 |
| 34 | 34 | (131) | Ni Ni(CH$_3$COO)$_2$•4H$_2$O | 407.5 | 4.0 | 397 | 91.2 |
| 35 | 35 | (131) | Co Co(CH$_3$COO)$_2$•4H$_2$O | 396.5 | 3.7 | 388 | 90.5 |
| 36 | 36 | (132) | Ni Ni(CH$_3$COO)$_2$•4H$_2$O | 414.5 | 8.5 | 414.5 | 89.0 |

TABLE 2-continued

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 37 | 37 | (132) | Co<br>Co(CH₃COO)₂•4H₂O | 415.5 | 6.8 | 414 | 93.5 |
| 38 | 38 | (133) | Ni<br>Ni(CH₃COO)₂•4H₂O | 430.5 | 3.3 | 432.5 | 45.2 |
| 39 | 39 | (134) | Ni<br>Ni(CH₃COO)₂•4H₂O | 426.5 | 7.6 | 430.5 | 64.2 |
| 40 | 40 | (134) | Co<br>Co(CH₃COO)₂•4H₂O | 424.5 | 6.0 | 433 | 76.2 |
| 41 | 41 | (135) | Ni<br>Ni(CH₃COO)₂•4H₂O | 420.5 | 2.2 | 423 | 43.2 |
| 42 | 42 | (136) | Ni<br>Ni(CH₃COO)₂•4H₂O | 455.5 | 4.0 | 472.5 | 85.8 |
| 43 | 43 | (136) | Co<br>Co(CH₃COO)₂•4H₂O | 439 | 4.3 | 456 | 96.0 |

TABLE 3

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 44 | 44 | (137) | Ni<br>Ni(CH₃COO)₂•4H₂O | 488.5 | 7.3 | 496 | 86.9 |
| 45 | 45 | (138) | Ni<br>Ni(CH₃COO)₂•4H₂O | 432 | 3.3 | 433.5 | 81.4 |
| 46 | 46 | (138) | Co<br>Co(CH₃COO)₂•4H₂O | 424.5 | 3.3 | 433 | 91.0 |
| 47 | 47 | (139) | Ni<br>Ni(CH₃COO)₂•4H₂O | 440 | 3.8 | 443 | 82.9 |
| 48 | 48 | (139) | Co<br>Co(CH₃COO)₂•4H₂O | 425 | 4.0 | 432 | 97.3 |
| 49 | 49 | (132) | Mn<br>Mn(CH₃COO)₂•4H₂O | 415 | 7.1 | 410.5 | 42.7 |
| 50 | 50 | (140) | Ni<br>Ni(CH₃COO)₂•4H₂O | 427.5 | 3.9 | 430 | 76.3 |
| 51 | 51 | (140) | Co<br>Co(CH₃COO)₂•4H₂O | 420.5 | 4.2 | 430.5 | 88.7 |
| 52 | 52 | (141) | Ni<br>Ni(CH₃COO)₂•4H₂O | 436 | 4.7 | 442.5 | 83.9 |
| 53 | 53 | (142) | Ni<br>Ni(CH₃COO)₂•4H₂O | 450.5 | 5.9 | 445.5 | 84.1 |
| 54 | 54 | (143) | Ni<br>Ni(CH₃COO)₂•4H₂O | 433 | 7.4 | 428.5 | 89.3 |
| 55 | 55 | (143) | Co<br>Co(CH₃COO)₂•4H₂O | 423.5 | 6.3 | 420 | 94.6 |
| 56 | 56 | (143) | Cu<br>CuCl2 | 421 | 6.4 | 421 | 71.2 |
| 57 | 57 | (144) | Ni<br>Ni(CH₃COO)₂•4H₂O | 434 | 7.5 | 432.5 | 93.9 |
| 58 | 58 | (144) | Co<br>Co(CH₃COO)₂•4H₂O | 427.5 | 6.5 | 424.5 | 97.3 |
| 59 | 59 | (144) | Cu<br>CuCl2 | 429 | 6.6 | 424.5 | 84.5 |
| 60 | 60 | (145) | Ni<br>Ni(CH₃COO)₂•4H₂O | 423 | 5.4 | 421 | 97.2 |
| 61 | 61 | (145) | Cu<br>CuCl2 | 411 | 5.4 | 412.5 | 79.7 |
| 62 | 62 | (146) | Ni<br>Ni(CH₃COO)₂•4H₂O | 423.5 | 5.6 | 403 | 97.5 |
| 63 | 63 | (146) | Cu<br>CuCl2 | 412 | 5.1 | 400.5 | 92.9 |
| 64 | 64 | (147) | Ni<br>Ni(CH₃COO)₂•4H₂O | 442 | 5.6 | 445.5 | 97.7 |
| 65 | 65 | (147) | Co<br>Co(CH₃COO)₂•4H₂O | 436.5 | 5.0 | 437 | 97.4 |

TABLE 4

| Example | Metal complex compound | Ligand (example compound No.) | Coordination metal (used metal salt) | λmax in solution (in $CHCl_3$) | Molar absorption coefficient (×10000) | λmax of coating film | Light resistance (%) |
|---|---|---|---|---|---|---|---|
| 66 | 66 | (147) | Cu CuCl2 | 439.5 | 5.6 | 447.5 | 94.6 |
| 67 | 67 | (148) | Ni (Ni(CH$_3$COO)$_2$•4H$_2$O | 435 | 7.7 | 429.5 | 94.7 |
| 68 | 68 | (148) | Cu CuCl2 | 424.5 | 4.9 | 426 | 79.5 |
| 69 | 69 | (149) | Ni (Ni(CH$_3$COO)$_2$•4H$_2$O | 392 | 5.6 | 391 | 95.5 |
| 70 | 70 | (149) | Co Co(CH$_3$COO)$_2$•4H$_2$O | 360 | 4.0 | 360.5 | 34.1 |
| 71 | 71 | (149) | Cu CuCl2 | 389 | 3.8 | 389.5 | 79.9 |
| 72 | 72 | (150) | Ni (Ni(CH$_3$COO)$_2$•4H$_2$O | 429.5 | 6.7 | 430 | 72.9 |
| 73 | 73 | (150) | Co Co(CH$_3$COO)$_2$•4H$_2$O | 425 | 6.1 | 425 | 96.0 |
| 74 | 74 | (151) | Ni (Ni(CH$_3$COO)$_2$•4H$_2$O | 420.5 | 7.8 | 420.5 | 77.4 |
| 75 | 75 | (151) | Co Co(CH$_3$COO)$_2$•4H$_2$O | 417 | 6.6 | 418 | 97.4 |
| 76 | 76 | (152) | Ni (Ni(CH$_3$COO)$_2$•4H$_2$O | 449.5 | 5.3 | 451 | 50.6 |
| 77 | 77 | (152) | Co Co(CH$_3$COO)$_2$•4H$_2$O | 447.5 | 5.7 | 449 | 93.5 |
| 78 | 78 | (153) | Ni (Ni(CH$_3$COO)$_2$•4H$_2$O | 446.5 | 8.3 | 447.5 | 80.6 |
| 79 | 79 | (153) | Co Co(CH$_3$COO)$_2$•4H$_2$O | 441 | 6.9 | 443.5 | 97.4 |
| 80 | 80 | (154) | Ni (Ni(CH$_3$COO)$_2$•4H$_2$O | 414 | 9.5 | 405.5 | 71.2 |
| 81 | 81 | (154) | Co Co(CH$_3$COO)$_2$•4H$_2$O | 410 | 8.2 | 398.5 | 95.3 |
| 82 | 82 | (155) | Ni (Ni(CH$_3$COO)$_2$•4H$_2$O | 439.5 | 4.0 | 447.5 | 71.2 |
| 83 | 83 | (155) | Co Co(CH$_3$COO)$_2$•4H$_2$O | 429.5 | 3.8 | 436.5 | 65.8 |
| 84 | 84 | (156) | Ni (Ni(CH$_3$COO)$_2$•4H$_2$O | 458 | 1.8 | 461.5 | 90.0 |
| 85 | 85 | (157) | Ni (Ni(CH$_3$COO)$_2$•4H$_2$O | 452 | 4.4 | 456 | 83.6 |
| 86 | 86 | (158) | Ni (Ni(CH$_3$COO)$_2$•4H$_2$O | 427.5 | 3.5 | 434.5 | 62.7 |
| 87 | 87 | (159) | Ni (Ni(CH$_3$COO)$_2$•4H$_2$O | 454.5 | 3.7 | 457.5 | 76.0 |

TABLE 5

| Example | Metal complex compound | Ligand (example compound No.) | Coordination metal (used metal salt) | λmax in solution (in $CHCl_3$) | Molar absorption coefficient (×10000) | λmax of coating film | Light resistance (%) |
|---|---|---|---|---|---|---|---|
| 88 | 88 | (159) | Co Co(CH$_3$COO)$_2$•4H$_2$O | 433 | 3.3 | 443.5 | 84.7 |
| 89 | 89 | (159) | Cu CuCl2 | 441 | 3.6 | 450.5 | 56.9 |
| 90 | 90 | (160) | Ni Ni(CH$_3$COO)$_2$•4H$_2$O | 421 | 4.3 | 423.5 | 93.6 |
| 91 | 91 | (160) | Co Co(CH$_3$COO)$_2$•4H$_2$O | 418 | 3.8 | 418.5 | 95.6 |
| 92 | 92 | (161) | Ni Ni(CH$_3$COO)$_2$•4H$_2$O | 422 | 4.2 | 422.5 | 92.6 |
| 93 | 93 | (161) | Mn Mn(CH$_3$COO)$_2$•4H$_2$O | 389.5 | 3.4 | 386.5 | 19.1 |
| 94 | 94 | (162) | Ni Ni(CH$_3$COO)$_2$•4H$_2$O | 388 | 3.5 | 382.5 | 98.6 |
| 95 | 95 | (162) | Co Co(CH$_3$COO)$_2$•4H$_2$O | 374.5 | 3.2 | 375.5 | 98.3 |
| 96 | 96 | (163) | Ni Ni(CH$_3$COO)$_2$•4H$_2$O | 411 | 3.5 | 411 | 100.0 |

TABLE 5-continued

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 97 | 97 | (163) | Co Co(CH₃COO)₂•4H₂O | 411 | 3.1 | 411 | 100.0 |
| 98 | 98 | (164) | Ni Ni(CH₃COO)₂•4H₂O | 424 | 4.5 | 425.5 | 90.2 |
| 99 | 99 | (164) | Co Co(CH₃COO)₂•4H₂O | 417 | 4.5 | 424.5 | 96.3 |
| 100 | 100 | (164) | Cu CuCl2 | 419.5 | 3.9 | 424.5 | 79.4 |
| 101 | 101 | (165) | Ni Ni(CH₃COO)₂•4H₂O | 423 | 3.9 | 425.5 | 92.4 |
| 102 | 102 | (165) | Co Co(CH₃COO)₂•4H₂O | 419.5 | 3.7 | 420 | 95.1 |
| 103 | 103 | (166) | Ni Ni(CH₃COO)₂•4H₂O | 425 | 4.3 | 427 | 97.2 |
| 104 | 104 | (166) | Co Co(CH₃COO)₂•4H₂O | 420.5 | 3.7 | 423 | 98.7 |
| 105 | 105 | (166) | Cu CuCl2 | 424.5 | 4.6 | 426 | 85.3 |
| 106 | 106 | (167) | Ni Ni(CH₃COO)₂•4H₂O | 419.5 | 4.3 | 430 | 97.5 |
| 107 | 107 | (168) | Ni Ni(CH₃COO)₂•4H₂O | 391.5 | 3.8 | 393.5 | 96.5 |
| 108 | 108 | (168) | Co Co(CH₃COO)₂•4H₂O | 383 | 3.6 | 384 | 93.9 |
| 109 | 109 | (169) | Ni Ni(CH₃COO)₂•4H₂O | 423.5 | 5.5 | 425.5 | 78.9 |
| 110 | 110 | (170) | Co Co(CH₃COO)₂•4H₂O | 394 | 2.4 | 402 | 88.8 |

TABLE 6

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 111 | 111 | (171) | Co Co(CH₃COO)₂•4H₂O | 395.5 | 3.0 | 394.5 | 91.6 |
| 112 | 112 | (172) | Ni Ni(CH₃COO)₂•4H₂O | 429 | 2.4 | 428 | 81.4 |
| 113 | 113 | (172) | Co Co(CH₃COO)₂•4H₂O | 420.5 | 2.6 | 426 | 95.3 |
| 114 | 114 | (173) | Ni Ni(CH₃COO)₂•4H₂O | 399 | 3.1 | 389 | 81.4 |
| 115 | 115 | (173) | Co Co(CH₃COO)₂•4H₂O | 378 | 3.2 | 375 | 73.6 |
| 116 | 116 | (174) | Ni Ni(CH₃COO)₂•4H₂O | 417 | 2.3 | 423 | 90.3 |
| 117 | 117 | (174) | Co Co(CH₃COO)₂•4H₂O | 397.5 | 1.7 | 418 | 94.2 |
| 118 | 118 | (175) | Ni Ni(CH₃COO)₂•4H₂O | 420 | 3.8 | 426.5 | 87.7 |
| 119 | 119 | (175) | Co Co(CH₃COO)₂•4H₂O | 417 | 4.9 | 407.5 | 94.1 |
| 120 | 120 | (175) | Cu CuCl2 | 421 | 3.9 | 403 | 80.0 |
| 121 | 121 | (176) | Cu CuCl2 | 431.5 | 5.4 | 432.5 | 9.9 |
| 122 | 122 | (177) | Ni Ni(CH₃COO)₂•4H₂O | 412 | 5.3 | 409.5 | 95.0 |
| 123 | 123 | (177) | Co Co(CH₃COO)₂•4H₂O | 405.5 | 4.6 | 414.5 | 99.5 |
| 124 | 124 | (178) | Ni Ni(CH₃COO)₂•4H₂O | 457 | 6.6 | 467.5 | 95.5 |
| 125 | 125 | (179) | Ni Ni(CH₃COO)₂•4H₂O | 462.5 | 4.9 | 472 | 94.0 |
| 126 | 126 | (179) | Co Co(CH₃COO)₂•4H₂O | 457 | 4.7 | 467 | 93.8 |
| 127 | 127 | (180) | Ni Ni(CH₃COO)₂•4H₂O | 431 | 4.8 | 433.5 | 64.5 |

TABLE 6-continued

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 128 | 128 | (180) | Co Co(CH₃COO)₂·4H₂O | 430 | 4.5 | 435.5 | 89.9 |
| 129 | 129 | (180) | Cu CuCl2 | 427 | 4.4 | 432 | 86.0 |
| 130 | 130 | (181) | Ni Ni(CH₃COO)₂·4H₂O | 402 | 4.8 | 409.5 | 87.7 |
| 131 | 131 | (181) | Co Co(CH₃COO)₂·4H₂O | 409 | 5.0 | 407.5 | 92.1 |
| 132 | 132 | (181) | Cu CuCl2 | 407.5 | 5.4 | 404.5 | 72.5 |

TABLE 7

| Example | Metal complex compound | Ligand (example compound No.) | Coordination metal (used metal salt) | λmax in solution (in CHCl₃) | Molar absorption coefficient (×10000) | λmax of coating film | Light resistance (%) |
|---|---|---|---|---|---|---|---|
| 133 | 133 | (182) | Cu CuCl2 | 411.5 | 3.1 | 409 | 96.3 |
| 134 | 134 | (183) | Ni Ni(CH₃COO)₂·4H₂O | 446 | 4.3 | 450.5 | 79.5 |
| 135 | 135 | (183) | Co Co(CH₃COO)₂·4H₂O | 440 | 4.0 | 445 | 97.6 |
| 136 | 136 | (184) | Cu CuCl2 | 447 | 6.3 | 450 | 75.4 |
| 137 | 137 | (185) | Ni Ni(CH₃COO)₂·4H₂O | 470 | 5.1 | 480 | 84.6 |
| 138 | 138 | (185) | Co Co(CH₃COO)₂·4H₂O | 461 | 5.0 | 471.5 | 97.5 |
| 139 | 139 | (185) | Cu CuCl2 | 463 | 4.9 | 472.5 | 86.8 |
| 140 | 140 | (186) | Ni Ni(CH₃COO)₂·4H₂O | 435.5 | 4.1 | 437 | 86.4 |
| 141 | 141 | (186) | Co Co(CH₃COO)₂·4H₂O | 425.5 | 4.0 | 427.5 | 96.2 |
| 142 | 142 | (186) | Cu CuCl2 | 435.5 | 3.7 | 440 | 86.2 |
| 143 | 143 | (187) | Ni Ni(CH₃COO)₂·4H₂O | 466.5 | 5.0 | 476.5 | 64.9 |
| 144 | 144 | (187) | Co Co(CH₃COO)₂·4H₂O | 454.5 | 4.8 | 466.5 | 97.2 |
| 145 | 145 | (187) | Cu CuCl2 | 453.5 | 3.6 | 442.5 | 5.9 |
| 146 | 146 | (188) | Ni Ni(CH₃COO)₂·4H₂O | 463.5 | 4.4 | 470 | 74.9 |
| 147 | 147 | (188) | Co Co(CH₃COO)₂·4H₂O | 448.5 | 3.9 | 458 | 96.0 |
| 148 | 148 | (188) | Cu CuCl2 | 454 | 4.2 | 459.5 | 69.5 |
| 149 | 149 | (189) | Ni Ni(CH₃COO)₂·4H₂O | 453.5 | 5.6 | 464.5 | 48.2 |
| 150 | 150 | (189) | Co Co(CH₃COO)₂·4H₂O | 451.5 | 4.9 | 458 | 93.9 |
| 151 | 151 | (189) | Cu CuCl2 | 438 | 3.4 | 454.5 | 74.2 |

The wavelength of the metal-containing cyclic β-diketone azo compound is determined by the combination of the diazo component, the coupler component, and the metal ion. In the case of selecting the same coupler component and the metal, a compound having a long wavelength may be obtained by using a diazo component having a longer wavelength. Similarly, in the case of selecting the same diazo component and the metal, a metal-containing cyclic β-diketone azo compound having a longer wavelength may be obtained by using a coupler component having a longer wavelength. The wavelength may become longer or shorter depending on the substituents and the like, but generally the following tendency may be drawn within the range of the present Examples.
[Chemical 47]

The tendency may vary depending on the combination with the coupler component or the kinds of metals, but the light resistance roughly depends on the diazo component in many respects. The diazo component such as isoxazole and triazole that has a shorter wavelength is likely to provide a rather lower light resistance, while the diazo component such as thiazole and benzothiazole that has a longer wavelength provides a good light resistance. Therefore, a compound having a large light resistance may be synthesized from a coupler component having a shorter wavelength and a diazo component having a longer wavelength. Besides the aforementioned combinations of the diazo component and coupler component, a compound that meets an objective wavelength may be synthesized by selecting the substituent of the diazo component or selecting the kind of the metals. In this way, for example, the metal-containing cyclic β-diketone azo compounds shown in Table 1 may be used over a wide wavelength range of from 368.5 nm to 482 nm.

In addition, on the coating film thus prepared, if necessary, Ag and the like may be sputtered to form a reflection layer, further a UV light curable resin may be spin-coated and cured by UV light irradiation to form a protection layer. In this way, an optical recording medium may be obtained. The optical recording medium has a recording and reading capability, for example, depending on the λmax value of the coating film, with a semiconductor laser light having a center wavelength of 405 nm. Namely, it is found that the metal-containing cyclic β-diketone azo compound composed of an azo compound represented by the general formula (I) or general formula (II) and metal has a molecular structure workable for blue laser recording.

The results shown in Tables 1 to 7 indicate that the light resistance of the metal complex compound is likely to be affected by the diazo component, the coupler component, or the kind of metal ion. For example, when isoxazole is selected as the diazo component (Examples 1, 5, 8, 23 to 27, 38, and 41), the maximum value of the light resistance is only as large as 65.2%. In the case of Examples 2 and 3 where metal complexes compound having the same coupler component are used, the light resistance exceeds 90%. As opposed to Examples 2 and 3, in the case of Example 8 in which a metal complex compound having a coupler component different from the coupler component used in Examples 2 and 3, the light resistance is only 42.9%. Still further, in the case of Example 25 in which a metal complex compound composed of an azo compound and Co ion is used, the light resistance is 65.2%. As opposed to Example 25, in the case of Example 27 in which a metal complex compound composed of the same azo compound as above and Zn ion is used, the light resistance decreases to 1.7%.

A metal complex compound having a small light resistance may be admixed with another metal complex compound having an adequate light resistance or an organic dye compound and the like used for conventional CD-Rs and others, for example, so that the light resistance may be improved to a practical level required for optical recording media.

Further, the metal complex compound having a small light resistance may be effectively admixed with a compound having a singlet oxygen quenching effect (for example, acetylacetonate chelate, bisphenyldithiol, salicylaldehyde-oxime, bisdithio-α-diketone, and the like).

Comparative Example 1

For comparison, the following compound (8) was synthesized and evaluated in terms of an optical recording medium.

(a) Preparation Example

From 2-amino-6-methylbenzothiazole (manufactured by Tokyo Chemical Industry Co., Ltd.) represented by the following structural formula (8) and 1-n-butyl-3-cyano-4-methyl-6-hydroxy-2-pyridone, the following compound (9) was synthesized. The compound (9) exhibited a λmax of 453.5 nm and a molar absorption coefficient of $3.2 \times 10^4$ in chloroform.

[Chemical 48]

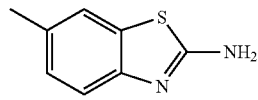

[8]

[Chemical 49]

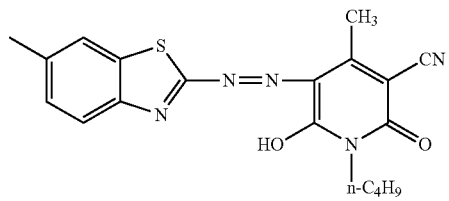

[9]

The compound (9) was subjected to chelation using nickel acetate to obtain the following compound (10). The compound (10) exhibited a λmax at 524 nm and a molar absorption coefficient of $7.4 \times 10^4$ in chloroform.

[Chemical 50]

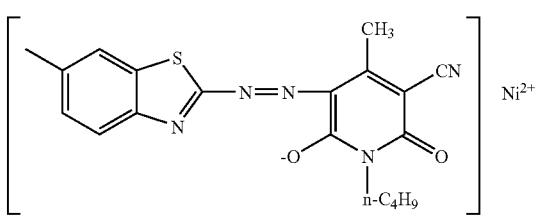

[10]

(b) Example of Optical Recording Medium

The compound (10) was added to octafluoropentanol to prepare a 1 wt % solution, but the compound (10) had a poor solubility and about half of the compound (10) added remained undissolved. After filtration, the resulting solution was added dropwise on an injection molded polycarbonate resin substrate disk 0.6 mm thick, 120 mm in diameter to be spin-coated (500 rpm). The resulting coating was dried at 100° C. for 30 minutes. The resulting coating film had a maximum absorption wavelength (λmax) at 542.5 nm. However, the absorption at a wavelength of 405 nm was quite small. Recording using a laser light having a center wavelength of 405 nm is found not to be expected.

FIG. 8 shows the absorption spectrum of the compound (10). The absorption spectrum is shown together with the spectrum of a nickel compound (Example 15) that used Meldrum's acid as a coupler component. FIG. 8 shows that the compound (10) is not an adequate dye compound for use in recording with a blue laser light, because the compound (10) has a different coupler component even though the compound (10) is a metal-containing azo compound using as the diazo component the same benzothiazole as the complex compound of Example 15 that exhibited a large absorption at 405 nm.

Comparative Example 2

For comparison, the following compound (11) was synthesized and evaluated in terms of an optical recording medium.

69

(a) Preparation Example

In a similar method, 2-amino-5-methyl-1,3,4-thiadiazole (manufactured by Tokyo Chemical Industry Co., Ltd.) was diazotized, and subjected to coupling reaction under the same conditions as in Example 1 to synthesize the following compound (11). The compound (11) exhibited a λmax at 409.5 nm and a molar absorption coefficient of $3.0 \times 10^4$ in chloroform.

[Chemical 51]

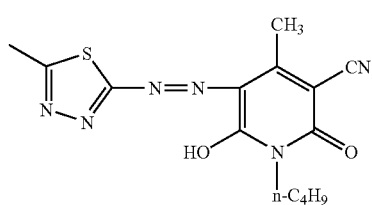

[11]

The compound (11) was subjected to the chelation using nickel acetate in a manner similar to Comparative Example 1 to obtain the following compound (12). The compound (12) exhibited a λmax at 494 nm and a molar absorption coefficient of $7.1 \times 10^4$ in chloroform. FIG. 9 shows the absorption spectrum of the compound (12). The absorption spectrum is shown together with the spectrum of a nickel complex (Example 32) that used barbituric acid as a coupler component. FIG. 9 shows that the compound (12) is not an adequate dye compound for use in recording with a blue laser light as opposed to the metal complex compound of Example 32 that exhibited a large absorption at 405 nm.

[Chemical 52]

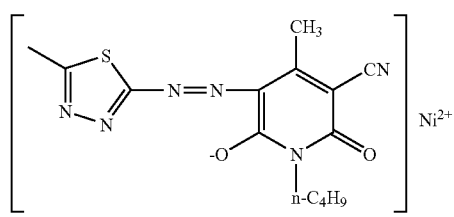

[12]

(b) Example of Optical Recording Medium

The compound (12) was added to octafluoropentanol to prepare a 1 wt % solution, but the compound (12) had a poor solubility and almost all of the compound (12) added remained undissolved. After filtration, the resulting solution was added dropwise on an injection molded polycarbonate resin substrate disk 0.6 mm thick, 120 mm in diameter to be spin-coated (500 rpm). The resulting coating was dried at 100° C. for 30 minutes. Because of the poor solubility, the resulting coating film provided no absorption spectrum.

The above result shows that when the pyridone structure is used as the coupler component, the wavelength becomes long enough even though 1,3,4-thiadiazole is used as the diazo component, so that benzothiazole or thiazole mentioned in the previous section is obviously useless.

70

Comparative Example 3

For comparison, an azo compound was synthesized using a linear β-diketone as the coupler component.

(a) Preparation Example

In a solution containing 6 ml of acetic acid, 2 ml of propionic acid, and 1.3 ml of conc. sulfuric acid, 1.4 g of 2-amino-4-methylthiazole (0.013 mol, manufactured by Tokyo Chemical Industry Co., Ltd.) represented by the following structural formula (13) was dissolved while stirring, and the resulting solution was cooled at 0° C. to 5° C. To this solution, 4.6 g of 43% nitrosyl sulfuric acid was added dropwise while the temperature of the solution was kept at 10° C. or lower to prepare a diazo solution.

On the other hand, in another vessel, 2.8 g of thenoyltrifluoroacetone (1 equivalent amount, manufactured by Tokyo Chemical Industry Co., Ltd.), 4.3 g of sodium acetate, and 0.43 g of urea were dissolved in a solution of 50 ml of methanol and 5 ml of water. After the pH of the resulting solution was adjusted at 11 with a 20% aqueous NaOH solution, the solution was cooled at 0° C. to 5° C. To the solution, the foregoing diazo solution was added dropwise at a temperature of 5° C. or lower while the pH was kept at 10 with an aqueous ammonia. After the addition was over, the resulting solution was stirred for 30 minutes, and then filtered. The resulting filtrate was poured into water and the resulting solution was acidified by adding conc. hydrochloric acid dropwise to deposit a reaction product. The reaction product was filtered, washed with water, and dried by heating under vacuum to obtain 0.96 g of a compound represented by the following chemical formula (15) with a yield of 21%.

FIG. 10 shows the absorption spectrum of the compound represented by the chemical formula (15). The compound represented by the chemical formula (15) has a λmax at 399.5 nm and a molar absorption coefficient of $1.0 \times 10^4$ in chloroform. As is shown, the yield of the compound represented by the chemical formula (15) is low and the molar absorption coefficient is also low.

[Chemical 53]

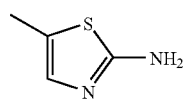

[13]

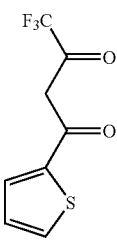

[14]

[Chemical 54]

[15]

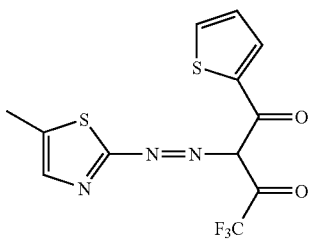

Comparative Example 4

For comparison, the following compound (16) that has a comparable absorption at λmax was evaluated in terms of an optical recording medium.

The cyanine dye (trade name: NK-1204, manufactured by Nippon Kanko Shikiso Kenkyusho Co., Ltd.) represented by the following structural formula (16) exhibited a λmax at 407.5 nm and a molar absorption coefficient of $8.2 \times 10^4$ in chloroform. FIG. 11 shows the spectrum of the compound in solution.

[Chemical 55]

[16]

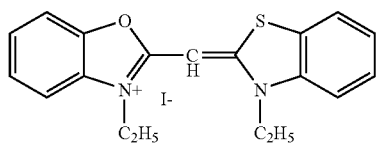

The compound (16) was dissolved in octafluoropentanol to prepare a 1 wt % solution, which was then filtered. The resulting solution was added dropwise and spin-coated (500 rpm) on an injection-molded polycarbonate resin substrate disk 0.6 mm thick, 120 mm in diameter. The coating was dried at 100° C. for 30 minutes. The resulting coating film had a maximum absorption wavelength ($\lambda_{max}$) at 371.5 nm. FIG. 12 shows the spectrum of the coating film.

As is clear when the spectrum is compared with the spectrum in solution shown in FIG. 11, the spectrum of the coating film is extremely deformed. This deformation is possibly caused by partial crystallization of the coating on the surface of the substrate disk, although the crystallization was not observed by visual inspection.

A chip of the substrate disk coated with the cyanine dye was subjected to the evaluation of absorption ratio at λmax (light resistance) similarly to Example 1. The light resistance was 18%.

Comparative Example 5

For similar comparison, the following compound (17) was evaluated in terms of an optical recording medium.

The compound 2-[2-furan-2-yl]vinyl]-4,6-bis(trichloromethyl)-1,3,5-triazine (manufactured by Tokyo Chemical Industry Co., Ltd.) represented by the following formula (17) exhibited a λmax at 375 nm in chloroform and the molar absorption coefficient of $3.5 \times 10^4$.

[Chemical 56]

[17]

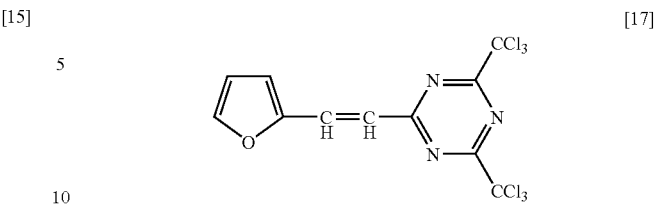

The compound (17) was dissolved in methyl lactate to prepare a 1 wt % solution, which was then filtered. The resulting solution was added dropwise and spin-coated (500 rpm) on an injection-molded polycarbonate resin substrate disk 0.6 mm thick, 120 mm in diameter. The coating was dried at 100° C. for 30 minutes. The surface of the substrate disk became clouded by crystallization. A spectrum adequate for evaluation was not obtained.

As is clear from the results of comparative Examples 4 and 5, even though dyes exhibit absorption in a similar range of wavelength, the film forming capability or light resistance thereof required for an optical recording medium is greatly different. Generally, crystallization in the course of forming the coating film is likely to develop remarkably as the molecule becomes smaller or the molecule has a higher planarity in the molecular structure. The metal-containing azo complex compound used in Examples of the present invention is composed of two molecules of an azo dye and one metal ion, having a sterically-bulky molecular structure, thereby seems to have characteristics less liable to crystallize on the surface of the substrate. In addition, a higher light resistance may be provided by forming the complex than by using the azo dye alone. As mentioned above, it is quite obvious that the present invention provides an extremely useful dye for an optical recording medium.

As mentioned above, it is shown that, as the coupler component, a cyclic β-diketone structure has a higher yield and provides a compound having a larger molar absorption coefficient than a linear β-diketone structure. This may be attributed to the following reasons: when the coupler component has a ring structure, the active methylene group that serves as a reactive site is fixed and provides a higher reactivity; the reaction product has a tendency of getting a more planar structure and allows the conjugated system to extend more easily; and others.

Example 152

The optical recording medium obtained in Example 1 was subjected to PRSNR (Partial Response SNR) evaluation in accordance with the HD DVD-R standard Ver1.0 defined by DVD Forum for evaluating the recording and reading performance of optical recording media.

The optical recording medium obtained was recorded at a linear velocity of 6.61 m/s and a shortest mark length of 204 nm using a tester (ODU-1000, manufactured by Pulsetech Corp.) having a laser wavelength of 405 nm and a NA (numerical aperture) of 0.65. The recording power was optimized to obtain a maximum value of PRSNR.

The results were as follows: the recording mechanism was of the Low-To-High type; and the optimized recording power was 7.8 mW. The PRSNR value of the optical recording medium was 32.8, which exceeded substantially the standard PRSNR value of 15.

Examples 153 to 198

Optical recording media were prepared under the same conditions as in Example 152 except that the compounds shown in Tables 8 to 10 were used as dyes, and were evaluated in the same method as in Example 152. Here, recording sensitivity or recording characteristics depend on the thickness of a thin layer of the dye or the recording method, so that the concentration of the coating solution (0.9 wt % to 1.2 wt %), the spin-coating program, the groove shape of the substrate disk, the recording pulse width, and others were optimized to obtain an adequate recording performance.

The optimized recording power and the value of PRSNR of Examples 153 to 198 are shown in Tables 8 to 10 together with the results of Example 152. As is clear from the results shown in Tables 8 to 10, many Examples clear the HD and DVD-R standard of the recording sensitivity of 10 mW or lower and PRSNR=15. In addition, the recording mechanism was of the Low-To-High type.

TABLE 8

| Example | Metal complex compound | Ligand (example compound No.) | Coordination metal (used metal salt) | Sensitivity (mW) | PRSNR |
|---|---|---|---|---|---|
| 152 | 1 | (115) | Ni $Ni(CH_3COO)_2 \cdot 4H_2O$ | 7.8 | 32.8 |
| 153 | 2 | (116) | Ni $Ni(CH_3COO)_2 \cdot 4H_2O$ | 6.7 | 32.7 |
| 154 | 3 | (116) | Co $Co(CH_3COO)_2 \cdot 4H_2O$ | 6.5 | 27.1 |
| 155 | 6 | (118) | Ni $Ni(CH_3COO)_2 \cdot 4H_2O$ | 10.6 | 14.5 |
| 156 | 7 | (118) | Co $Co(CH_3COO)_2 \cdot 4H_2O$ | 8.8 | 21.9 |
| 157 | 15 | (123) | Ni $Ni(CH_3COO)_2 \cdot 4H_2O$ | 6.2 | 19.9 |
| 158 | 16 | (123) | Co $Co(CH_3COO)_2 \cdot 4H_2O$ | 6.3 | 19.8 |
| 159 | 33 | (130) | Co $Co(CH_3COO)_2 \cdot 4H_2O$ | 9.2 | 27.8 |
| 160 | 36 | (132) | Ni $Ni(CH_3COO)_2 \cdot 4H_2O$ | 9.3 | 16.7 |
| 161 | 39 | (134) | Ni $Ni(CH_3COO)_2 \cdot 4H_2O$ | 10.1 | 26.6 |
| 162 | 52 | (141) | Ni $Ni(CH_3COO)_2 \cdot 4H_2O$ | 9.2 | 15 |
| 163 | 54 | (143) | Ni $Ni(CH_3COO)_2 \cdot 4H_2O$ | 9.2 | 18.7 |
| 164 | 55 | (143) | Co $Co(CH_3COO)_2 \cdot 4H_2O$ | 8.2 | 21 |
| 165 | 56 | (143) | Cu CuCl2 | 6.2 | 37.3 |
| 166 | 57 | (144) | Ni $Ni(CH_3COO)_2 \cdot 4H_2O$ | 9.2 | 27.2 |
| 167 | 58 | (144) | Co $Co(CH_3COO)_2 \cdot 4H_2O$ | 9.6 | 21.3 |
| 168 | 59 | (144) | Cu CuCl2 | 6.2 | 27.5 |
| 169 | 60 | (145) | Ni $Ni(CH_3COO)_2 \cdot 4H_2O$ | 8.5 | 21.5 |
| 170 | 61 | (145) | Cu CuCl2 | 6.8 | 25.7 |
| 171 | 63 | (146) | Cu CuCl2 | 6.8 | 35 |
| 172 | 67 | (148) | Ni $Ni(CH_3COO)_2 \cdot 4H_2O$ | 10.5 | 20.8 |
| 173 | 68 | (148) | Cu CuCl2 | 7.6 | 23.2 |

TABLE 9

| Example | Metal complex compound | Ligand (example compound No.) | Coordination metal (used metal salt) | Sensitivity (mW) | PRSNR |
|---|---|---|---|---|---|
| 174 | 78 | (153) | Ni $Ni(CH_3COO)_2 \cdot 4H_2O$ | 8.6 | 16.5 |
| 175 | 79 | (153) | Co $Co(CH_3COO)_2 \cdot 4H_2O$ | 8.8 | 19.2 |
| 176 | 81 | (154) | Co $Co(CH_3COO)_2 \cdot 4H_2O$ | 9.5 | 23.9 |
| 177 | 82 | (155) | Ni $Ni(CH_3COO)_2 \cdot 4H_2O$ | 8 | 21.8 |

TABLE 9-continued

| Example | Metal complex compound | Ligand (example compound No.) | Coordination metal (used metal salt) | Sensitivity (mW) | PRSNR |
|---|---|---|---|---|---|
| 178 | 83 | (155) | Co<br>$Co(CH_3COO)_2 \cdot 4H_2O$ | 7.9 | 25.4 |
| 179 | 85 | (157) | Ni<br>$Ni(CH_3COO)_2 \cdot 4H_2O$ | 7.8 | 13.5 |
| 180 | 87 | (159) | Ni<br>$Ni(CH_3COO)_2 \cdot 4H_2O$ | 10 | 16.6 |
| 181 | 88 | (159) | Co<br>$Co(CH_3COO)_2 \cdot 4H_2O$ | 9.4 | 20.5 |
| 182 | 90 | (160) | Ni<br>$Ni(CH_3COO)_2 \cdot 4H_2O$ | 6.9 | 27.5 |
| 183 | 103 | (166) | Ni<br>$Ni(CH_3COO)_2 \cdot 4H_2O$ | 6.8 | 30.8 |
| 184 | 105 | (166) | Cu<br>CuCl2 | 6.2 | 34.5 |
| 185 | 118 | (175) | Ni<br>$Ni(CH_3COO)_2 \cdot 4H_2O$ | 9.1 | 23.7 |
| 186 | 121 | (176) | Cu<br>CuCl2 | 8.5 | 12 |
| 187 | 126 | (179) | Co<br>$Co(CH_3COO)_2 \cdot 4H_2O$ | 9 | 18.2 |
| 188 | 127 | (180) | Ni<br>$Ni(CH_3COO)_2 \cdot 4H_2O$ | 8.6 | 19.7 |
| 189 | 128 | (180) | Co<br>$Co(CH_3COO)_2 \cdot 4H_2O$ | 9.2 | 18.4 |
| 190 | 129 | (180) | Cu<br>CuCl2 | 7.8 | 21.7 |
| 191 | 130 | (181) | Ni<br>$Ni(CH_3COO)_2 \cdot 4H_2O$ | 8.2 | 15.8 |
| 192 | 131 | (181) | Co<br>$Co(CH_3COO)_2 \cdot 4H_2O$ | 9 | 17.4 |
| 193 | 132 | (181) | Cu<br>CuCl2 | 9.5 | 21 |
| 194 | 136 | (184) | Cu<br>CuCl2 | 8.2 | 23.8 |
| 195 | 137 | (185) | Ni<br>$Ni(CH_3COO)_2 \cdot 4H_2O$ | 10 | 12 |

TABLE 10

| Example | Metal complex compound | Ligand (example compound No.) | Coordination metal (used metal salt) | Sensitivity (mW) | PRSNR |
|---|---|---|---|---|---|
| 196 | 138 | (185) | Co<br>$Co(CH_3COO)_2 \cdot 4H_2O$ | 10 | 20 |
| 197 | 139 | (185) | Cu<br>CuCl2 | 9.5 | 15.7 |
| 198 | 148 | (188) | Cu<br>CuCl2 | 9.5 | 14.3 |

The values of the recording sensitivity and recording characteristics may vary with the structure of dyes, the spectral form, the onset temperature of thermal decomposition of dyes, the kind of metal forming the complex, and others. For example, when Example 153 is compared with Example 157 that used the same coupler component but has absorption shifted to a longer wavelength, Example 157 yielded a lower PRSNR value. Considering the above results, the recording performance is likely to be lowered when the λmax of the coating film of dyes departs substantially from 405 nm. This is because the recording principle is based on the Low-To-High type, and a certain degree of absorption is required at the recording wavelength. Therefore, it is obvious that a coupler component providing absorption at shorter wavelength is required to enhance the recording performance.

DESCRIPTION OF REFERENCE NUMERALS AND SIGNS

Figure 1:
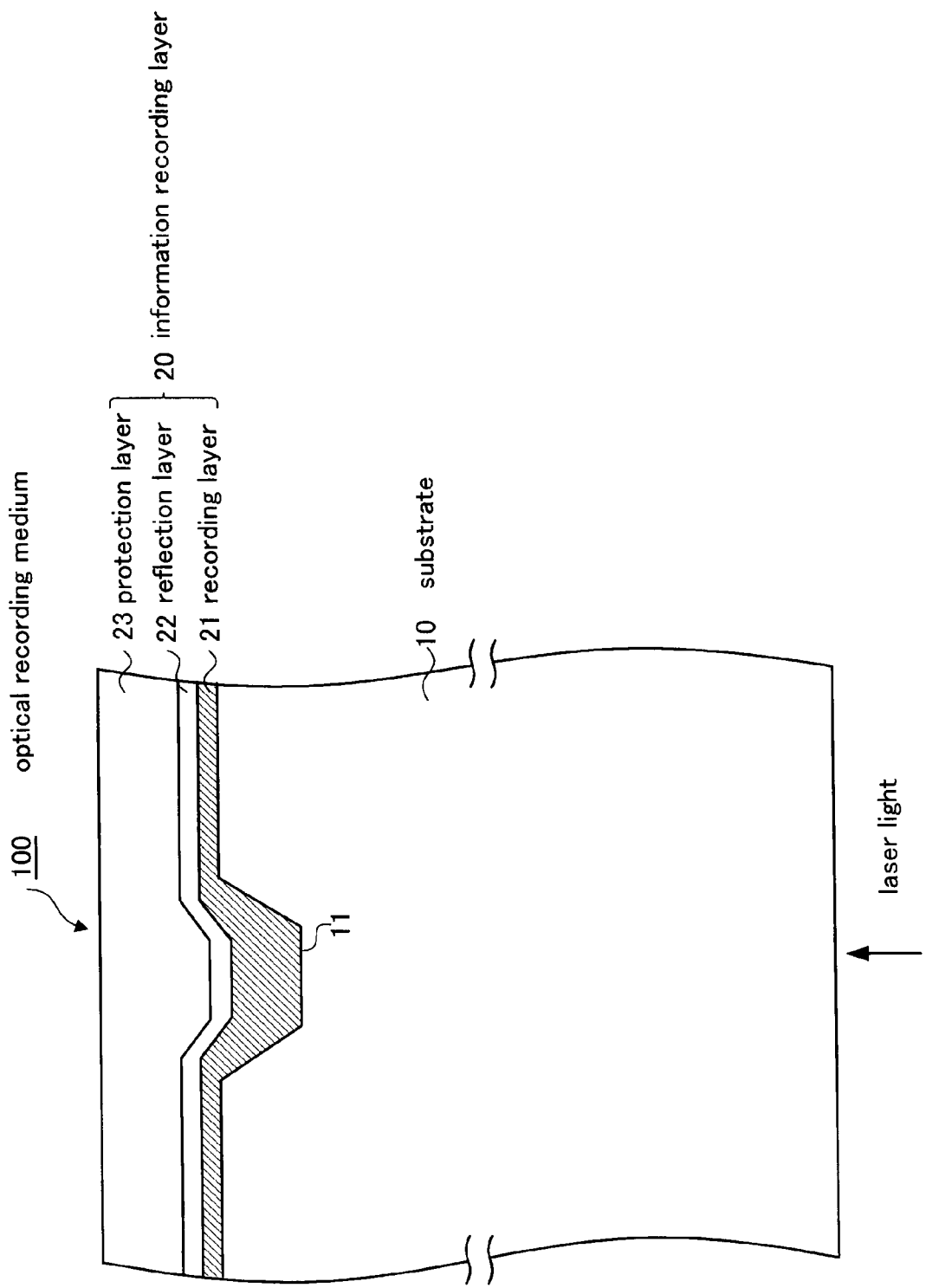
FIG. 1 is a view for explaining a first embodiment of an optical recording medium (CD-R) to which the present embodiment is applied.
Figure 2:
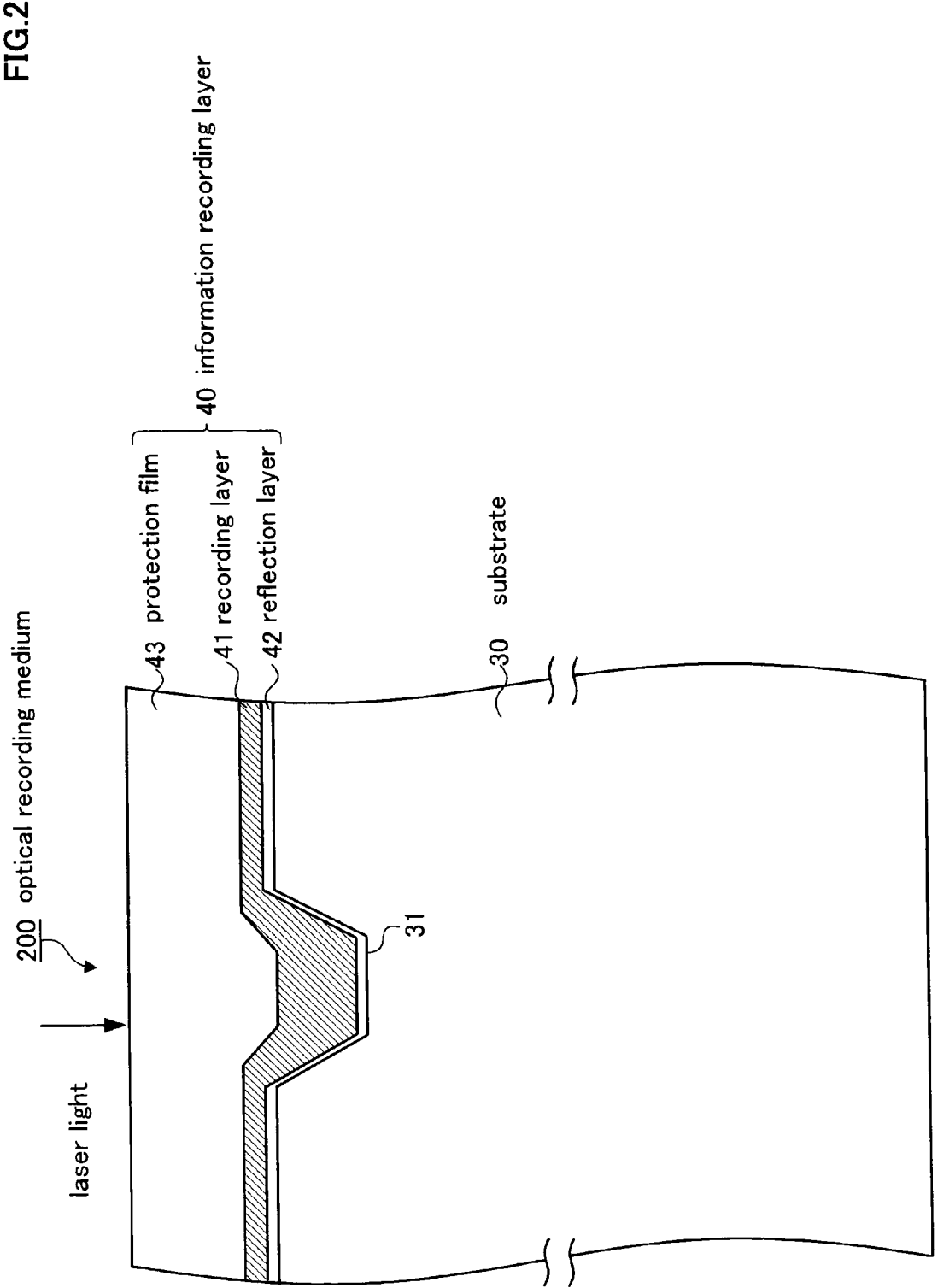
FIG. 2 is a view for explaining a second embodiment of an optical recording medium (an air incident type media) to which the present embodiment is applied.
Figure 3:
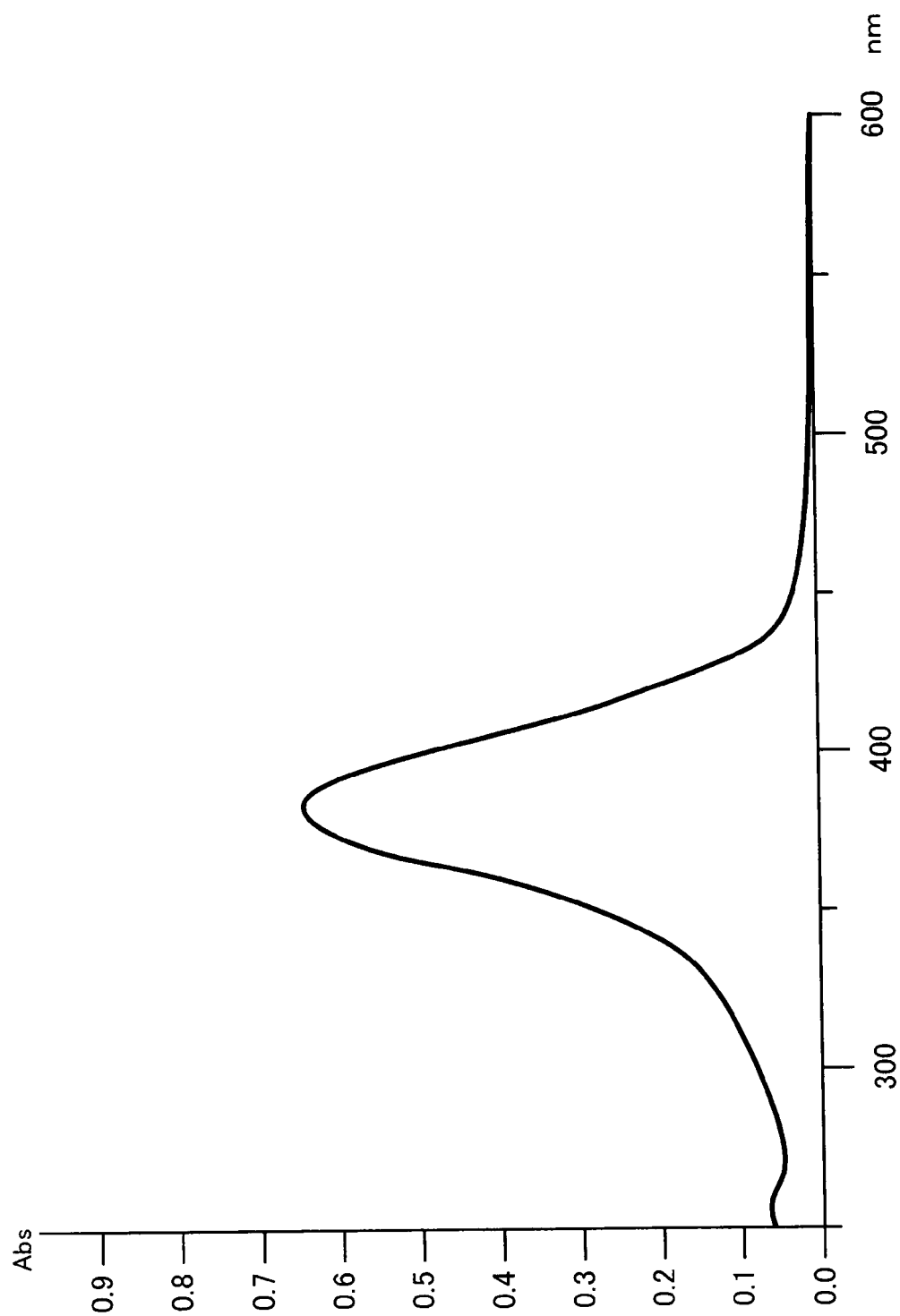
FIG. 3 shows the spectrum of the example compound (115) in solution.
Figure 4:
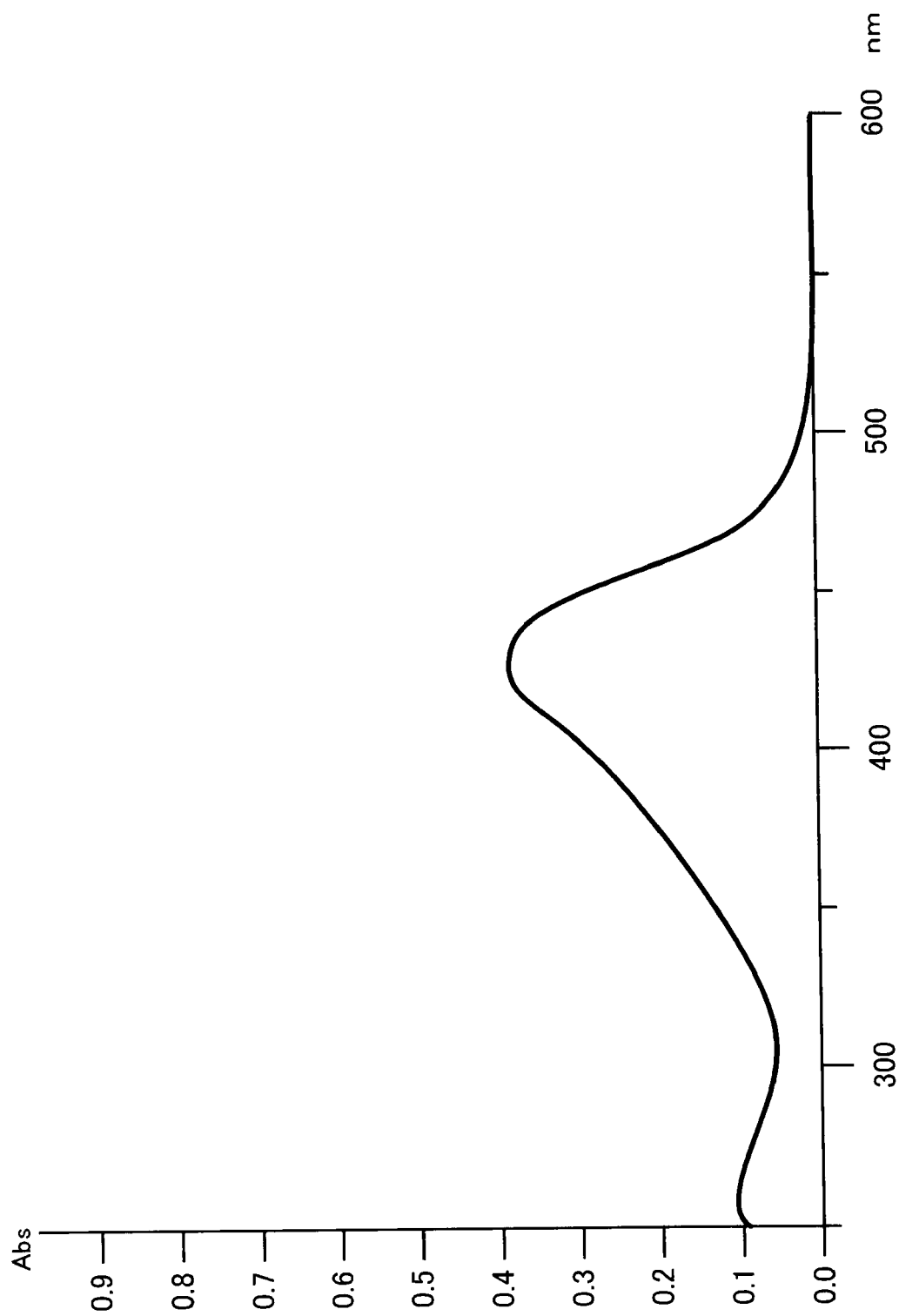
FIG. 4 shows the spectrum of the metal complex compound (1) in solution.
Figure 5:
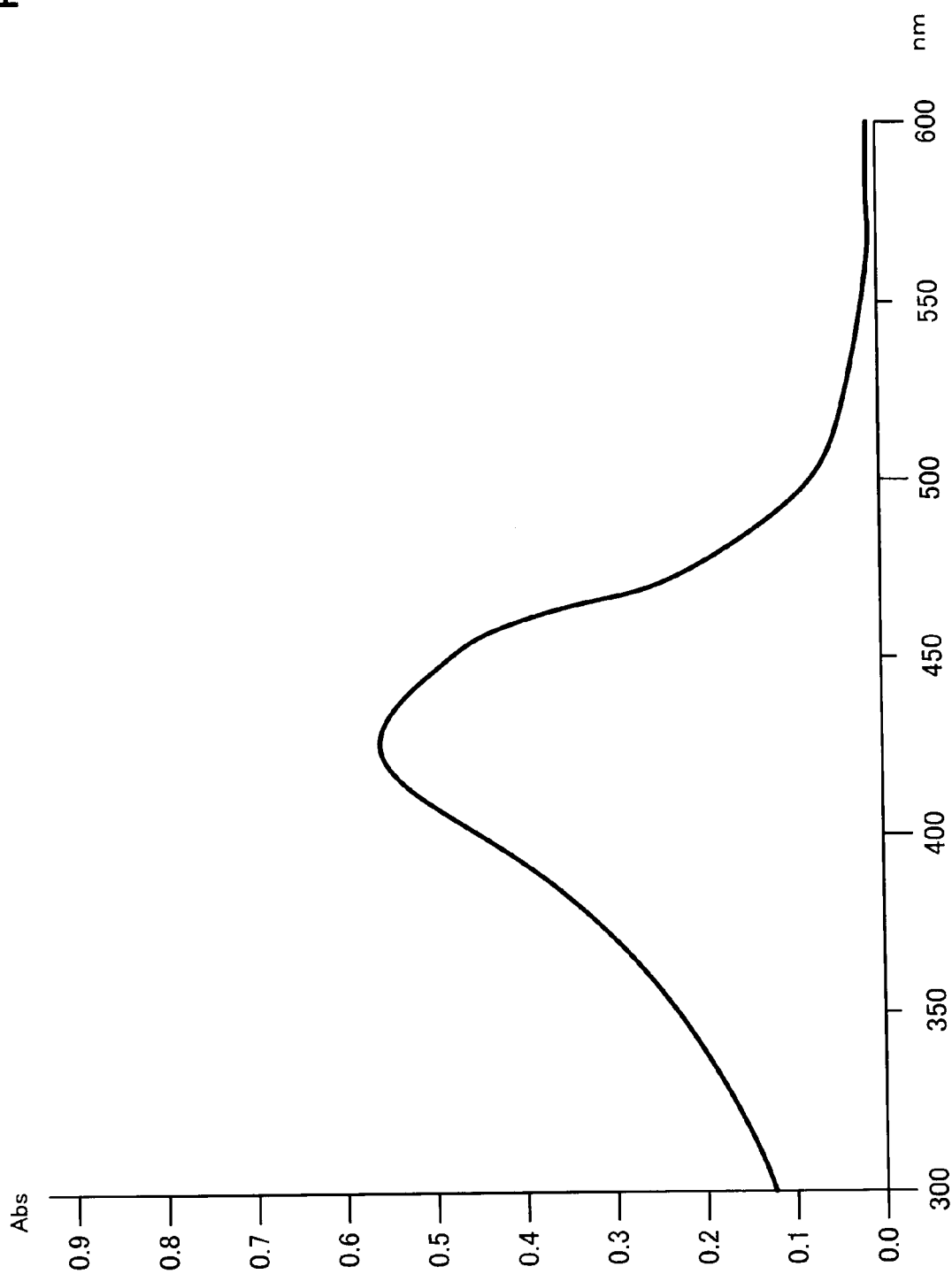
FIG. 5 shows the spectrum of the coating film obtained by coating the metal complex compound (1).
Figure 6:
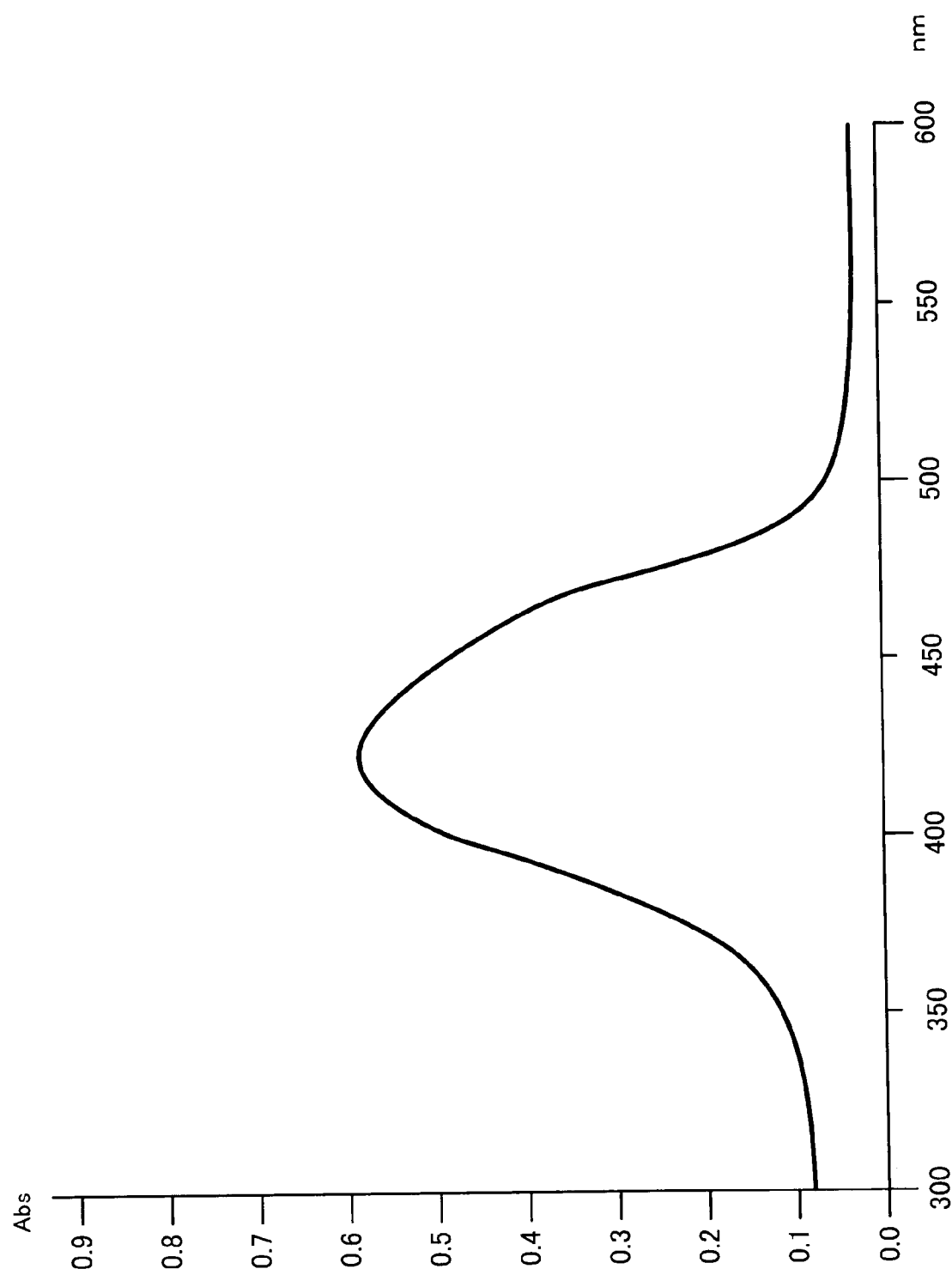
FIG. 6 shows the spectrum of the coating film obtained by coating the metal complex compound (2).
Figure 7:
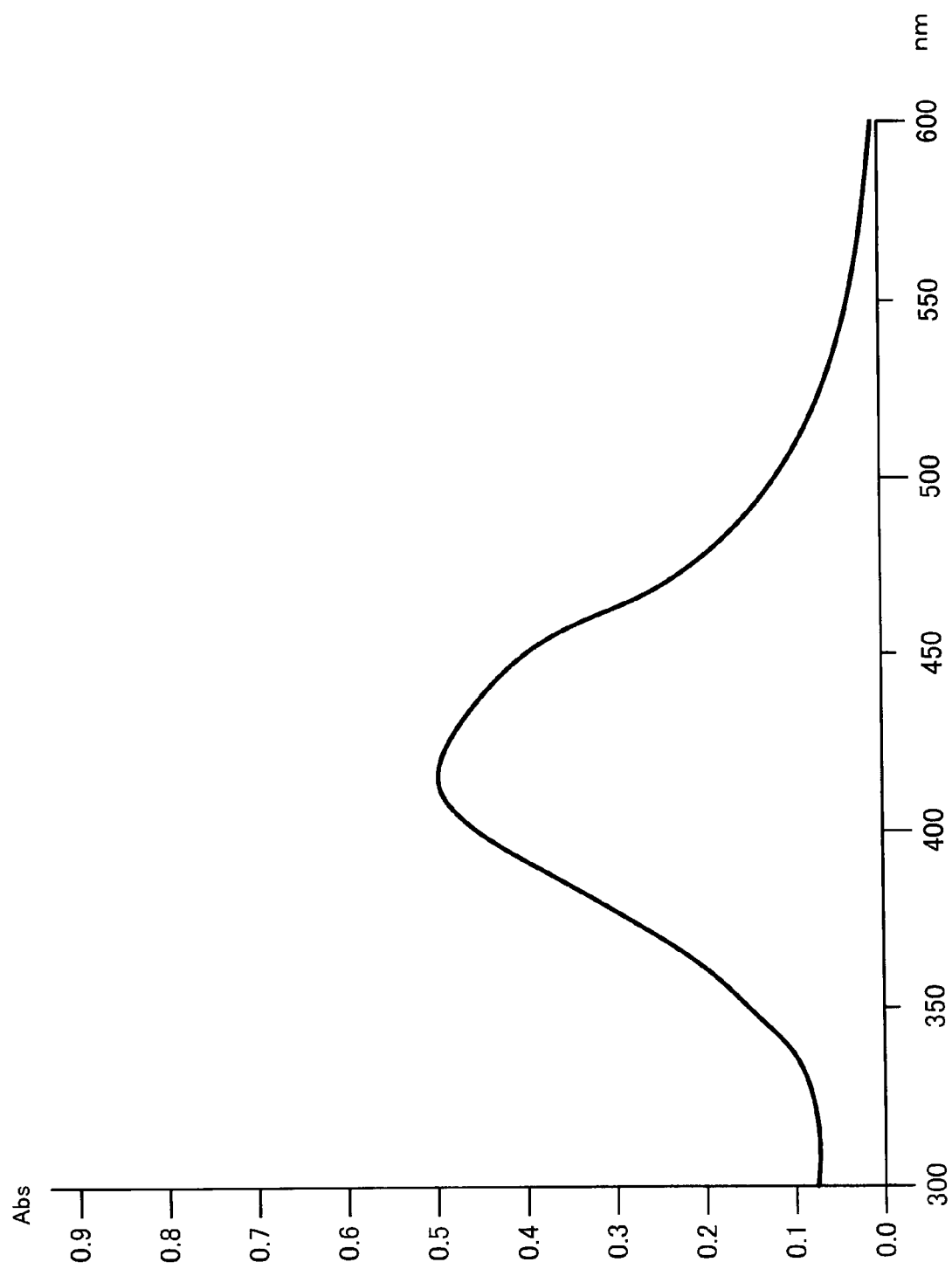
FIG. 7 shows the spectrum of the coating film obtained by coating the metal complex compound (3).
Figure 8:
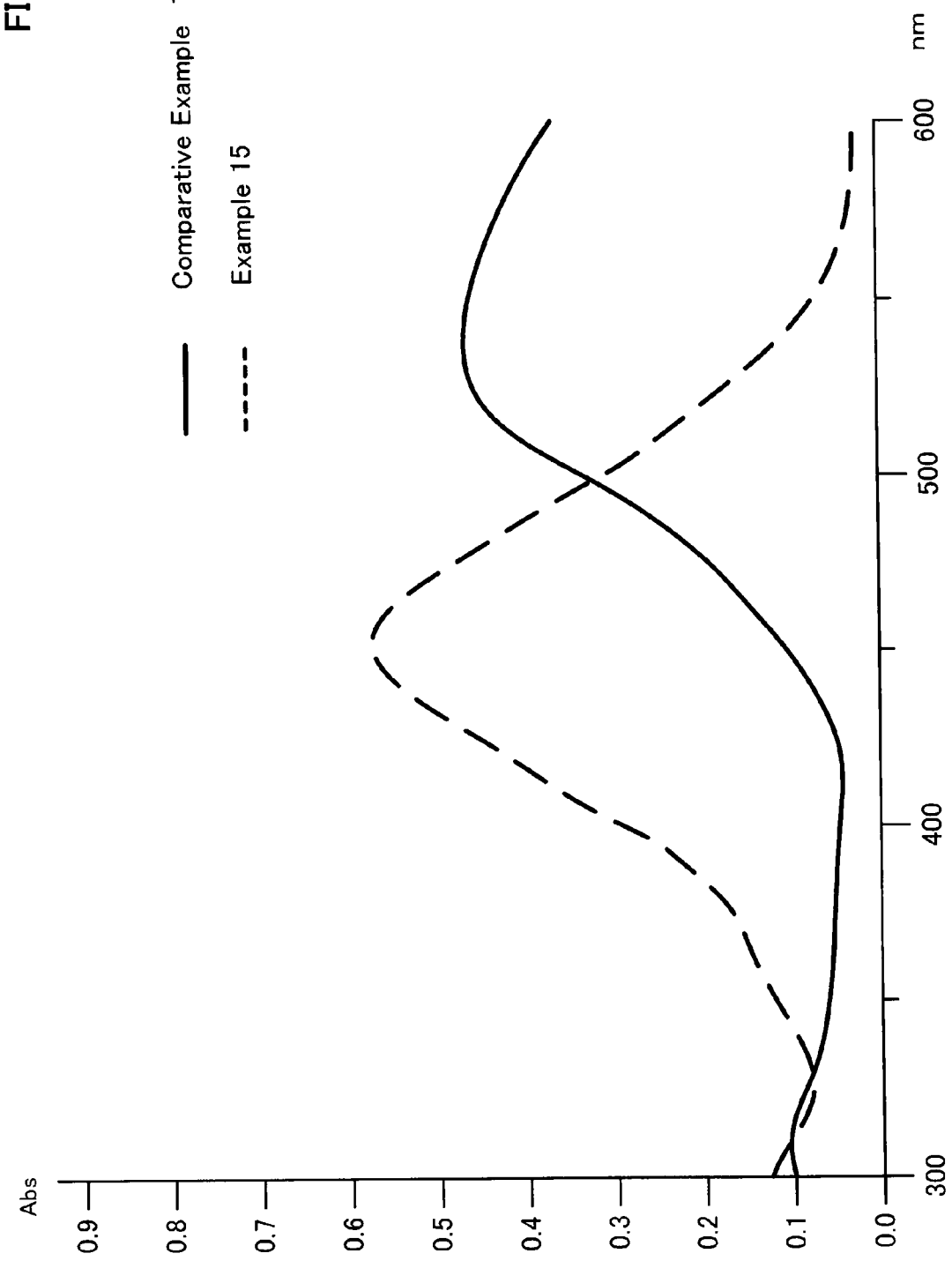
FIG. 8 shows the absorption spectrum of the compound (10) (full line) and complex compound (dash line) of Example 15.
Figure 9:
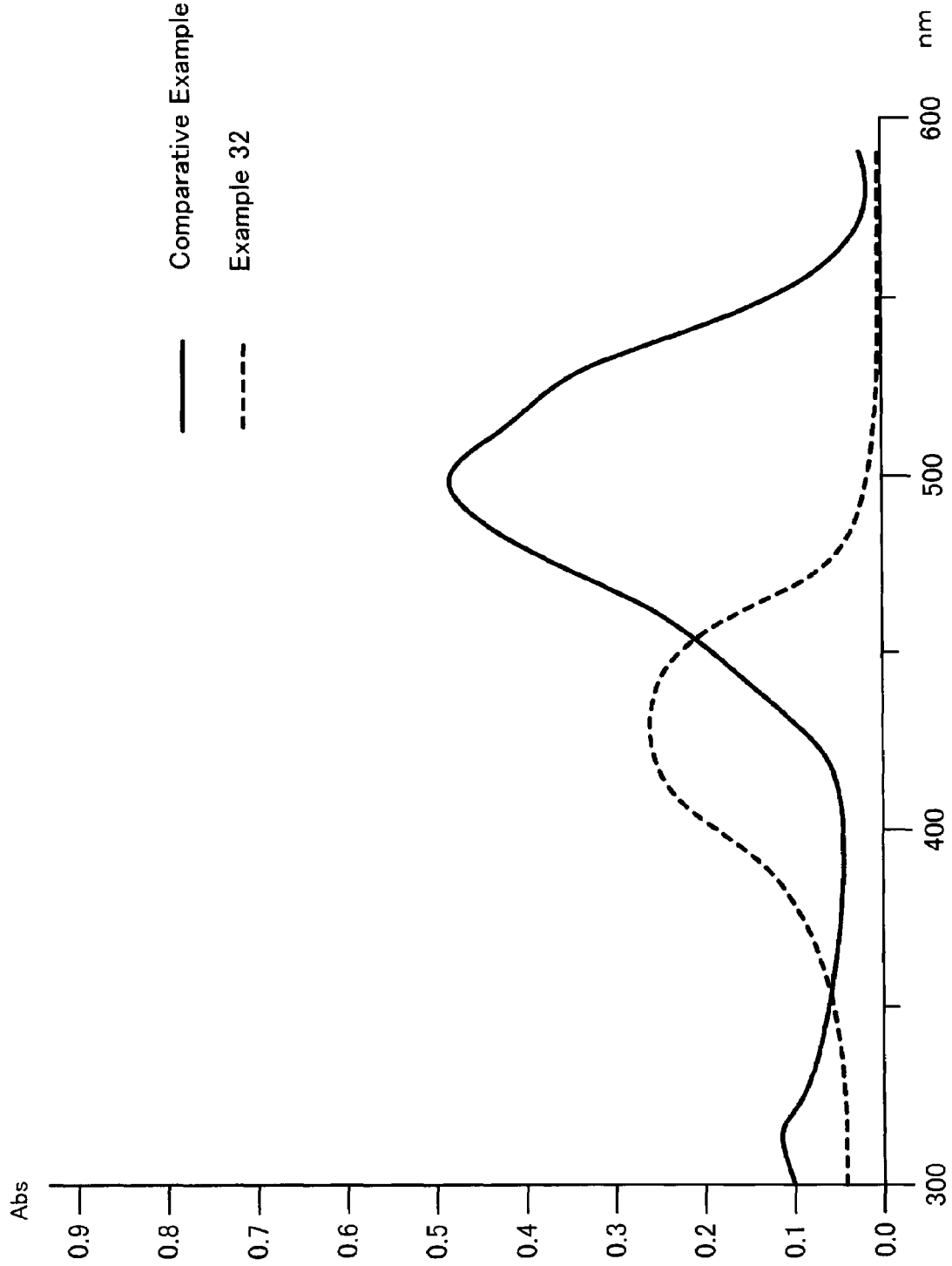
FIG. 9 shows the absorption spectrum of the compound (12) (full line) and complex compound (dash line) of Example 32.
Figure 10:
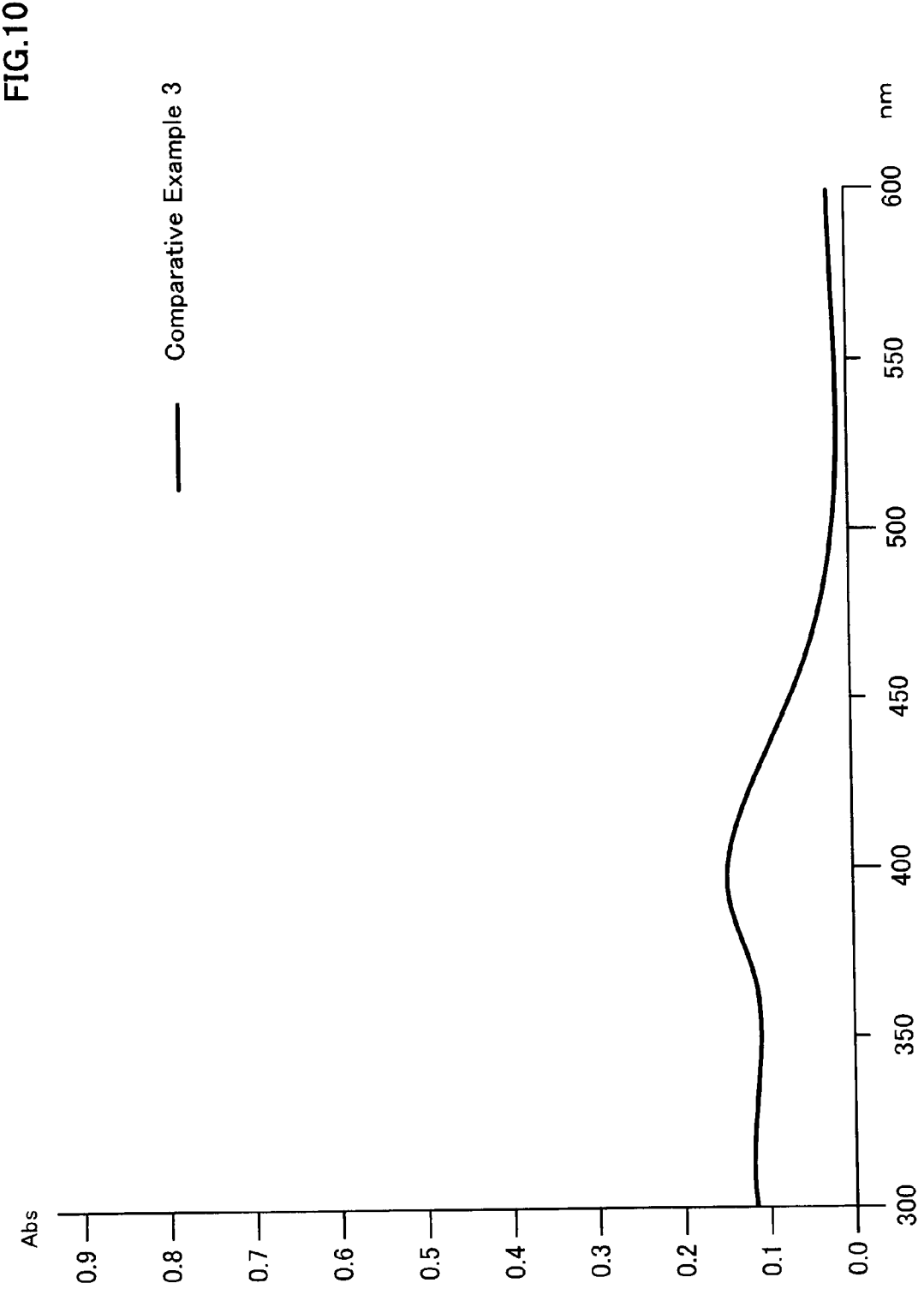
FIG. 10 shows the absorption spectrum of the compound represented by the chemical formula (15).
Figure 11:
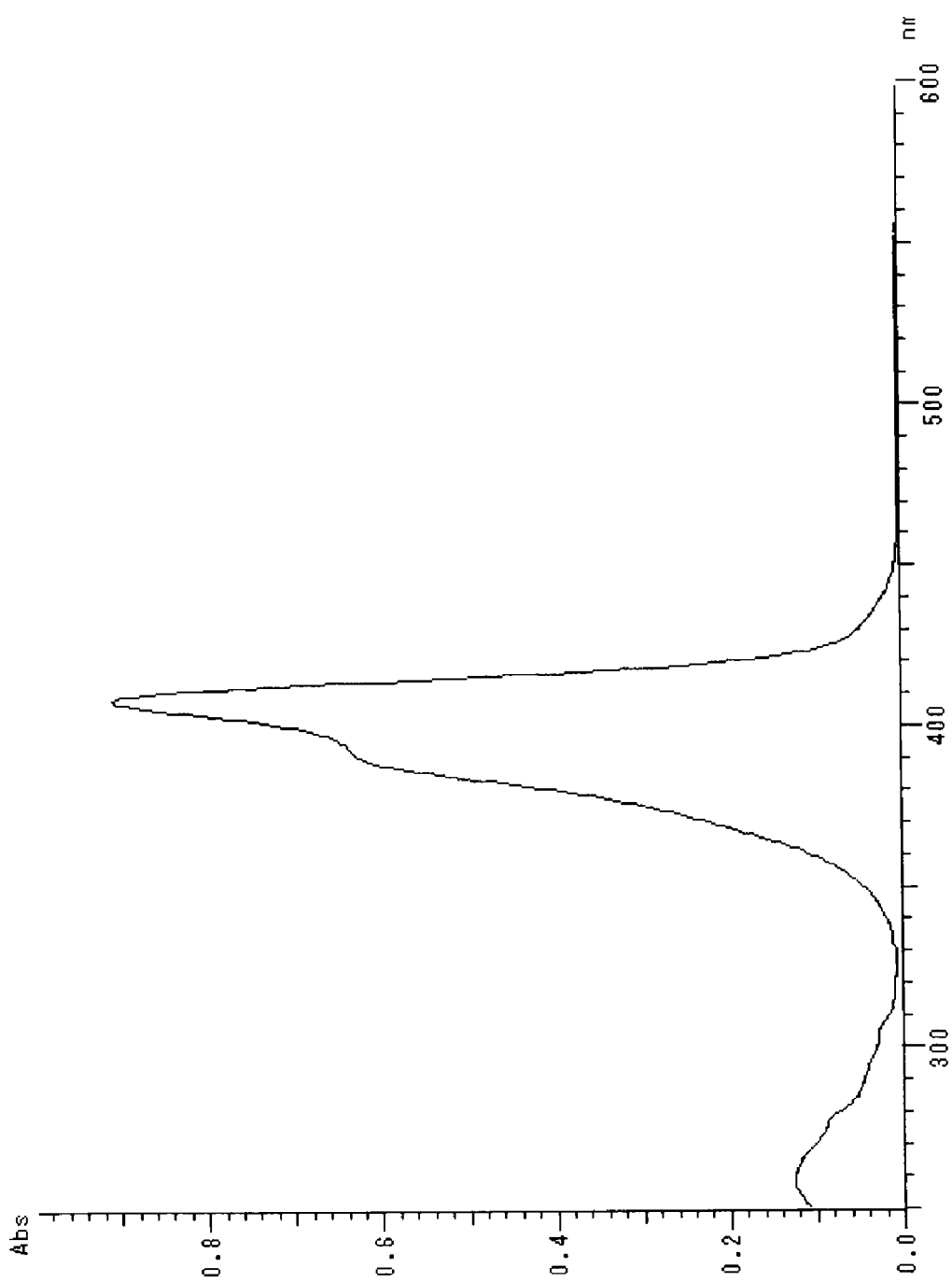
FIG. 11 shows the absorption spectrum of the compound represented by the chemical formula (16).
Figure 12:
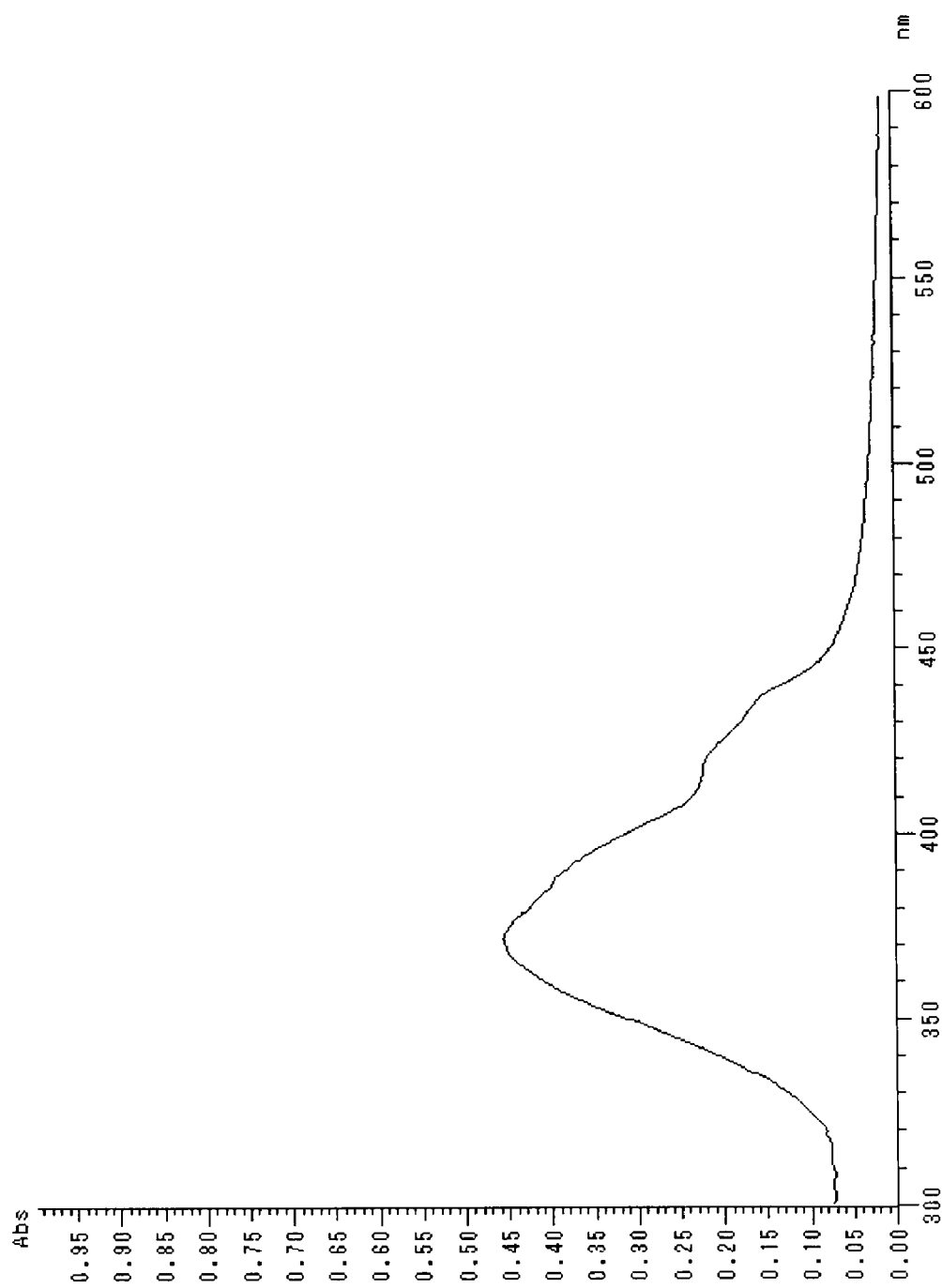
FIG. 12 shows the absorption spectrum of the coating film of the compound represented by the chemical formula (16).

10,30 . . . substrate
11,31 . . . guide groove
20,40 . . . information recording layer
21,41 . . . recording layer
22,42 . . . reflection layer
23 . . . protection layer
43 . . . protection film
100,200 . . . optical recording medium

The invention claimed is:

1. An optical recording medium comprising:
a substrate; and
a recording layer which is provided on the substrate directly or on another layer provided on the substrate, wherein the recording layer is capable of recording and/or reading information by irradiating light thereon,
wherein the recording layer comprises a metal complex compound comprising an azo compound represented by formula [I]:

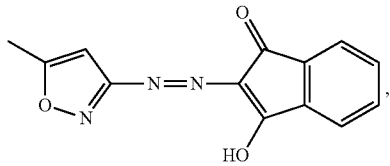

and a nickel or cobalt ion coordinated to the azo compound.

2. The optical recording medium according to claim 1, wherein the nickel ion is coordinated to the azo compound.

3. The optical recording medium according to claim 1, wherein the cobalt ion is coordinated to the azo compound.

4. An optical recording medium comprising:
a substrate; and
a recording layer which is provided on the substrate directly or on another layer provided on the substrate, wherein the recording layer is capable of recording and/or reading information by irradiating light thereon,
wherein the recording layer comprises a metal complex compound comprising an azo compound having a coupler component with indandione and a diazo component with a nitrogen-containing heterocyclic aromatic ring structure, and a nickel ion coordinated to the azo compound.

5. The optical recording medium according to claim 4, wherein the nitrogen-containing heterocyclic ring of the diazo component is a five- or six-membered monocyclic or a dicyclic condensed ring.

6. The optical recording medium according to claim 4, wherein the nitrogen-containing heterocyclic ring of the diazo component is isoxazole, triazole, oxazole, thiadiazole, pyrazole, pyridine, pyrimidine, imidazole, thiazole, isothiazole, benzothiazole, benzisoxazole, benzoxazole, or benzimidazole.

* * * * *